United States Patent
Liu et al.

(10) Patent No.: US 10,215,962 B2
(45) Date of Patent: Feb. 26, 2019

(54) OPTICAL IMAGING LENS SYSTEM, IMAGE CAPTURING UNIT AND ELECTRONIC DEVICE

(71) Applicant: LARGAN Precision Co., Ltd., Taichung (TW)

(72) Inventors: Ssu-Hsin Liu, Taichung (TW); Shu-Yun Yang, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 0 days.

(21) Appl. No.: 15/598,070

(22) Filed: May 17, 2017

(65) Prior Publication Data
US 2018/0210177 A1 Jul. 26, 2018

(30) Foreign Application Priority Data
Jan. 25, 2017 (TW) .............................. 106103068 A

(51) Int. Cl.
 G02B 9/62 (2006.01)
 G02B 13/00 (2006.01)
 G02B 13/04 (2006.01)
(52) U.S. Cl.
 CPC ........... *G02B 13/0045* (2013.01); *G02B 9/62* (2013.01); *G02B 13/04* (2013.01)
(58) Field of Classification Search
 CPC ................................................ G02B 13/0045
 USPC ......................................................... 359/713
 See application file for complete search history.

(56) References Cited

U.S. PATENT DOCUMENTS

| | | |
|---|---|---|
| 4,427,259 A | 1/1984 | Fjeldsted |
| 5,050,974 A | 9/1991 | Takasugi et al. |
| 5,087,987 A | 2/1992 | Simbal |
| 5,200,861 A | 4/1993 | Moskovich |
| 5,822,129 A | 10/1998 | Sekine |
| 5,999,337 A | 12/1999 | Ozaki |
| 6,473,244 B1 | 10/2002 | Sugano |
| 7,301,578 B2 | 11/2007 | Ohzawa et al. |
| 2007/0217035 A1 | 9/2007 | Baba |
| 2008/0074761 A1 | 3/2008 | Yamakawa et al. |
| 2010/0142062 A1 | 6/2010 | Asami et al. |
| 2012/0127598 A1 | 5/2012 | Katahira |
| 2013/0057666 A1 | 3/2013 | Fujii |
| 2014/0126070 A1 | 5/2014 | Ning |

(Continued)

FOREIGN PATENT DOCUMENTS

| | | |
|---|---|---|
| CN | 101520544 | 9/2009 |
| CN | 205720846 | 11/2016 |

(Continued)

*Primary Examiner* — James Jones
(74) *Attorney, Agent, or Firm* — Hanley, Flight & Zimmerman, LLC

(57) ABSTRACT

An optical imaging lens system includes six lens elements which are, in order from an object side to an image side, a first lens element, a second lens element, a third lens element, a fourth lens element, a fifth lens element and a sixth lens element. The first lens element has negative refractive power. The third lens element has an object-side surface being concave in a paraxial region thereof and an image-side surface being convex in a paraxial region thereof. The fourth lens element has positive refractive power. The fifth lens element has negative refractive power. The sixth lens element has positive refractive power.

35 Claims, 29 Drawing Sheets

(56) References Cited

U.S. PATENT DOCUMENTS

| | | | |
|---|---|---|---|
| 2014/0204477 A1* | 7/2014 | Asami | G02B 13/06 |
| | | | 359/738 |
| 2015/0277088 A1 | 10/2015 | Chang | |
| 2015/0323768 A1 | 11/2015 | Syu | |
| 2016/0004064 A1 | 1/2016 | Harada | |
| 2016/0077312 A1 | 3/2016 | Kwon | |
| 2016/0077313 A1 | 3/2016 | Komiyama | |
| 2016/0187617 A1 | 6/2016 | Komiyama | |
| 2016/0274339 A1 | 9/2016 | Lee | |

FOREIGN PATENT DOCUMENTS

| | | |
|---|---|---|
| CN | 106970455 | 7/2017 |
| CN | 206541061 U | 10/2017 |
| JP | 03049118 | 9/1992 |
| JP | 04267212 | 9/1992 |
| JP | H06222263 | 8/1994 |
| JP | H09304694 | 11/1997 |
| JP | 2004029282 | 1/2004 |
| JP | 2009092798 | 4/2009 |
| JP | 2015190999 | 11/2015 |

\* cited by examiner

OPTICAL IMAGING LENS SYSTEM, IMAGE CAPTURING UNIT AND ELECTRONIC DEVICE

RELATED APPLICATIONS

This application claims priority to Taiwan Application 106103068, filed Jan. 25, 2017, which is incorporated by reference herein in its entirety.

BACKGROUND

Technical Field

The present disclosure relates to an optical imaging lens system, an image capturing unit and an electronic device, more particularly to an optical imaging lens system and an image capturing unit applicable to an electronic device.

Description of Related Art

With the popularity of electronic devices having camera functionalities and high-end specifications, there is an increasing demand for compact optical system. For various applications, the optical systems are developed with large field of view, and have been widely applied to different kinds of electronic devices, such as head-mounted display devices, vehicle cameras, image recognition systems, multiple camera devices, smart electronic devices, surveillance cameras, sport devices, portable devices, unmanned aerial vehicles and so on.

In order to capture an image having high reality and uniform illuminance in wide angle mode, optical systems capable of taking high quality images are essential nowadays. Take the application of the head-mounted display devices for example, a compact optical system featuring wide field of view and large aperture stop can be appropriately arranged on the head-mounted display devices so as to incorporate the real life into the virtual world, allowing the users to experience a realistic three-dimensional environment. The compact optical system may be positioned at the front side, two opposite sides or other locations on the head-mounted display devices where it can clearly capture an image of the environment. In addition, the head-mount display devices can provide the users with a fully immersive virtual reality experience by being cooperated with features of 360 degrees motion tracking, three-dimensional infrared positioning, vibration sensing and remote controlling.

However, conventional optical systems are still incapable of simultaneously featuring wide angle, compact size, large aperture stop and high image quality to meet the requirements of future market.

SUMMARY

According to one aspect of the present disclosure, an optical imaging lens system includes six lens elements which are, in order from an object side to an image side, a first lens element, a second lens element, a third lens element, a fourth lens element, a fifth lens element and a sixth lens element. The first lens element has negative refractive power. The third lens element has an object-side surface being concave in a paraxial region thereof and an image-side surface being convex in a paraxial region thereof. The fourth lens element has positive refractive power. The fifth lens element has negative refractive power. The sixth lens element has positive refractive power. When a central thickness of the second lens element is CT2, a central thickness of the third lens element is CT3, a focal length of the optical imaging lens system is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the i-th lens element is fi, a refractive power of the first lens element is P1, a refractive power of the second lens element is P2, a refractive power of the third lens element is P3, a curvature radius of an image-side surface of the fifth lens element is R10, a curvature radius of an object-side surface of the sixth lens element is R11, the following conditions are satisfied:

$0<CT2/CT3<0.90;$ $0<\Sigma|f/fi|<3.0$, wherein $i=1, 2, 3, 4, 5, 6$;

$(|P2|+|P3|)/|P1|<0.90;$ and $|R11/R10|<1.30.$

According to another aspect of the present disclosure, an optical imaging lens system includes six lens elements which are, in order from an object side to an image side, a first lens element, a second lens element, a third lens element, a fourth lens element, a fifth lens element and a sixth lens element. The first lens element has negative refractive power. The third lens element has an object-side surface being concave in a paraxial region thereof and an image-side surface being convex in a paraxial region thereof. The fourth lens element with positive refractive power has an image-side surface being convex in a paraxial region thereof. The fifth lens element with negative refractive power has an object-side surface being concave in a paraxial region thereof. The sixth lens element has positive refractive power. When a central thickness of the second lens element is CT2, a central thickness of the third lens element is CT3, a focal length of the optical imaging lens system is f, a focal length of the first lens element is f1, a focal length of the second lens element is f2, an axial distance between the first lens element and the second lens element is T12, an entrance pupil diameter of the optical imaging lens system is EPD, the following conditions are satisfied:

$0<CT2/CT3<1.10;$ $0<f/T12<0.80;$ $0.80<f/EPD<4.0;$ and $|f1/f2|<0.90.$

According to still another aspect of the present disclosure, an optical imaging lens system includes six lens elements which are, in order from an object side to an image side, a first lens element, a second lens element, a third lens element, a fourth lens element, a fifth lens element and a sixth lens element. The first lens element has negative refractive power. The third lens element has an object-side surface being concave in a paraxial region thereof and an image-side surface being convex in a paraxial region thereof. The fifth lens element with negative refractive power has an object-side surface being concave in a paraxial region thereof. When a central thickness of the second lens element is CT2, a central thickness of the third lens element is CT3, a curvature radius of an image-side surface of the first lens element is R2, a curvature radius of an image-side surface of the second lens element is R4, a focal length of the optical imaging lens system is f, an axial distance between the second lens element and the third lens element is T23, an axial distance between the third lens element and the fourth lens element is T34, an axial distance between the fifth lens element and the sixth lens element is T56, the following conditions are satisfied:

$0 < CT2/CT3 < 1.0;$ $-2.80 < (R2+R4)/(R2-R4) < 0.90;$ $0 < f/T34 < 12.0;$ and $0 \leq T56/T23 < 1.20.$ According to yet another aspect of the present disclosure, an image capturing unit includes the aforementioned optical imaging lens system and an image sensor, wherein the image sensor is disposed on an image surface of the optical imaging lens system.

According to yet still another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An optical imaging lens system includes six lens elements. The six lens elements are, in order from an object side to an image side, a first lens element, a second lens element, a third lens element, a fourth lens element, a fifth lens element and a sixth lens element.

The first lens element has negative refractive power. Therefore, it is favorable for providing the optical imaging lens system with a retro-focus configuration for capturing light with large angle of incidence so as to increase the area of an image surface where light is projected onto, and thus the optical imaging lens system is applicable to a wider range of applications.

The second lens element can have an object-side surface being concave in a paraxial region thereof. Therefore, it is favorable for reducing the incident angle of light and correcting aberrations so as to meet the requirements of wide angle and high image quality.

The third lens element has an object-side surface being concave in a paraxial region thereof and an image-side surface being convex in a paraxial region thereof. Therefore, it is favorable for correcting aberrations and reducing sensitivity so as to improve image quality.

The fourth lens element with positive refractive power can have an image-side surface being convex in a paraxial region thereof. Therefore, it is favorable for providing light convergent capability and reducing the total track length of the optical imaging lens system, thereby achieving compactness.

Figure 24:
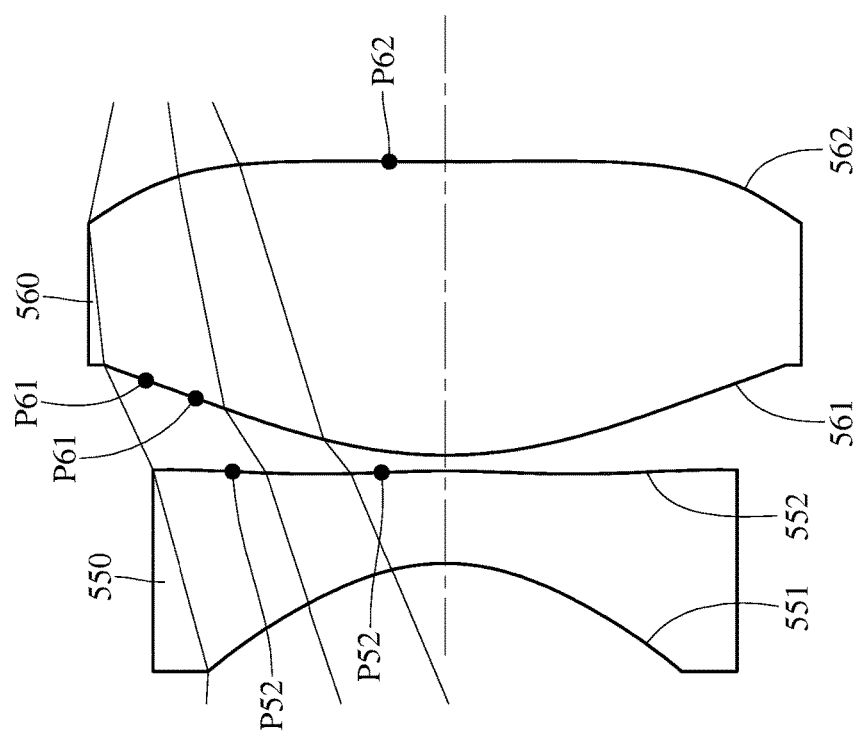
FIG. 24 shows a schematic view of inflection points on the fifth lens element and the sixth lens element according to the 5th embodiment of the present disclosure.

The fifth lens element has negative refractive power; therefore, it is favorable for balancing the positive refractive power of the fourth lens element and correcting chromatic aberration so as to reduce image overlap and improve image quality. The fifth lens element can have an object-side surface being concave in a paraxial region thereof; therefore, it is favorable for properly adjusting the refractive power of the fourth lens element and the fifth lens element so as to correct chromatic aberration by cooperation with the convex image-side surface of the fourth lens element, thereby preventing image distortion. The fifth lens element has an image-side surface which can have at least one inflection point; therefore, the aspheric image-side surface is favorable for flexibly designing the lens element so as to reduce the total track length of the optical imaging lens system, thereby meeting the requirement of compactness. As seen in FIG. 24, it shows a schematic view of at least one inflection point P52 on the image-side surface of the fifth lens element, according to the 5th embodiment of the present disclosure. According to the disclosure, an inflection point is a point on the surface of the lens element at which the surface changes from being concave to convex, or vice versa.

The sixth lens element can have positive refractive power; therefore, it is favorable for balancing the negative refractive power of the lens elements at the object side of the optical imaging lens system and alleviating the angle of the light incident onto the image surface at the off-axial region, thereby providing sufficient illuminance on the image surface. The sixth lens element can have an object-side surface being convex in a paraxial region thereof and an image-side surface being convex in a paraxial region thereof; therefore, controlling the shape of the sixth lens element is favorable for strengthening its positive refractive power and reducing stray light so as to increase illuminance on the image surface and improve image quality. Either an object-side surface of the sixth lens element, an image-side surface of the sixth lens element or both the object-side surface and the image-side surface of the sixth lens element can have at least one inflection point; therefore, adjusting the shape of the sixth lens element is favorable for alleviating the angle of the light incident onto the image surface so as to provide sufficient illuminance and correct aberrations at the off-axial region. As seen in FIG. 24, it shows a schematic view of at least one inflection point P61 on the object-side surface of the sixth lens element and at least one inflection point P62 on the image-side surface of the sixth lens element, according to the 5th embodiment of the present disclosure.

When a central thickness of the second lens element is CT2, a central thickness of the third lens element is CT3, the following condition is satisfied: 0<CT2/CT3<1.10. Therefore, a proper ratio of the central thickness of the second lens element to the central thickness of the third lens element is favorable for the incidence of light with large field of view, reducing sensitivity and increasing the manufacturing yield rate, so that the optical imaging lens system is applicable to a wider range of applications; furthermore, it is favorable for correcting aberrations so as to improve image quality. Preferably, the following condition can also be satisfied: 0<CT2/CT3<1.0. More preferably, the following condition can also be satisfied: 0<CT2/CT3<0.90.

When a focal length of the optical imaging lens system is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the i-th lens element is fi, the following condition can be satisfied: 0<Σ|f/fi|<3.0, wherein i=1, 2, 3, 4, 5, 6. Therefore, the arrangement of the refractive power of the optical imaging lens system is favorable for obtaining wide angle effect so as to increase the area on the image surface where light is projected onto, and thus the optical imaging lens system is applicable to an electronic device having the demand of large field of view.

When a refractive power of the first lens element is P1, a refractive power of the second lens element is P2, a refractive power of the third lens element is P3, the following condition can be satisfied: (|P2|+|P3|)/|P1|<0.90. Therefore, the distribution of the refractive power between the object side and the image side of the optical imaging lens system is favorable for capturing light with large field of view and maintaining high image quality. According to the disclosure, P1 is a ratio of the focal length of the optical imaging lens system to the focal length of the first lens element, P2 is a ratio of the focal length of the optical imaging lens system to the focal length of the second lens element, and P3 is a ratio of the focal length of the optical imaging lens system to the focal length of the third lens element.

When a curvature radius of the image-side surface of the fifth lens element is R10, a curvature radius of the object-side surface of the sixth lens element is R11, the following condition can be satisfied: |R11/R10|<1.30. Therefore, it is favorable for properly arranging the curvatures of the image-side surface of the fifth lens element and the object-side surface of the sixth lens element, so that the incident light is prevented from reflecting while passing through the lens elements, thereby increasing illuminance and reducing vignetting at the peripheral region of the image. Preferably, the following condition can also be satisfied: |R11/R10|<0.85.

When the focal length of the optical imaging lens system is f, an axial distance between the first lens element and the second lens element is T12, the following condition can be satisfied: 0<f/T12<0.80. Therefore, it is favorable for obtaining a wide angle configuration featuring short focal length and reducing chromatic aberration in the axial direction; moreover, it is favorable for properly adjusting the axial distance between the first lens element and the second lens element so as to obtain a balance among high image quality, high assembling yield rate and compactness. Preferably, the following condition can also be satisfied: 0<f/T12<0.65.

When the focal length of the optical imaging lens system is f, an entrance pupil diameter of the optical imaging lens system is EPD, the following condition can be satisfied: 0.80<f/EPD<4.0. Therefore, it is favorable for providing sufficient amount of incident light to increase illuminance on the image surface, so that an imaging capturing unit including the optical imaging lens system is able to capture enough image information in low light condition (for example, in the night) or dynamic photography (for example, short exposure time), and thus an electronic device equipped with the imaging capturing unit can generate images with high quality after image processing. As a result, the electronic device is able to be used under various conditions. Preferably, the following condition can also be satisfied: 0.80<f/EPD<2.80.

When the focal length of the first lens element is f1, the focal length of the second lens element is f2, the following condition can be satisfied: |f1/f2|<0.90. Therefore, it is favorable for balancing the distribution of the refractive power between the first lens element and the second lens element so as to reduce sensitivity at the object side of the optical imaging lens system, thereby helping the light traveling into the optical imaging lens system and improving the image quality. Preferably, the following condition can also be satisfied: |f1/f2|<0.70.

When a curvature radius of an image-side surface of the first lens element is R2, a curvature radius of an image-side surface of the second lens element is R4, the following condition can be satisfied: −2.80<(R2+R4)/(R2−R4)<0.90. Therefore, the shapes of the image-side surface of the first lens element and the image-side surface of the second lens element are properly arranged, so that it is favorable for reducing the total track length and correcting aberrations so as to keep a balance among wide angle effect, compactness and high image quality. Preferably, the following condition can also be satisfied: −2.0<(R2+R4)/(R2−R4)<0.

When the focal length of the optical imaging lens system is f, an axial distance between the third lens element and the fourth lens element is T34, the following condition can be satisfied: 0<f/T34<12.0. Therefore, the wide angle configuration can be enhanced with a shorter focal length, and as a result further reducing axial chromatic aberration; moreover, it is favorable for properly adjusting the axial distance between the third lens element and the fourth lens element so as to obtain a sufficient space for accommodating additional opto-components, thus increasing the flexibility of the mechanism design of the optical imaging lens system and further enhancing the image quality. Preferably, the following condition can also be satisfied: 0<f/T34<10.0.

When an axial distance between the second lens element and the third lens element is T23, an axial distance between the fifth lens element and the sixth lens element is T56, the following condition can be satisfied: 0≤T56/T23<1.20. Therefore, it is favorable for properly arranging the axial distances between each adjacent lens element so as to increase assembling yield rate and keep the optical imaging lens system compact, and thus the optical imaging lens system is applicable to a wider range of applications. Preferably, the following condition can also be satisfied: 0.10<T56/T23<1.0.

When the focal length of the optical imaging lens system is f, a curvature radius of the object-side surface of the second lens element is R3, the curvature radius of the image-side surface of the second lens element is R4, the following condition can be satisfied: −3.0<f/R3+f/R4<0.20. Therefore, adjusting the curvatures on both the object-side surface and the image-side surface of the second lens element is favorable for receiving incident light with large field of view and correcting astigmatism. Preferably, the following condition can also be satisfied: −0.50<f/R3+f/R4<0.20. More preferably, the following condition can also be satisfied: −0.50<f/R3+f/R4<0.10.

When a curvature radius of the object-side surface of the fifth lens element is R9, the curvature radius of the image-side surface of the fifth lens element is R10, the following condition can be satisfied: 0.45<|(R9−R10)/(R9+R10)|<1.90. Therefore, it is favorable for arranging the shape of the fifth lens element so as to strengthen its negative refractive power, thereby correcting chromatic aberration and converging light rays having different wavelengths.

Figure 25:
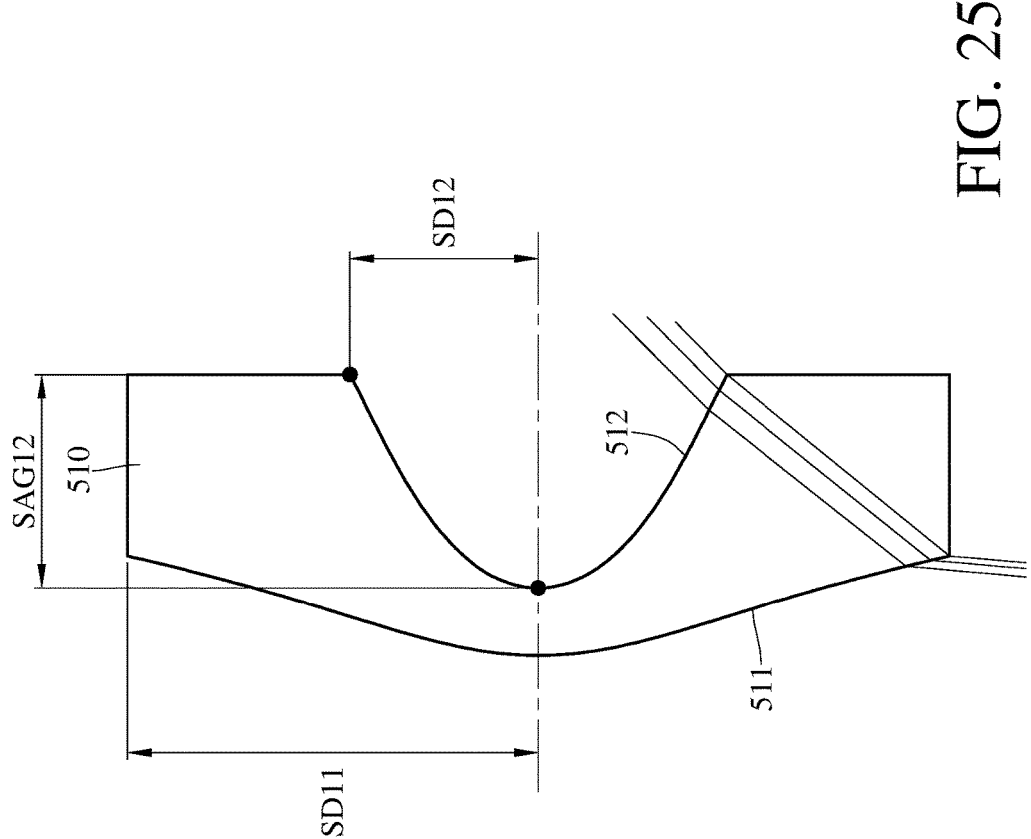
FIG. 25 shows a schematic view of SD11, SD12 and SAG12 according to the 5th embodiment of the present disclosure.

When an axial distance between the image-side surface of the sixth lens element and an image surface is BL, a displacement in parallel with an optical axis from an axial vertex of the image-side surface of the first lens element to a maximum effective radius position of the image-side surface of the first lens element is SAG12, the following condition can be satisfied: |BL/SAG12|<1.80. Therefore, by adjusting the shape of the image-side surface of the first lens element and a back focal length of the optical imaging lens system, it is favorable for reducing the total track length so as to meet the requirement of compactness. As seen in FIG. 25, it shows a schematic view of SAG12 according to the 5th embodiment of the present disclosure. When the direction from the axial vertex of one surface to the maximum effective radius position of the same surface is facing towards the image side of the optical imaging lens system, the value of SAG12 is positive; when the direction from the axial vertex of the surface to the maximum effective radius position of the same surface is facing towards the object side of the optical imaging lens system, the value of SAG12 is negative.

Figure 26:
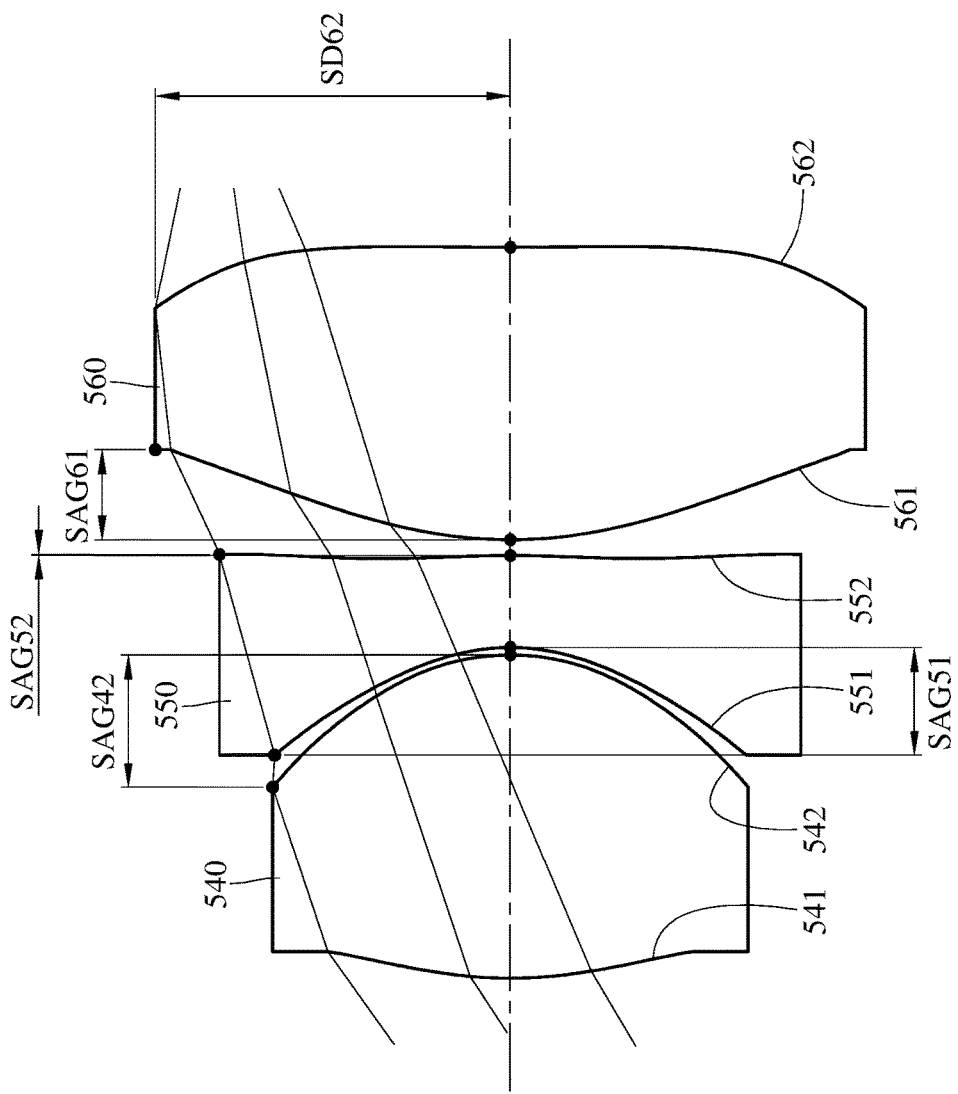
FIG. 26 shows a schematic view of SAG42, SAG51, SAG52, SAG61 and SD62 according to the 5th embodiment of the present disclosure.

When a displacement in parallel with the optical axis from an axial vertex of the image-side surface of the fourth lens element to a maximum effective radius position of the image-side surface of the fourth lens element is SAG42, a displacement in parallel with the optical axis from an axial vertex of the object-side surface of the fifth lens element to a maximum effective radius position of the object-side surface of the fifth lens element is SAG51, the following condition can be satisfied: |SAG51|<|SAG42|. Therefore, the arrangement of the shapes on the image-side surface of the fourth lens element and the object-side surface of the fifth lens element is favorable for the lens elements to be more flexible to design and correct aberrations at the off-axial region. As seen in FIG. 26, it shows a schematic view of SAG42 and SAG51 according to the 5th embodiment of the present disclosure.

When a curvature radius of the image-side surface of the fourth lens element is R8, the curvature radius of the object-side surface of the fifth lens element is R9, the following condition can be satisfied: 0.01<|(R8−R9)/(R8+R9)|<0.35. Therefore, the arrangement of the curvatures on the image-side surface of the fourth lens element and the object-side surface of the fifth lens element is favorable for the correction of chromatic aberration at the image side of the optical imaging lens system while reducing the total track length so as to meet the requirements of compactness and high image quality. Preferably, the following condition can also be satisfied: 0.01<|(R8−R9)/(R8+R9)|<0.20.

When an Abbe number of the second lens element is V2, an f-number of the optical imaging lens system is Fno, the following condition can be satisfied: 0<V2*Fno/10<10.0. Therefore, controlling the size of the aperture stop and the material of the second lens element are favorable for the imaging capturing unit including the optical imaging lens system to correct chromatic aberration as well as capture enough image information in low light condition (for example, in the night) or dynamic photography (for example, short exposure time), and thus the electronic device equipped with the imaging capturing unit can generate images with high quality after image processing so as to be usable under various conditions.

When a maximum effective radius of an object-side surface of the first lens element is SD11, a maximum effective radius of the image-side surface of the sixth lens element is SD62, the following condition can be satisfied: 0.10<SD62/SD11<0.55. Therefore, adjusting the ratio of the effective diameter at the object side of the optical imaging lens system to the effective diameter at the image side of the optical imaging lens system is favorable for providing a retro-focus configuration so as to enlarge the field of view. As seen in FIG. 25 and FIG. 26, wherein a schematic view of SD11 according to the 5th embodiment of the present disclosure is shown in FIG. 25, and a schematic view of SD62 according to the 5th embodiment of the present disclosure is shown in FIG. 26.

When the refractive power of the second lens element is P2, the refractive power of the third lens element is P3, the following condition can be satisfied: $|P2|+|P3|<0.38$. Therefore, adjusting the distribution of the refractive power of the second lens element and the refractive power of the third lens element is favorable for the correction of aberrations of the optical imaging lens system so as to reduce aberrations generated by the incident light with large field of view, thereby improving the image quality.

When a sum of axial distances between each adjacent lens element of the optical imaging lens system is ΣAT, the axial distance between the first lens element and the second lens element is T12, the following condition can be satisfied: $1.0<\Sigma AT/T12<1.90$. Therefore, it is favorable for properly arranging the axial distances between each adjacent lens element so as to increase assembling yield rate and maintain compactness, and thus the optical imaging lens system is applicable to a wider range of applications.

When a displacement in parallel with the optical axis from an axial vertex of the image-side surface of the fifth lens element to a maximum effective radius position of the image-side surface thereof is SAG52, a displacement in parallel with the optical axis from an axial vertex of the object-side surface of the sixth lens element to a maximum effective radius position of the object-side surface thereof is SAG61, the following condition can be satisfied: $-2.0<SAG52/SAG61<0.55$. Therefore, adjusting the change of the shapes on the image-side surface of the fifth lens element and the object-side surface of the sixth lens element is favorable for alleviating the angle of the light incident onto the image surface so as to increase illuminance on the image surface and improve image resolution as well as image quality. As seen in FIG. 26, it shows a schematic view of SAG52 and SAG61 according to the 5th embodiment of the present disclosure.

When the curvature radius of the image-side surface of the first lens element is R2, a maximum effective radius of the image-side surface of the first lens element is SD12, the following condition can be satisfied: $R2/SD12<0.80$. Therefore, adjusting the shape of the image-side surface of the first lens element is favorable for reducing the total track length so as to meet the requirement of compactness. As seen in FIG. 25, it shows a schematic view of SD12 according to the 5th embodiment of the present disclosure.

When the Abbe number of the second lens element is V2, an Abbe number of the third lens element is V3, the following condition can be satisfied: $V2+V3<70$. Therefore, it is favorable for selecting proper materials of the second lens element and the third lens element so as to reduce chromatic aberration, thereby preventing image overlay and improving the image quality.

When a maximum among all refractive indices of the lens elements of the optical imaging lens system is Nmax, the following condition can be satisfied: $1.60<Nmax<1.75$. Therefore, it is favorable for selecting proper materials of the lens elements, so that the optical imaging lens system can be operated under different environmental conditions, such as different temperatures, humidity and pH values, and thus the optical imaging lens system is applicable to a wider range of applications.

When half of a maximum field of view of the optical imaging lens system is HFOV, the following condition can be satisfied: $-0.50<1/\tan(HFOV)<0.35$. Therefore, it is favorable for enlarging the field of view for various applications. Preferably, the following condition can also be satisfied: $-0.40<1/\tan(HFOV)<0.25$.

The optical imaging lens system further includes an aperture stop. When an axial distance between the aperture stop and the image surface is SL, a central thickness of the sixth lens element is CT6, the following condition can be satisfied: $1.50<SL/CT6<5.30$. Therefore, controlling the position of the aperture stop and the central thickness of the sixth lens element is favorable for improving the symmetry of the optical imaging lens system and strengthening the positive refractive power of the sixth lens element so as to reduce stray light.

According to the present disclosure, the aperture stop can be disposed between the third lens element and the fourth lens element. Therefore, balancing the position of the aperture stop is favorable for further improving the symmetry of the optical imaging lens system so as to obtain wide angle effect and high image quality.

When the focal length of the optical imaging lens system is f, a composite focal length of all the lens elements disposed between an imaged object and the aperture stop is fG1, the following condition can be satisfied: $0<f/fG1$. Therefore, it is favorable for adjusting the refractive power at the object side of the optical imaging lens system so as to move the principal point toward the object side for reducing the total track length, so that the arrangement of the optical imaging lens system in electronic devices can be more flexible. According to the disclosure, when there is only one lens element disposed between the imaged object and the aperture stop, fG1 is a focal length of this lens element; when there is multiple lens elements disposed between the imaged object and the aperture stop, fG1 is a composite focal length of these lens elements.

According to the present disclosure, the lens elements of the optical imaging lens system can be made of glass or plastic material. When the lens elements are made of glass material, the refractive power distribution of the optical imaging lens system may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the optical imaging lens system can also be reduced.

According to the present disclosure, each of an object-side surface and an image-side surface of a lens element has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the optical imaging lens system on a corresponding image sensor can be flat or curved, particularly a concave curved surface facing towards the object side of the optical imaging lens system.

According to the present disclosure, the optical imaging lens system can include at least one stop, such as an aperture stop, a glare stop or a field stop. Said glare stop or said field stop is allocated for eliminating the stray light and thereby improving image quality thereof.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the above description of the present disclosure, the following specific embodiments are provided for further explanation.

1st Embodiment

Figure 1:
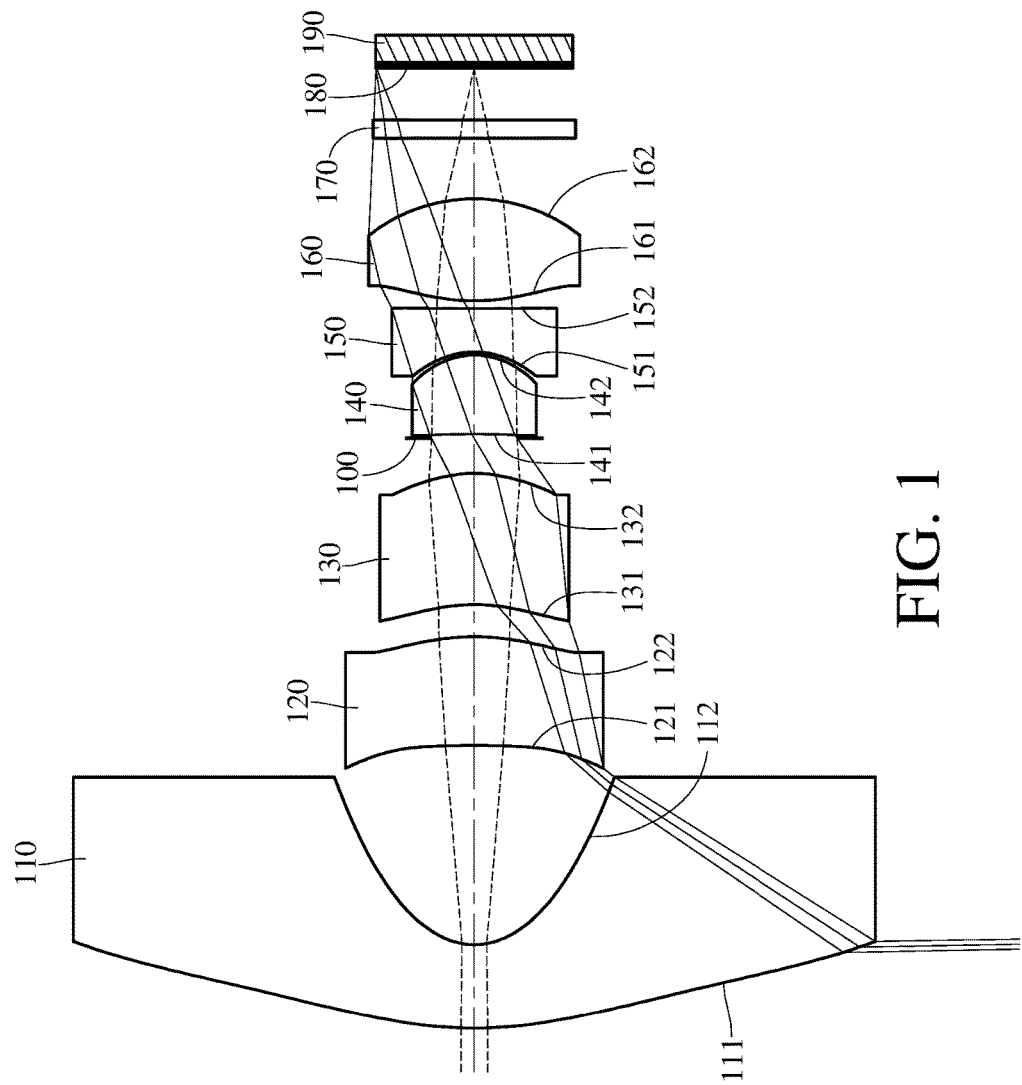
FIG. 1 is a schematic view of an image capturing unit according to the 1st embodiment of the present disclosure.
Figure 2:
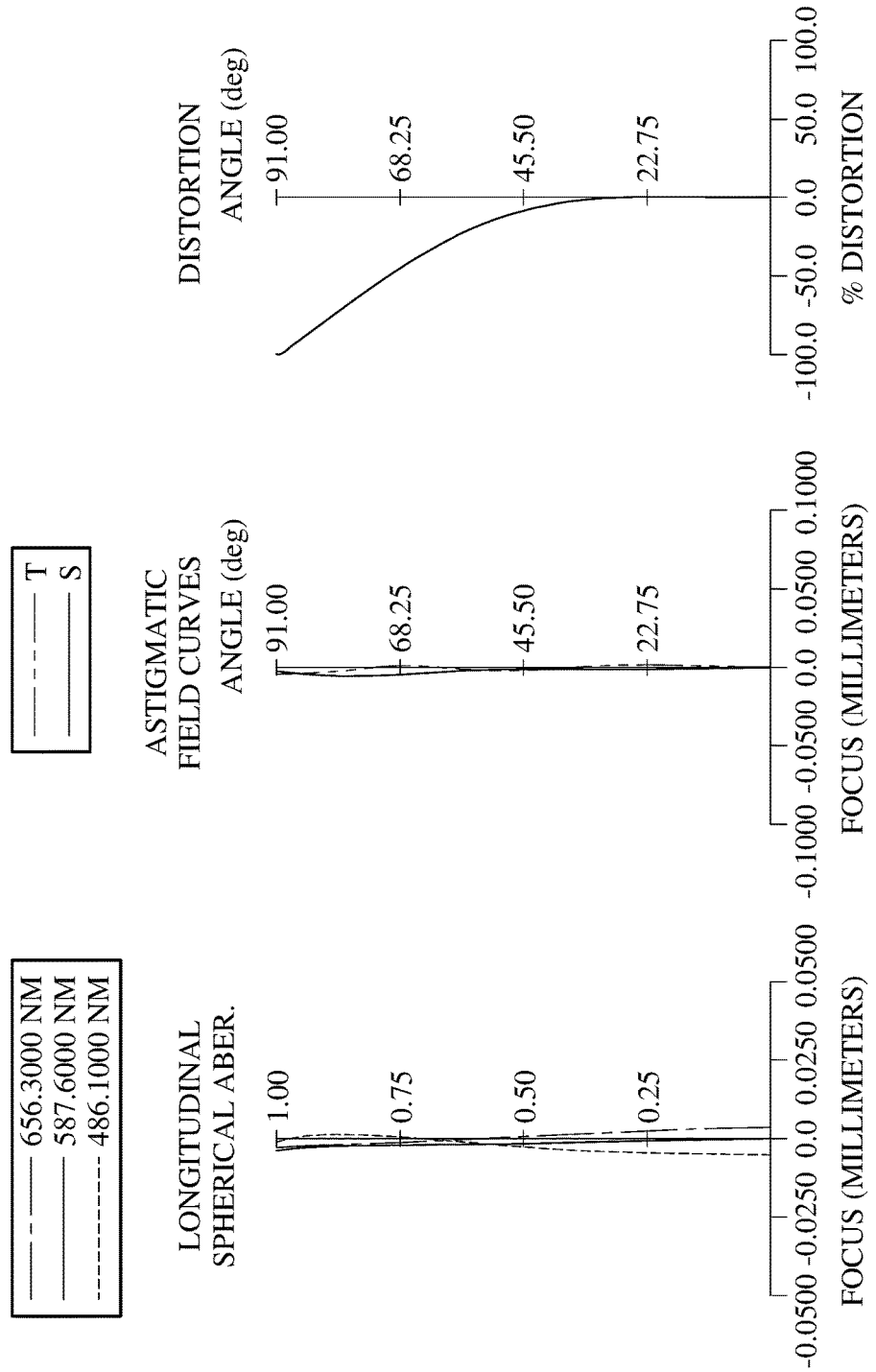
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens system (its reference numeral is omitted) of the present disclosure and an image sensor 190. The optical imaging lens system includes, in order from an object side to an image side, a first lens element 110, a second lens element 120, a third lens element 130, an aperture stop 100, a fourth lens element 140, a fifth lens element 150, a sixth lens element 160, a filter 170 and an image surface 180. The optical imaging lens system includes six lens elements (110, 120, 130, 140, 150 and 160) with no additional lens element disposed between the first lens element 110 and the sixth lens element 160.

The first lens element 110 with negative refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric.

The third lens element 130 with positive refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The image-side surface 152 of the fifth lens element 150 has at least one inflection point.

The sixth lens element 160 with positive refractive power has an object-side surface 161 being convex in a paraxial region thereof and an image-side surface 162 being convex in a paraxial region thereof. The sixth lens element 160 is made of plastic material and has the object-side surface 161 and the image-side surface 162 being both aspheric. The object-side surface 161 of the sixth lens element 160 has at least one inflection point.

The filter 170 is made of glass material and located between the sixth lens element 160 and the image surface 180, and will not affect the focal length of the optical imaging lens system. The image sensor 190 is disposed on or near the image surface 180 of the optical imaging lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical imaging lens system of the image capturing unit according to the 1st embodiment, when a focal length of the optical imaging lens system is f, an f-number of the optical imaging lens system is Fno, and half of a maximum field of view of the optical imaging lens system is HFOV, these parameters have the following values: f=0.70 millimeters (mm); Fno=2.22; and HFOV=91.0 degrees (deg.).

When half of the maximum field of view of the optical imaging lens system is HFOV, the following condition is satisfied: 1/tan(HFOV)=−0.02.

When a maximum among all refractive indices of the lens elements (110-160) of the optical imaging lens system is Nmax, the following condition is satisfied: Nmax=1.660.

When an Abbe number of the second lens element 120 is V2, an Abbe number of the third lens element 130 is V3, the following condition is satisfied: V2+V3=43.9.

When the Abbe number of the second lens element 120 is V2, the f-number of the optical imaging lens system is Fno, the following condition is satisfied: V2*Fno/10=4.53.

When a central thickness of the second lens element 120 is CT2, a central thickness of the third lens element 130 is CT3, the following condition is satisfied: CT2/CT3=0.83.

When an axial distance between the second lens element 120 and the third lens element 130 is T23, an axial distance between the fifth lens element 150 and the sixth lens element 160 is T56, the following condition is satisfied: T56/T23=0.23.

When a sum of axial distances between each adjacent lens element of the optical imaging lens system is ΣAT, an axial distance between the first lens element 110 and the second lens element 120 is T12, the following condition is satisfied: ΣAT/T12=1.41. In this embodiment, the axial distance between two adjacent lens elements is the air gap in a paraxial region between the two adjacent lens elements.

When a curvature radius of the image-side surface 112 of the first lens element 110 is R2, a curvature radius of the image-side surface 122 of the second lens element 120 is R4, the following condition is satisfied: (R2+R4)/(R2−R4)=−0.55.

When a curvature radius of the image-side surface 142 of the fourth lens element 140 is R8, a curvature radius of the object-side surface 151 of the fifth lens element 150 is R9, the following condition is satisfied: |(R8−R9)/(R8+R9)|=0.04.

When the curvature radius of the object-side surface 151 of the fifth lens element 150 is R9, a curvature radius of the image-side surface 152 of the fifth lens element 150 is R10, the following condition is satisfied: |(R9−R10)/(R9+R10)|=0.92.

When the curvature radius of the image-side surface 152 of the fifth lens element 150 is R10, a curvature radius of the object-side surface 161 of the sixth lens element 160 is R11, the following condition is satisfied: |R11/R10|=0.11.

When the curvature radius of the image-side surface 112 of the first lens element 110 is R2, a maximum effective radius of the image-side surface 112 of the first lens element 110 is SD12, the following condition is satisfied: R2/SD12=0.49.

When the focal length of the optical imaging lens system is f, the axial distance between the first lens element 110 and the second lens element 120 is T12, the following condition is satisfied: f/T12=0.31.

When the focal length of the optical imaging lens system is f, an axial distance between the third lens element 130 and the fourth lens element 140 is T34, the following condition is satisfied: f/T34=1.54.

When the focal length of the optical imaging lens system is f, a curvature radius of the object-side surface 121 of the second lens element 120 is R3, the curvature radius of the image-side surface 122 of the second lens element 120 is R4, the following condition is satisfied: f/R3+f/R4=−0.30.

When a focal length of the first lens element 110 is f1, a focal length of the second lens element 120 is f2, the following condition is satisfied: |f1/f2|=0.40.

When the focal length of the optical imaging lens system is f, the focal length of the first lens element 110 is f1, the focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, a focal length of the i-th lens element is fi, the following condition is satisfied: Σ|f/fi|=1.84.

When the focal length of the optical imaging lens system is f, an entrance pupil diameter of the optical imaging lens system is EPD, the following condition is satisfied: f/EPD=2.22.

When the focal length of the optical imaging lens system is f, a composite focal length of all the lens elements disposed between an imaged object (not shown in the drawings) and the aperture stop 100 is fG1, the following condition is satisfied: f/fG1=0.38. In this embodiment, the first lens element 110, the second lens element 120 and the third lens element 130 are disposed between the imaged object and the aperture stop 100, and fG1 is a composite focal length of the first lens element 110, the second lens element 120 and the third lens element 130.

When a refractive power of the second lens element 120 is P2, a refractive power of the third lens element 130 is P3, the following condition is satisfied: |P2|+|P3|=0.29.

When a refractive power of the first lens element 110 is P1, the refractive power of the second lens element 120 is P2, the refractive power of the third lens element 130 is P3, the following condition is satisfied: (|P2|+|P3|)/|P1|=0.80.

When an axial distance between the image-side surface 162 of the sixth lens element 160 and the image surface 180 is BL, a displacement in parallel with an optical axis from an axial vertex of the image-side surface 112 of the first lens element 110 to a maximum effective radius position of the image-side surface 112 thereof is SAG12, the following condition is satisfied: |BL/SAG12|=0.78.

When an axial distance between the aperture stop 100 and the image surface 180 is SL, a central thickness of the sixth lens element 160 is CT6, the following condition is satisfied: SL/CT6=3.64.

When a maximum effective radius of the object-side surface 111 of the first lens element 110 is SD11, a maximum effective radius of the image-side surface 162 of the sixth lens element 160 is SD62, the following condition is satisfied: SD62/SD11=0.26.

When a displacement in parallel with the optical axis from an axial vertex of the image-side surface 152 of the fifth lens element 150 to a maximum effective radius position of the image-side surface 152 thereof is SAG52, a displacement in parallel with the optical axis from an axial vertex of the object-side surface 161 of the sixth lens element 160 to a maximum effective radius position of the object-side surface 161 thereof is SAG61, the following condition is satisfied: SAG52/SAG61=0.00141.

In this embodiment, a displacement in parallel with the optical axis from an axial vertex of the image-side surface 142 of the fourth lens element 140 to a maximum effective radius position of the image-side surface 142 thereof is SAG42, a displacement in parallel with the optical axis from an axial vertex of the object-side surface 151 of the fifth lens element 150 to a maximum effective radius position of the object-side surface 151 thereof is SAG51, the following condition is satisfied: |SAG51|<|SAG42|.

The detailed optical data of the 1st embodiment are shown in Table 1 and the aspheric surface data are shown in Table 2 below.

TABLE 1

1st Embodiment
f = 0.70 mm, Fno = 2.22, HFOV = 91.0 deg.

| Surface # | | Curvature Radius | Thickness | Material | Index | Abbe # | Focal Length |
|---|---|---|---|---|---|---|---|
| 0 | Object | Plano | | Infinity | | | |
| 1 | Lens 1 | 4.672 (ASP) | 0.961 | Plastic | 1.545 | 56.1 | −1.92 |
| 2 | | 0.792 (ASP) | 2.280 | | | | |

TABLE 1-continued

1st Embodiment
f = 0.70 mm, Fno = 2.22, HFOV = 91.0 deg.

| Surface # | | Curvature Radius | | Thickness | Material | Index | Abbe # | Focal Length |
|---|---|---|---|---|---|---|---|---|
| 3 | Lens 2 | −14.865 | (ASP) | 1.250 | Plastic | 1.660 | 20.4 | 4.84 |
| 4 | | −2.718 | (ASP) | 0.370 | | | | |
| 5 | Lens 3 | −1.943 | (ASP) | 1.500 | Plastic | 1.639 | 23.5 | 4.72 |
| 6 | | −1.537 | (ASP) | 0.403 | | | | |
| 7 | Ape. Stop | | Plano | 0.050 | | | | |
| 8 | Lens 4 | −9.091 | (ASP) | 0.908 | Plastic | 1.544 | 56.0 | 1.70 |
| 9 | | −0.869 | (ASP) | 0.035 | | | | |
| 10 | Lens 5 | −0.944 | (ASP) | 0.500 | Plastic | 1.660 | 20.4 | −1.50 |
| 11 | | −23.470 | (ASP) | 0.087 | | | | |
| 12 | Lens 6 | 2.483 | (ASP) | 1.166 | Plastic | 1.534 | 55.9 | 2.24 |
| 13 | | −1.932 | (ASP) | 0.700 | | | | |
| 14 | Filter | | Plano | 0.210 | Glass | 1.517 | 64.2 | — |
| 15 | | | Plano | 0.590 | | | | |
| 16 | Image | | Plano | — | | | | |

Note:
Reference wavelength is 587.6 nm (d-line).

TABLE 2

Aspheric Coefficients

| | Surface # | | | | | |
|---|---|---|---|---|---|---|
| | 1 | 2 | 3 | 4 | 5 | 6 |
| k = | −3.1534E+00 | −1.0282E+00 | 7.3781E+01 | −6.9152E−01 | −1.0762E+01 | −6.7412E+00 |
| A4 = | −5.4359E−03 | 5.2178E−02 | −3.6272E−02 | 4.7104E−02 | −3.4289E−02 | −7.5930E−02 |
| A6 = | 3.2673E−04 | 2.8853E−03 | −5.6335E−03 | −5.3896E−02 | 7.5213E−02 | 8.3208E−02 |
| A8 = | −8.2720E−06 | −1.2934E−03 | −7.2116E−03 | 6.9680E−02 | −5.7773E−02 | −1.0242E−01 |
| A10 = | 8.3524E−08 | — | 7.9863E−03 | −4.3191E−02 | 3.0699E−02 | 5.8868E−02 |
| A12 = | — | — | −1.5071E−03 | 1.4756E−02 | −9.1300E−03 | −1.3259E−02 |
| A14 = | — | — | −5.2374E−06 | −7.1921E−04 | — | — |

| | Surface # | | | | | |
|---|---|---|---|---|---|---|
| | 8 | 9 | 10 | 11 | 12 | 13 |
| k = | −4.6635E+01 | −5.5896E−01 | −1.1063E+00 | 9.0000E+01 | −4.6895E+00 | −1.0591E+00 |
| A4 = | 1.0227E−01 | −2.3524E−02 | −1.2098E−01 | 1.2659E−01 | 5.1510E−02 | −3.3389E−03 |
| A6 = | −4.8501E−01 | −3.6132E−02 | −7.2382E−02 | −1.8601E−01 | −1.6413E−01 | −1.7928E−02 |
| A8 = | 7.9699E−01 | 1.4598E−01 | 8.1596E−02 | 1.1500E−01 | 1.8638E−01 | 9.2880E−03 |
| A10 = | −2.1284E+00 | −5.5783E−01 | −2.1025E−01 | −5.0537E−02 | −1.5518E−01 | −9.3607E−03 |
| A12 = | 2.6588E−01 | 6.4457E−01 | 7.7681E−02 | 1.6454E−02 | 8.2535E−02 | 7.7107E−03 |
| A14 = | — | −5.9884E−01 | −1.2843E−02 | −2.6557E−03 | −2.3312E−02 | −3.7040E−03 |
| A16 = | — | — | — | 1.8197E−04 | 2.8061E−03 | 8.4709E−04 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are related to the corresponding schematic and aberration curves figures in the drawing, and the definitions of the terms in the tables are the same as Table 1 and Table 2 of the 1st embodiment. Therefore, an explanation in this regard will not be provided again.

2nd Embodiment

Figure 3:
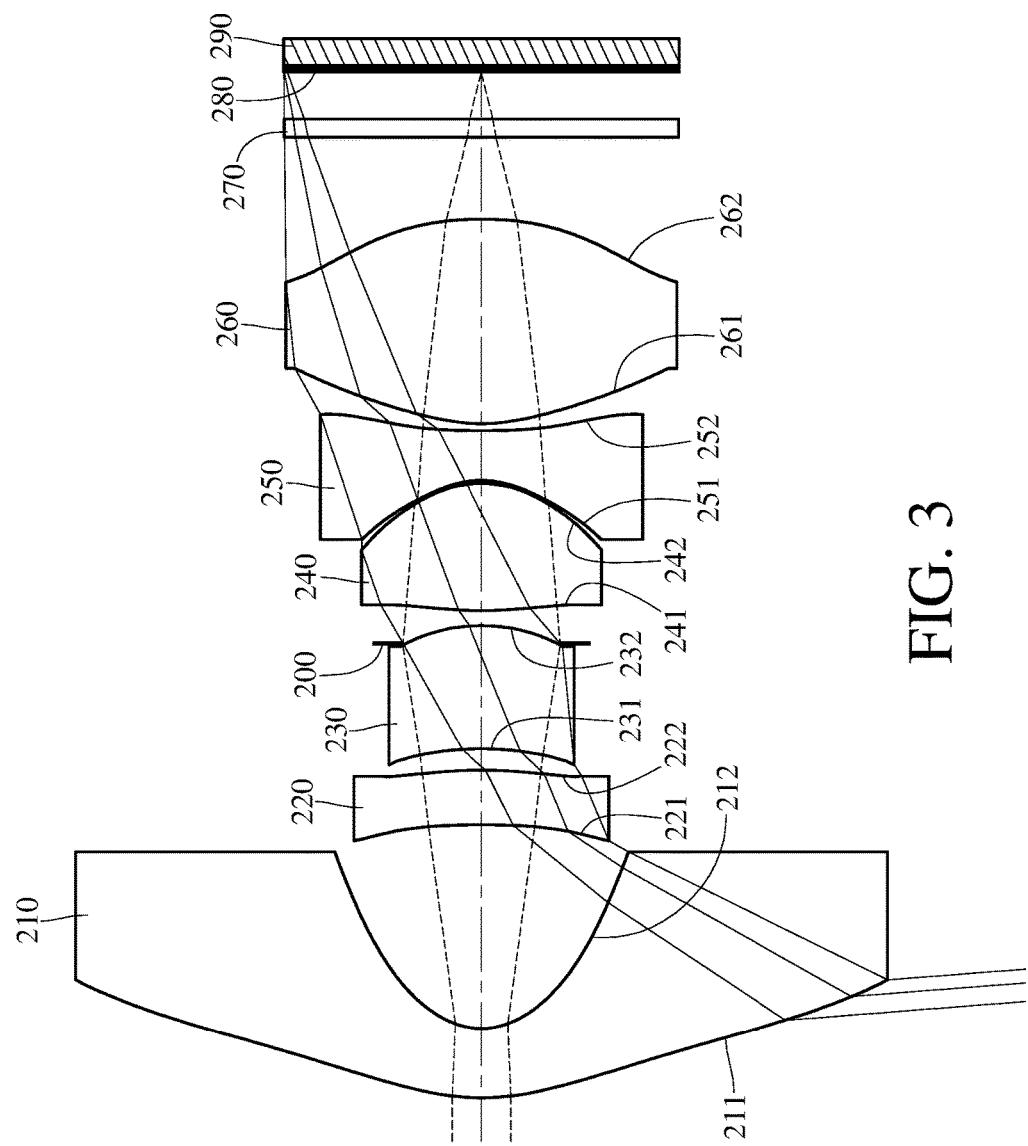
FIG. 3 is a schematic view of an image capturing unit according to the 2nd embodiment of the present disclosure.
Figure 4:
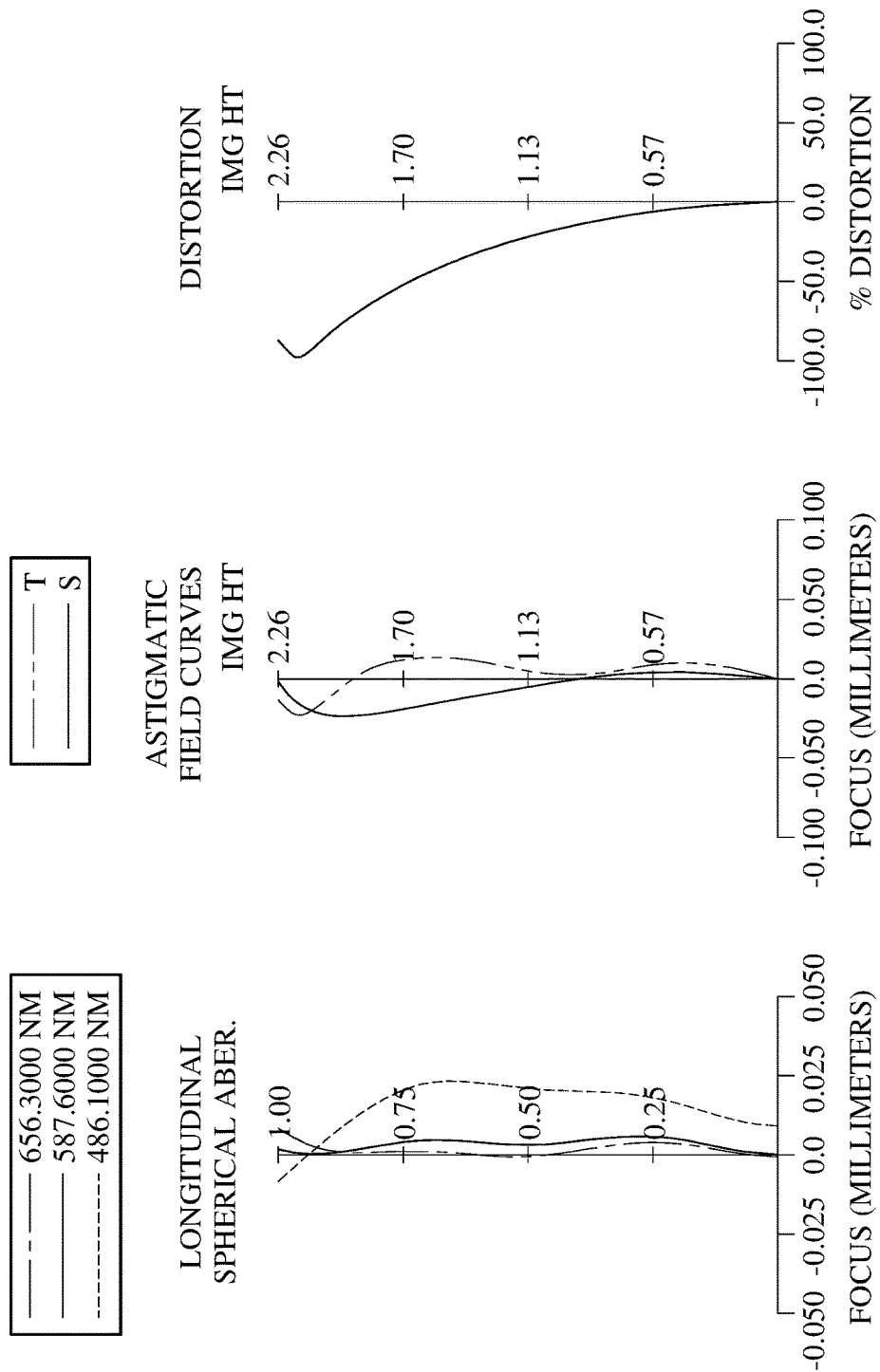
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens system (its reference numeral is omitted) of the present disclosure and an image sensor 290. The optical imaging lens system includes, in order from an object side to an image side, a first lens element 210, a second lens element 220, a third lens element 230, an aperture stop 200, a fourth lens element 240, a fifth lens element 250, a sixth lens element 260, a filter 270 and an image surface 280. The optical imaging lens system includes six lens elements (210, 220, 230, 240, 250 and 260) with no additional lens element disposed between the first lens element 210 and the sixth lens element 260.

The first lens element 210 with negative refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric.

The third lens element 230 with positive refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric. The image-side surface 252 of the fifth lens element 250 has at least one inflection point.

The sixth lens element 260 with positive refractive power has an object-side surface 261 being convex in a paraxial region thereof and an image-side surface 262 being convex in a paraxial region thereof. The sixth lens element 260 is made of plastic material and has the object-side surface 261 and the image-side surface 262 being both aspheric. The image-side surface 262 of the sixth lens element 260 has at least one inflection point.

The filter 270 is made of glass material and located between the sixth lens element 260 and the image surface 280, and will not affect the focal length of the optical imaging lens system. The image sensor 290 is disposed on or near the image surface 280 of the optical imaging lens system.

In this embodiment, a displacement in parallel with the optical axis from an axial vertex of the image-side surface 242 of the fourth lens element 240 to a maximum effective radius position of the image-side surface 242 thereof is SAG42, a displacement in parallel with the optical axis from an axial vertex of the object-side surface 251 of the fifth lens element 250 to a maximum effective radius position of the object-side surface 251 thereof is SAG51, the following condition is satisfied: |SAG51|<|SAG42|.

The detailed optical data of the 2nd embodiment are shown in Table 3 and the aspheric surface data are shown in Table 4 below.

TABLE 3

2nd Embodiment
f = 1.39 mm, Fno = 2.05, HFOV = 94.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.658 | (ASP) | 0.800 | Plastic | 1.545 | 56.0 | −2.64 |
| 2 | | 0.835 | (ASP) | 2.339 | | | | |
| 3 | Lens 2 | −9.801 | (ASP) | 0.626 | Plastic | 1.660 | 20.4 | 15.60 |
| 4 | | −5.149 | (ASP) | 0.247 | | | | |
| 5 | Lens 3 | −3.337 | (ASP) | 1.419 | Plastic | 1.639 | 23.3 | 5.63 |
| 6 | | −2.018 | (ASP) | −0.206 | | | | |
| 7 | Ape. Stop | Plano | | 0.378 | | | | |
| 8 | Lens 4 | 4.439 | (ASP) | 1.457 | Plastic | 1.544 | 55.9 | 2.28 |
| 9 | | −1.523 | (ASP) | 0.035 | | | | |
| 10 | Lens 5 | −1.164 | (ASP) | 0.580 | Plastic | 1.660 | 20.4 | −1.64 |
| 11 | | 18.452 | (ASP) | 0.080 | | | | |
| 12 | Lens 6 | 1.999 | (ASP) | 2.346 | Plastic | 1.544 | 55.9 | 2.82 |
| 13 | | −3.837 | (ASP) | 0.946 | | | | |
| 14 | Filter | Plano | | 0.210 | Glass | 1.517 | 64.2 | — |
| 15 | | Plano | | 0.538 | | | | |
| 16 | Image | Plano | | — | | | | |

Note:
Reference wavelength is 587.6 nm (d-line).

TABLE 4

Aspheric Coefficients

| | Surface # | | | | | |
|---|---|---|---|---|---|---|
| | 1 | 2 | 3 | 4 | 5 | 6 |
| k = | −6.0385E+00 | −1.0675E+00 | 1.9867E+01 | −6.6670E+00 | −2.6244E+01 | −8.0697E+00 |
| A4 = | −3.9619E−03 | 1.8247E−02 | −1.2007E−02 | 3.5086E−02 | −5.1841E−02 | −1.4821E−01 |
| A6 = | 2.8785E−04 | 2.9177E−02 | −1.6987E−02 | −4.6281E−02 | 4.7398E−02 | 1.0938E−01 |
| A8 = | −7.8539E−06 | −5.9018E−03 | 6.2015E−03 | 6.1397E−02 | −8.5570E−02 | −9.4372E−02 |
| A10 = | 8.5236E−08 | — | 2.7920E−03 | −4.3714E−02 | 6.4952E−02 | 5.2344E−02 |
| A12 = | — | — | −9.3763E−04 | 1.7218E−02 | −2.2950E−02 | −1.2634E−02 |
| A14 = | — | — | −5.2374E−06 | −7.1921E−04 | — | — |

TABLE 4-continued

Aspheric Coefficients

| Surface # | | | | | |
|---|---|---|---|---|---|
| 8 | 9 | 10 | 11 | 12 | 13 |
| k = −9.0000E+01 | −4.5083E−01 | −1.5262E+00 | −4.4458E−01 | −9.0744E+00 | −4.9872E+00 |
| A4 = 5.8156E−02 | −3.6309E−01 | −9.8130E−02 | 1.1749E−01 | 4.0580E−03 | −4.6698E−02 |
| A6 = −1.4920E−01 | 7.5131E−01 | 3.1536E−01 | −1.1541E−01 | −2.2548E−03 | 1.5672E−02 |
| A8 = 1.7258E−01 | −6.9602E−01 | −2.8602E−01 | 7.4246E−02 | 2.5102E−03 | −2.6099E−03 |
| A10 = −1.1343E−01 | 3.4306E−01 | 9.9256E−02 | −3.3473E−02 | −1.1468E−03 | −1.9762E−04 |
| A12 = 2.9561E−02 | −8.9659E−02 | −8.7764E−03 | 9.3933E−03 | 2.7952E−04 | 2.1584E−04 |
| A14 = — | 1.0127E−02 | −1.1213E−03 | −1.4594E−03 | −3.6280E−05 | −3.7361E−05 |
| A16 = — | — | — | 9.5902E−05 | 1.9660E−06 | 2.0433E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.39 | R2/SD12 | 0.50 |
| Fno | 2.05 | f/T12 | 0.59 |
| HFOV [deg.] | 94.5 | f/T34 | 8.08 |
| 1/tan(HFOV) | −0.08 | f/R3 + f/R4 | −0.41 |
| Nmax | 1.660 | |f1/f2| | 0.17 |
| V2 + V3 | 43.7 | Σ|f/fi| | 2.81 |
| V2*Fno/10 | 4.18 | f/EPD | 2.05 |
| CT2/CT3 | 0.44 | f/fG1 | 0.25 |
| T56/T23 | 0.32 | |P2| + |P3| | 0.34 |
| ΣAT/T12 | 1.23 | (|P2| + |P3|)/|P1| | 0.64 |
| (R2 + R4)/(R2 − R4) | −0.72 | |BL/SAG12| | 0.83 |
| |(R8 − R9)/(R8 + R9)| | 0.13 | SL/CT6 | 2.80 |
| |(R9 − R10)/(R9 + R10)| | 1.13 | SD62/SD11 | 0.48 |
| |R11/R10| | 0.11 | SAG52/SAG61 | 0.29 |

3rd Embodiment

Figure 5:
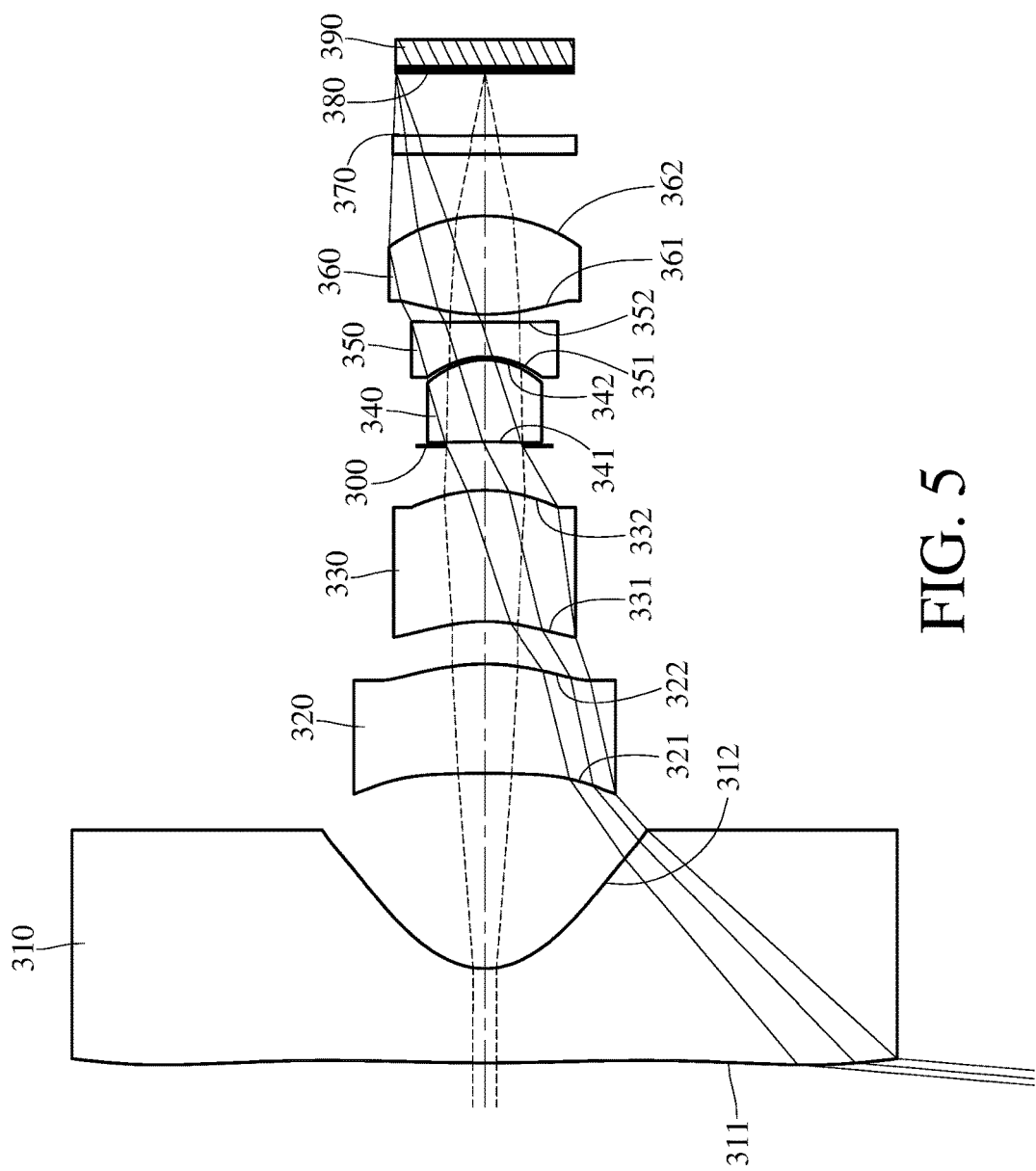
FIG. 5 is a schematic view of an image capturing unit according to the 3rd embodiment of the present disclosure.
Figure 6:
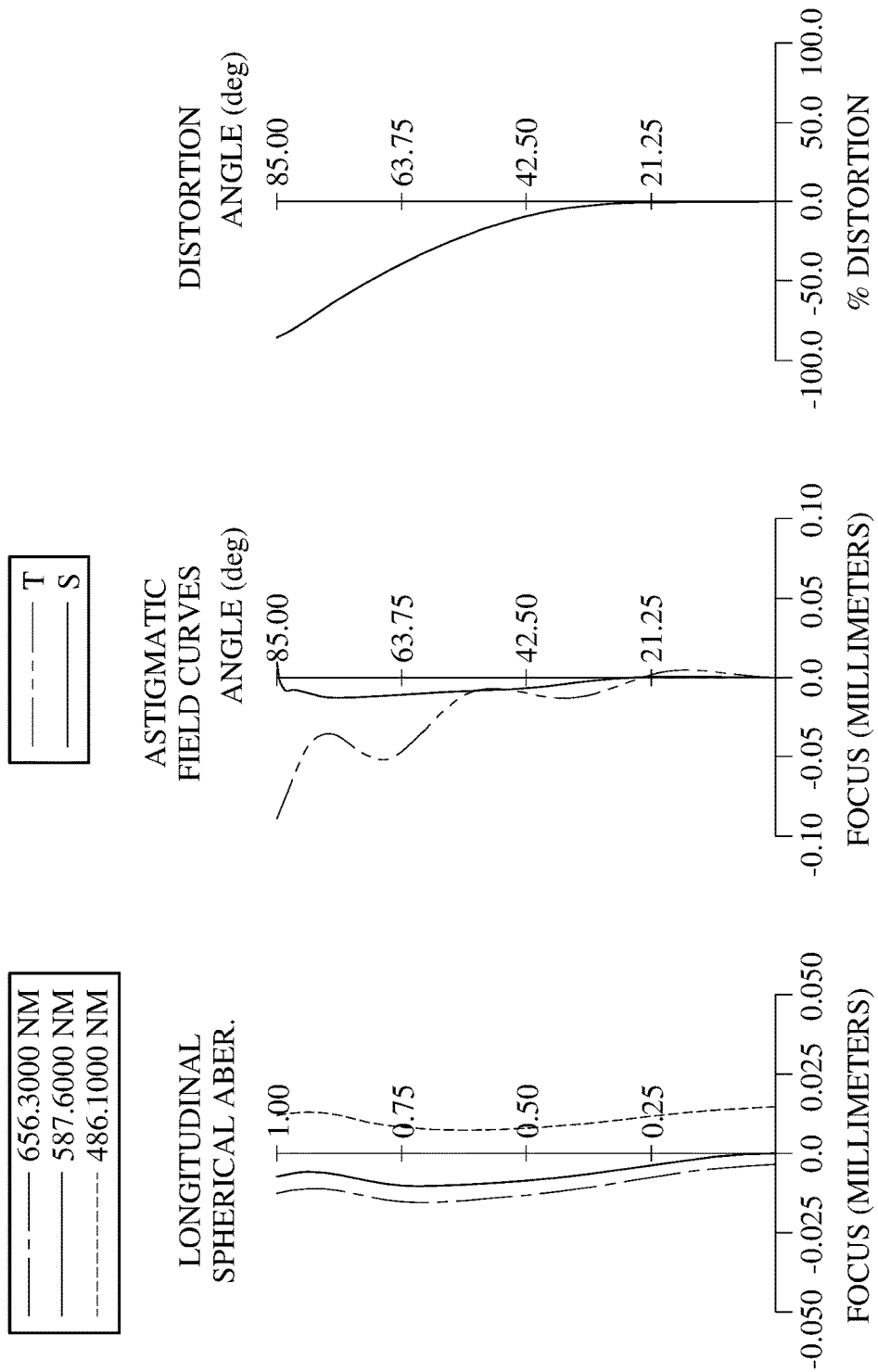
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens system (its reference numeral is omitted) of the present disclosure and an image sensor 390. The optical imaging lens system includes, in order from an object side to an image side, a first lens element 310, a second lens element 320, a third lens element 330, an aperture stop 300, a fourth lens element 340, a fifth lens element 350, a sixth lens element 360, a filter 370 and an image surface 380. The optical imaging lens system includes six lens elements (310, 320, 330, 340, 350 and 360) with no additional lens element disposed between the first lens element 310 and the sixth lens element 360.

The first lens element 310 with negative refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with positive refractive power has an object-side surface 331 being concave in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The image-side surface 352 of the fifth lens element 350 has at least one inflection point.

The sixth lens element 360 with positive refractive power has an object-side surface 361 being convex in a paraxial region thereof and an image-side surface 362 being convex in a paraxial region thereof. The sixth lens element 360 is made of plastic material and has the object-side surface 361 and the image-side surface 362 being both aspheric. The object-side surface 361 of the sixth lens element 360 has at least one inflection point.

The filter 370 is made of glass material and located between the sixth lens element 360 and the image surface 380, and will not affect the focal length of the optical imaging lens system. The image sensor 390 is disposed on or near the image surface 380 of the optical imaging lens system.

In this embodiment, a displacement in parallel with the optical axis from an axial vertex of the image-side surface 342 of the fourth lens element 340 to a maximum effective radius position of the image-side surface 342 thereof is SAG42, a displacement in parallel with the optical axis from an axial vertex of the object-side surface 351 of the fifth lens element 350 to a maximum effective radius position of the object-side surface 351 thereof is SAG51, the following condition is satisfied: |SAG51|<|SAG42|.

The detailed optical data of the 3rd embodiment are shown in Table 5 and the aspheric surface data are shown in Table 6 below.

TABLE 5

3rd Embodiment
f = 0.67 mm, Fno = 2.48, HFOV = 85.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 25.471 | (ASP) | 1.071 | Plastic | 1.534 | 55.9 | −1.77 |
| 2 | | 0.899 | (ASP) | 2.223 | | | | |
| 3 | Lens 2 | −19.073 | (ASP) | 1.240 | Plastic | 1.650 | 21.5 | 4.45 |
| 4 | | −2.577 | (ASP) | 0.483 | | | | |
| 5 | Lens 3 | −1.875 | (ASP) | 1.497 | Plastic | 1.534 | 55.9 | 7.06 |
| 6 | | −1.600 | (ASP) | 0.503 | | | | |
| 7 | Ape. Stop | Plano | | 0.047 | | | | |
| 8 | Lens 4 | −13.630 | (ASP) | 0.928 | Plastic | 1.544 | 56.0 | 1.70 |
| 9 | | −0.888 | (ASP) | 0.036 | | | | |
| 10 | Lens 5 | −0.946 | (ASP) | 0.402 | Plastic | 1.660 | 20.4 | −1.50 |
| 11 | | −23.937 | (ASP) | 0.087 | | | | |
| 12 | Lens 6 | 2.442 | (ASP) | 1.119 | Plastic | 1.534 | 55.9 | 2.12 |
| 13 | | −1.780 | (ASP) | 0.700 | | | | |
| 14 | Filter | Plano | | 0.210 | Glass | 1.517 | 64.2 | — |
| 15 | | Plano | | 0.710 | | | | |
| 16 | Image | Plano | | — | | | | |

Note:
Reference wavelength is 587.6 nm (d-line).

TABLE 6

Aspheric Coefficients

| Surface # | | | | | | |
|---|---|---|---|---|---|---|
| | 1 | 2 | 3 | 4 | 5 | 6 |
| k = | 4.8920E+00 | −1.2935E+00 | 6.5162E+01 | −6.6545E−01 | −1.1195E+01 | −6.4006E+00 |
| A4 = | −2.2670E+00 | 5.8076E−02 | −3.7133E−02 | 4.9509E−02 | −2.4824E−02 | −8.2284E−02 |
| A6 = | 3.8814E+00 | −4.4857E−02 | −5.9549E−03 | −5.3142E−02 | −3.7361E−03 | 1.2560E−01 |
| A8 = | −3.5040E+00 | 3.2429E−02 | −7.2119E−03 | 6.9654E−02 | 1.2157E−01 | −2.4061E−01 |
| A10 = | 2.4194E+00 | −1.5208E−02 | 8.0336E−03 | −4.3234E−02 | −1.2910E−01 | 2.3741E−01 |
| A12 = | −1.2451E+00 | 3.0459E−03 | −1.5071E−03 | 1.4756E−02 | 4.1501E−02 | −9.0896E−02 |
| A14 = | 3.0549E−01 | −1.8563E−04 | −5.2374E−06 | −7.1921E−04 | — | — |

| Surface # | | | | | | |
|---|---|---|---|---|---|---|
| | 8 | 9 | 10 | 11 | 12 | 13 |
| k = | −4.6635E+01 | −5.8319E−01 | −1.0745E+00 | 8.9600E+01 | −4.6042E+00 | −1.0930E+00 |
| A4 = | 5.8847E−02 | −1.2492E−01 | −5.2258E−02 | 1.6013E−01 | 3.9488E−02 | 1.7374E−02 |
| A6 = | −5.6426E−01 | 1.1579E+00 | 6.3286E−01 | −4.0032E−01 | −1.0308E−01 | −1.8273E−01 |
| A8 = | 4.2707E+00 | −5.5649E+00 | −4.5056E+00 | 4.6169E−01 | 1.0353E−01 | 6.1676E−01 |
| A10 = | −2.3415E+01 | 1.3553E+01 | 1.4085E+01 | 5.9091E−01 | −1.7752E−01 | −1.0879E+00 |
| A12 = | 4.4259E+01 | −1.7431E+01 | −2.1751E+01 | −2.7434E+00 | 2.0611E−01 | 9.6421E−01 |
| A14 = | — | 9.4168E+00 | 1.3155E+01 | 3.2483E+00 | −9.5920E−02 | −4.0812E−01 |
| A16 = | — | — | — | −1.3190E+00 | 7.5607E−03 | 6.3774E−02 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 0.67 | R2/SD12 | 0.49 |
| Fno | 2.48 | f/T12 | 0.30 |
| HFOV [deg.] | 85.0 | f/T34 | 1.22 |
| 1/tan(HFOV) | 0.09 | f/R3 + f/R4 | −0.30 |

-continued

| 3rd Embodiment | | | |
|---|---|---|---|
| Nmax | 1.660 | |f1/f2| | 0.40 |
| V2 + V3 | 77.4 | Σ|f/fi| | 1.78 |
| V2*Fno/10 | 5.33 | f/EPD | 2.48 |
| CT2/CT3 | 0.83 | f/fG1 | 0.28 |
| T56/T23 | 0.18 | |P2| + |P3| | 0.25 |
| ΣAT/T12 | 1.52 | (|P2| + |P3|)/|P1| | 0.65 |
| (R2 + R4)/(R2 − R4) | −0.48 | |BL/SAG12| | 1.03 |
| |(R8 − R9)/(R8 + R9)| | 0.03 | SL/CT6 | 3.79 |
| |(R9 − R10)/(R9 + R10)| | 0.92 | SD62/SD11 | 0.23 |
| |R11/R10| | 0.10 | SAG52/SAG61 | 0.03 |

4th Embodiment

Figure 7:
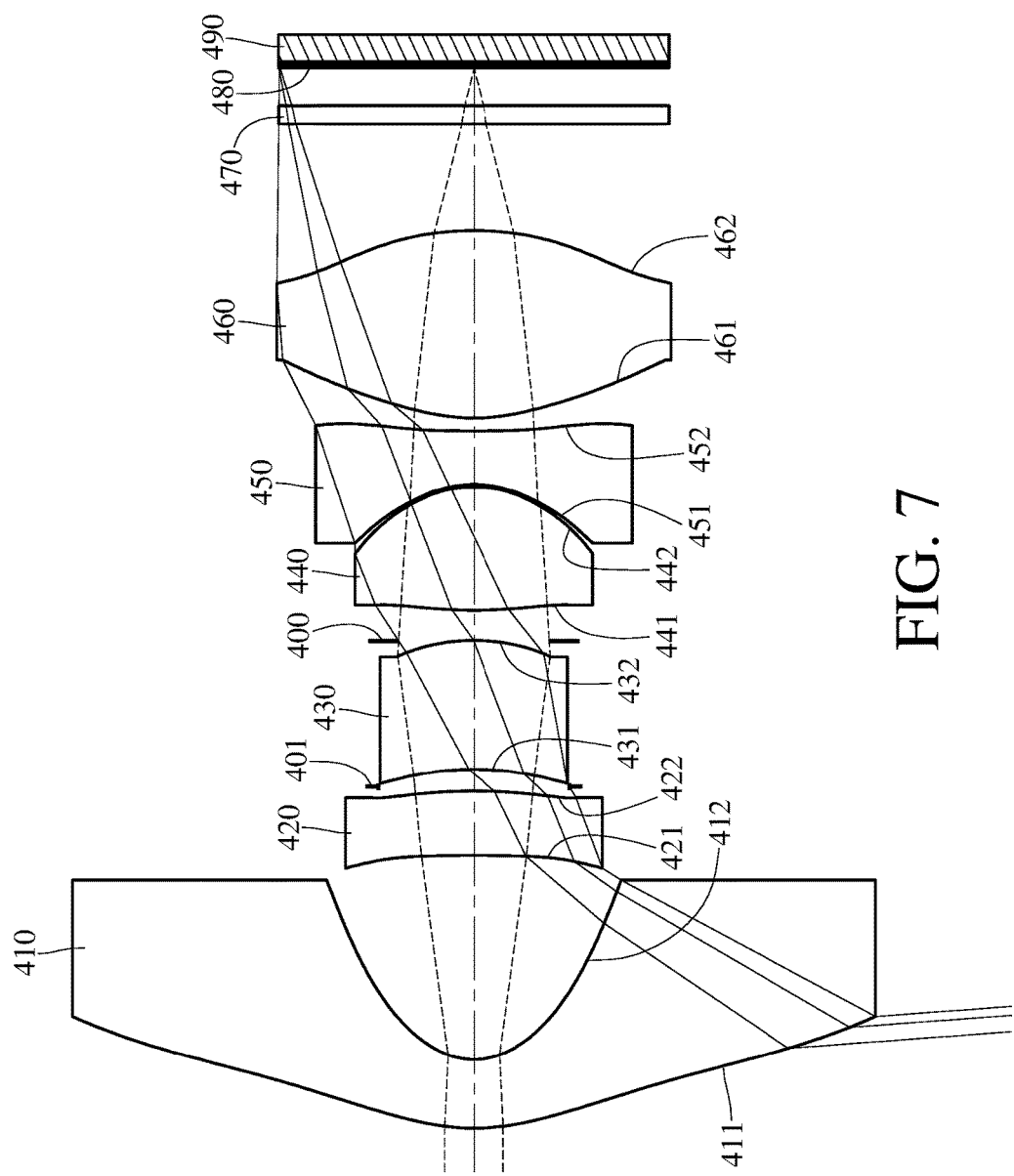
FIG. 7 is a schematic view of an image capturing unit according to the 4th embodiment of the present disclosure.

FIG. 7 is a schematic view of an image capturing unit according to the 4th embodiment of the present disclosure.

Figure 8:
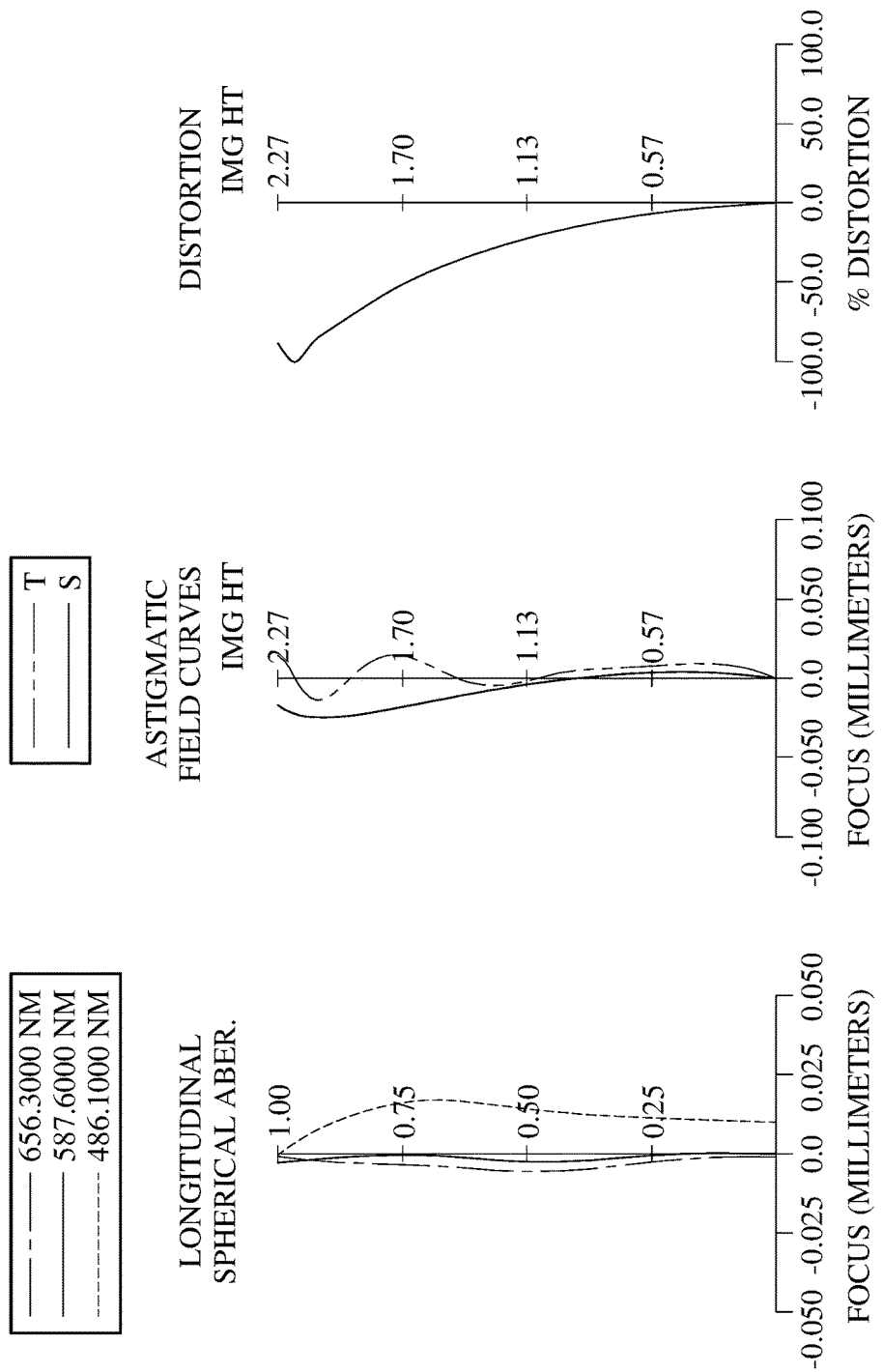
FIG. 8 shows spherical aberration curves, astigmatic field curves and a distortion curve of the image capturing unit according to the 4th embodiment.

FIG. 8 shows, in order from left to right, spherical aberration curves, astigmatic field curves and a distortion curve of the image capturing unit according to the 4th embodiment. In FIG. 7, the image capturing unit includes the optical imaging lens system (its reference numeral is omitted) of the present disclosure and an image sensor 490. The optical imaging lens system includes, in order from an object side to an image side, a first lens element 410, a second lens element 420, a stop 401, a third lens element 430, an aperture stop 400, a fourth lens element 440, a fifth lens element 450, a sixth lens element 460, a filter 470 and an image surface 480. The optical imaging lens system includes six lens elements (410, 420, 430, 440, 450 and 460) with no additional lens element disposed between the first lens element 410 and the sixth lens element 460.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with positive refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being concave in a paraxial region thereof. The fifth lens element 450 is made of plastic material and has the object-side surface 451 and the image-side surface 452 being both aspheric. The image-side surface 452 of the fifth lens element 450 has at least one inflection point.

The sixth lens element 460 with positive refractive power has an object-side surface 461 being convex in a paraxial region thereof and an image-side surface 462 being convex in a paraxial region thereof. The sixth lens element 460 is made of plastic material and has the object-side surface 461 and the image-side surface 462 being both aspheric. The image-side surface 462 of the sixth lens element 460 has at least one inflection point.

The filter 470 is made of glass material and located between the sixth lens element 460 and the image surface 480, and will not affect the focal length of the optical imaging lens system. The image sensor 490 is disposed on or near the image surface 480 of the optical imaging lens system.

In this embodiment, a displacement in parallel with the optical axis from an axial vertex of the image-side surface 442 of the fourth lens element 440 to a maximum effective radius position of the image-side surface 442 thereof is SAG42, a displacement in parallel with the optical axis from an axial vertex of the object-side surface 451 of the fifth lens element 450 to a maximum effective radius position of the object-side surface 451 thereof is SAG51, the following condition is satisfied: |SAG51|<|SAG42|.

The detailed optical data of the 4th embodiment are shown in Table 7 and the aspheric surface data are shown in Table 8 below.

TABLE 7

4th Embodiment
f = 1.40 mm, Fno = 2.05, HFOV = 94.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.463 | (ASP) | 0.800 | Plastic | 1.545 | 56.0 | −2.70 |
| 2 | | 0.815 | (ASP) | 2.374 | | | | |
| 3 | Lens 2 | −26.833 | (ASP) | 0.749 | Plastic | 1.660 | 20.4 | 11.28 |
| 4 | | −5.890 | (ASP) | 0.050 | | | | |
| 5 | Stop | Plano | | 0.204 | | | | |
| 6 | Lens 3 | −3.303 | (ASP) | 1.500 | Plastic | 1.639 | 23.3 | 7.05 |
| 7 | | −2.243 | (ASP) | −0.006 | | | | |
| 8 | Ape. Stop | Plano | | 0.356 | | | | |
| 9 | Lens 4 | 5.201 | (ASP) | 1.432 | Plastic | 1.544 | 55.9 | 2.36 |
| 10 | | −1.535 | (ASP) | 0.035 | | | | |
| 11 | Lens 5 | −1.266 | (ASP) | 0.620 | Plastic | 1.660 | 20.4 | −1.81 |
| 12 | | 25.046 | (ASP) | 0.150 | | | | |
| 13 | Lens 6 | 2.157 | (ASP) | 2.176 | Plastic | 1.544 | 55.9 | 2.90 |
| 14 | | −3.797 | (ASP) | 1.246 | | | | |
| 15 | Filter | Plano | | 0.210 | Glass | 1.517 | 64.2 | — |
| 16 | | Plano | | 0.440 | | | | |
| 17 | Image | Plano | | — | | | | |

Note:
Reference wavelength is 587.6 nm (d-line).
An effective radius of the stop 401 (Surface 5) is 1.110 mm.

TABLE 8

Aspheric Coefficients

| Surface # | 1 | 2 | 3 | 4 | 6 | 7 |
|---|---|---|---|---|---|---|
| k = | −5.8736E+00 | −9.1801E−01 | 8.9596E+01 | 8.3391E+00 | −2.6244E+01 | −1.0475E+01 |
| A4 = | −4.7146E−03 | −2.6488E−02 | −1.2658E−02 | 2.4500E−02 | −6.4706E−02 | −1.2246E−01 |
| A6 = | 3.3907E−04 | 3.2562E−02 | −8.5867E−03 | −3.4147E−02 | 5.3289E−02 | 9.0189E−02 |
| A8 = | −9.5116E−06 | −6.7394E−03 | −7.3992E−03 | 4.3018E−02 | −4.1596E−02 | −6.7992E−02 |
| A10 = | 1.0422E−07 | — | 7.6975E−03 | −2.6934E−02 | 2.2502E−02 | 3.4367E−02 |
| A12 = | — | — | −1.5071E−03 | 1.1437E−02 | −4.7925E−03 | −8.3083E−03 |
| A14 = | — | — | −5.2374E−06 | −7.1921E−04 | — | — |

| Surface # | 9 | 10 | 11 | 12 | 13 | 14 |
|---|---|---|---|---|---|---|
| k = | −9.0000E+01 | −4.0604E−01 | −1.4078E+00 | −4.4458E−01 | −8.1556E+00 | −1.0187E+01 |
| A4 = | 4.0963E−02 | −2.1903E−01 | −4.0417E−02 | 8.1279E−02 | 5.3096E−03 | −5.1215E−02 |
| A6 = | −9.8558E−02 | 4.2002E−01 | 1.2412E−01 | −9.2612E−02 | −4.7938E−03 | 2.2508E−02 |
| A8 = | 1.2436E−01 | −3.4762E−01 | −6.7173E−02 | 6.5745E−02 | 4.7000E−03 | −7.7098E−03 |
| A10 = | −9.4363E−02 | 1.4409E−01 | −3.3424E−02 | −3.2902E−02 | −2.0868E−03 | 2.2049E−03 |
| A12 = | 2.6383E−02 | −3.1877E−02 | 3.2562E−02 | 1.0154E−02 | 4.8696E−04 | −3.6718E−04 |
| A14 = | — | 3.5383E−03 | −6.0734E−03 | −1.7104E−03 | −5.9052E−05 | 2.9234E−05 |
| A16 = | — | — | — | 1.2069E−04 | 2.9494E−06 | −8.2311E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.40 | R2/SD12 | 0.48 |
| Fno | 2.05 | f/T12 | 0.59 |
| HFOV [deg.] | 94.3 | f/T34 | 3.99 |
| 1/tan(HFOV) | −0.08 | f/R3 + f/R4 | −0.29 |
| Nmax | 1.660 | |f1/f2| | 0.24 |
| V2 + V3 | 43.7 | Σ|f/fi| | 2.69 |
| V2*Fno/10 | 4.18 | f/EPD | 2.05 |
| CT2/CT3 | 0.50 | f/fG1 | 0.19 |
| T56/T23 | 0.59 | |P2| + |P3| | 0.32 |
| ΣAT/T12 | 1.33 | (|P2| + |P3|)/|P1| | 0.62 |
| (R2 + R4)/(R2 − R4) | −0.76 | |BL/SAG12| | 0.91 |
| |(R8 − R9)/(R8 + R9)| | 0.10 | SL/CT6 | 3.06 |
| |(R9 − R10)/(R9 + R10)| | 1.11 | SD62/SD11 | 0.49 |
| |R11/R10| | 0.09 | SAG52/SAG61 | 0.09 |

5th Embodiment

Figure 9:
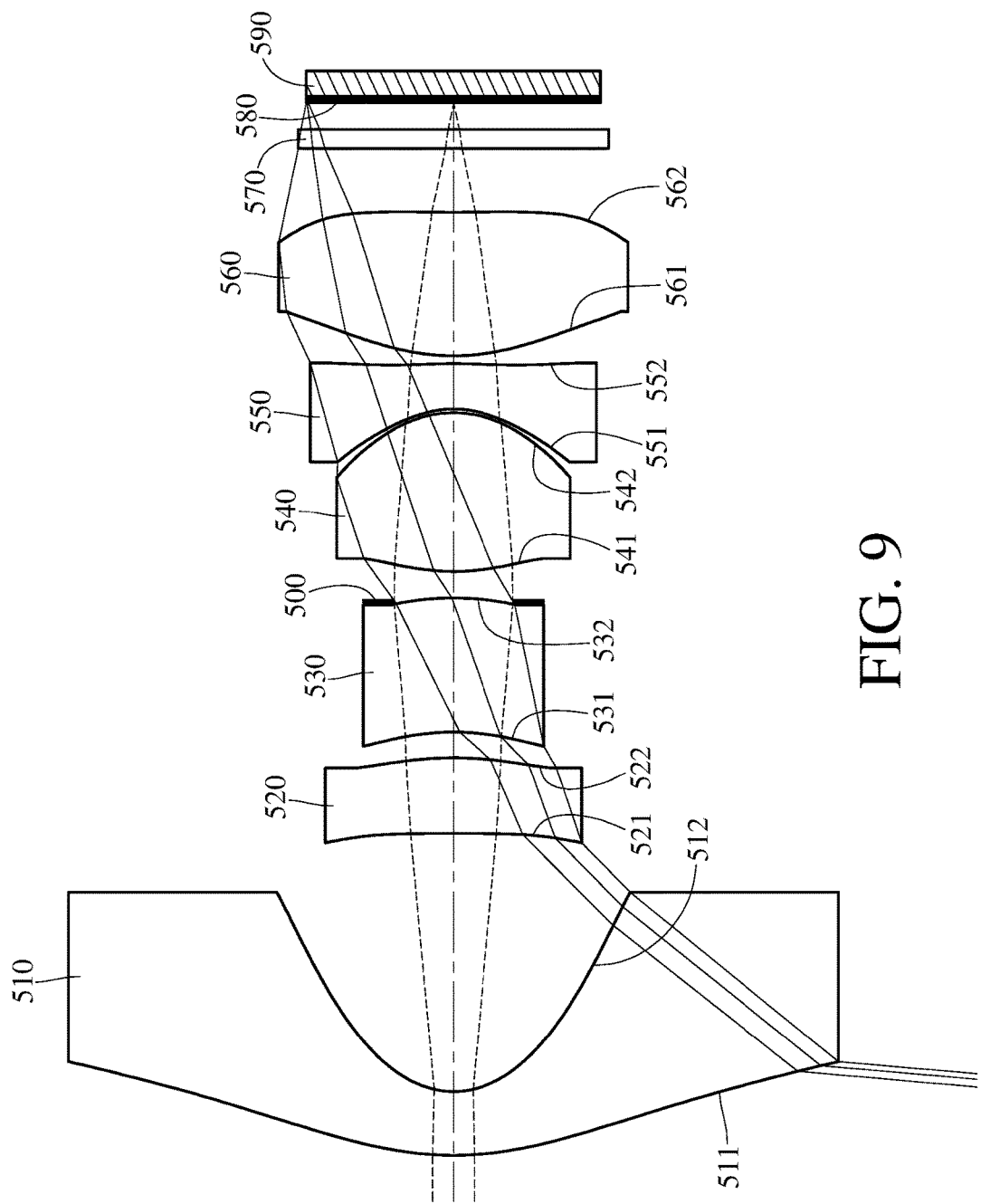
FIG. 9 is a schematic view of an image capturing unit according to the 5th embodiment of the present disclosure.
Figure 10:
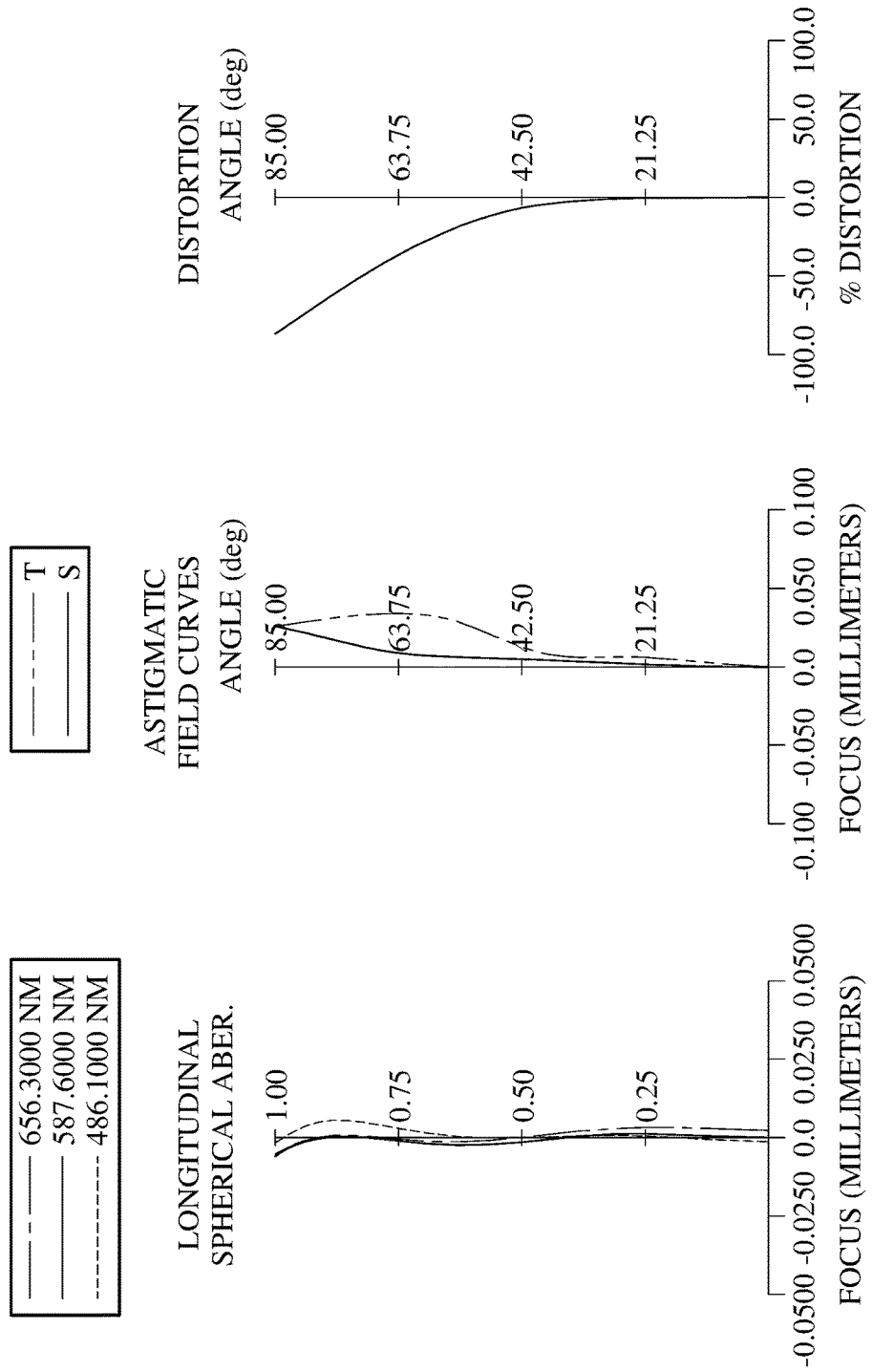
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens system (its reference numeral is omitted) of the present disclosure and an image sensor 590. The optical imaging lens system includes, in order from an object side to an image side, a first lens element 510, a second lens element 520, a third lens element 530, an aperture stop 500, a fourth lens element 540, a fifth lens element 550, a sixth lens element 560, a filter 570 and an image surface 580. The optical imaging lens system includes six lens elements (510, 520, 530, 540, 550 and 560) with no additional lens element disposed between the first lens element 510 and the sixth lens element 560.

The first lens element 510 with negative refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric.

The third lens element 530 with negative refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The image-side surface 552 of the fifth lens element 550 has at least one inflection point.

The sixth lens element 560 with positive refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. Both the object-side surface 561 and the image-side surface 562 of the sixth lens element 560 have at least one inflection point.

The filter 570 is made of glass material and located between the sixth lens element 560 and the image surface 580, and will not affect the focal length of the optical imaging lens system. The image sensor 590 is disposed on or near the image surface 580 of the optical imaging lens system.

In this embodiment, a displacement in parallel with the optical axis from an axial vertex of the image-side surface 542 of the fourth lens element 540 to a maximum effective radius position of the image-side surface 542 thereof is SAG42, a displacement in parallel with the optical axis from an axial vertex of the object-side surface 551 of the fifth lens element 550 to a maximum effective radius position of the object-side surface 551 thereof is SAG51, the following condition is satisfied: |SAG51|<|SAG42|.

The detailed optical data of the 5th embodiment are shown in Table 9 and the aspheric surface data are shown in Table 10 below.

TABLE 9

5th Embodiment
f = 1.10 mm, Fno = 2.40, HFOV = 85.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.524 | (ASP) | 0.700 | Plastic | 1.545 | 56.1 | −2.55 |
| 2 | | 0.928 | (ASP) | 2.839 | | | | |
| 3 | Lens 2 | −44.439 | (ASP) | 0.836 | Plastic | 1.671 | 19.5 | 5.85 |
| 4 | | −3.631 | (ASP) | 0.284 | | | | |
| 5 | Lens 3 | −2.484 | (ASP) | 1.470 | Plastic | 1.639 | 23.3 | −27.66 |
| 6 | | −3.557 | (ASP) | −0.033 | | | | |
| 7 | Ape. Stop | Plano | | 0.325 | | | | |
| 8 | Lens 4 | 2.317 | (ASP) | 1.747 | Plastic | 1.544 | 56.0 | 1.86 |
| 9 | | −1.314 | (ASP) | 0.040 | | | | |
| 10 | Lens 5 | −1.151 | (ASP) | 0.500 | Plastic | 1.671 | 19.5 | −2.27 |
| 11 | | −5.572 | (ASP) | 0.085 | | | | |
| 12 | Lens 6 | 2.388 | (ASP) | 1.581 | Plastic | 1.544 | 56.0 | 4.92 |
| 13 | | 16.949 | (ASP) | 0.700 | | | | |
| 14 | Filter | Plano | | 0.210 | Glass | 1.517 | 64.2 | — |
| 15 | | Plano | | 0.293 | | | | |
| 16 | Image | Plano | | — | | | | |

Note:
Reference wavelength is 587.6 nm (d-line).

TABLE 10

Aspheric Coefficients

| | Surface # | | | | | |
|---|---|---|---|---|---|---|
| | 1 | 2 | 3 | 4 | 5 | 6 |
| k = | −3.3406E+00 | −1.0680E+00 | −8.3035E+01 | −2.9994E+00 | −1.8477E+01 | −1.1867E+01 |
| A4 = | −5.3506E−03 | 4.1746E−02 | −1.4873E−02 | 4.8989E−02 | −6.2884E−02 | −9.5252E−02 |
| A6 = | 3.3862E−04 | −1.0288E−03 | −6.0479E−03 | −5.6728E−02 | 6.7385E−02 | 6.8743E−02 |
| A8 = | −1.0508E−05 | −1.1889E−03 | −7.2661E−03 | 5.8885E−02 | −5.1548E−02 | −6.1170E−02 |
| A10 = | 1.2873E−07 | — | 7.4889E−03 | −3.5617E−02 | 3.3635E−02 | 3.6300E−02 |
| A12 = | — | — | −1.5071E−03 | 1.4756E−02 | −9.1300E−03 | −1.3259E−02 |
| A14 = | — | — | −5.2374E−06 | −7.1921E−04 | — | — |

| | Surface # | | | | | |
|---|---|---|---|---|---|---|
| | 8 | 9 | 10 | 11 | 12 | 13 |
| k = | −2.0802E+01 | −5.2054E−01 | −1.4677E+00 | −3.3703E+01 | −3.2092E+00 | −9.7230E−01 |
| A4 = | 1.0353E−01 | −1.6272E−01 | 2.8446E−01 | 1.5579E−01 | −7.5036E−02 | −6.5568E−02 |
| A6 = | −2.0829E−01 | 3.0131E−01 | −3.7011E−02 | −1.6761E−01 | 8.1366E−03 | 5.3971E−02 |
| A8 = | 2.2438E−01 | −2.0222E−01 | 1.3386E−01 | 1.1859E−01 | −9.8674E−03 | −3.3788E−02 |
| A10 = | −1.5187E−01 | 5.0367E−02 | −1.6346E−01 | −5.6328E−02 | 5.3332E−03 | 9.7718E−03 |
| A12 = | 4.0983E−02 | 1.2600E−03 | 7.7681E−02 | 1.6454E−02 | −1.6085E−03 | −1.1821E−03 |
| A14 = | — | −1.3563E−03 | −1.2843E−02 | −2.6557E−03 | 2.6291E−04 | −2.0804E−06 |
| A16 = | — | — | — | 1.8197E−04 | −1.7296E−05 | 9.3636E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.10 | R2/SD12 | 0.48 |
| Fno | 2.40 | f/T12 | 0.39 |
| HFOV [deg.] | 85.0 | f/T34 | 3.78 |
| 1/tan(HFOV) | 0.09 | f/R3 + f/R4 | −0.33 |
| Nmax | 1.671 | |f1/f2| | 0.44 |
| V2 + V3 | 42.8 | Σ|f/fi| | 1.97 |
| V2*Fno/10 | 4.68 | f/EPD | 2.40 |
| CT2/CT3 | 0.57 | f/fG1 | −0.10 |
| T56/T23 | 0.30 | |P2| + |P3| | 0.23 |
| ΣAT/T12 | 1.25 | (|P2| + |P3|)/|P1| | 0.53 |
| (R2 + R4)/(R2 − R4) | −0.59 | |BL/SAG12| | 0.55 |
| |(R8 − R9)/(R8 + R9)| | 0.07 | SL/CT6 | 3.47 |
| |(R9 − R10)/(R9 + R10)| | 0.66 | SD62/SD11 | 0.45 |
| |R11/R10| | 0.43 | SAG52/SAG61 | 0.01 |

6th Embodiment

Figure 11:
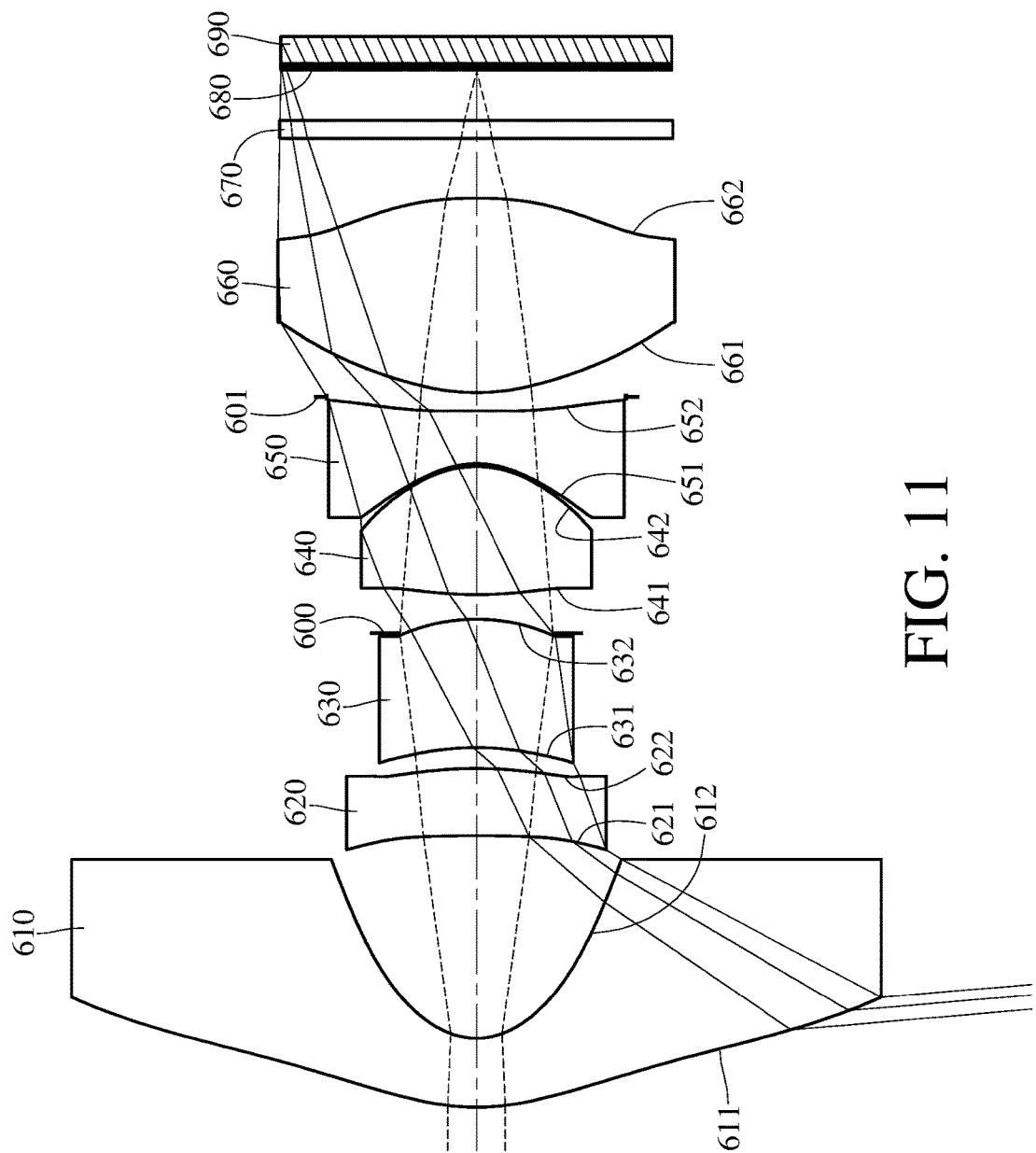
FIG. 11 is a schematic view of an image capturing unit according to the 6th embodiment of the present disclosure.
Figure 12:
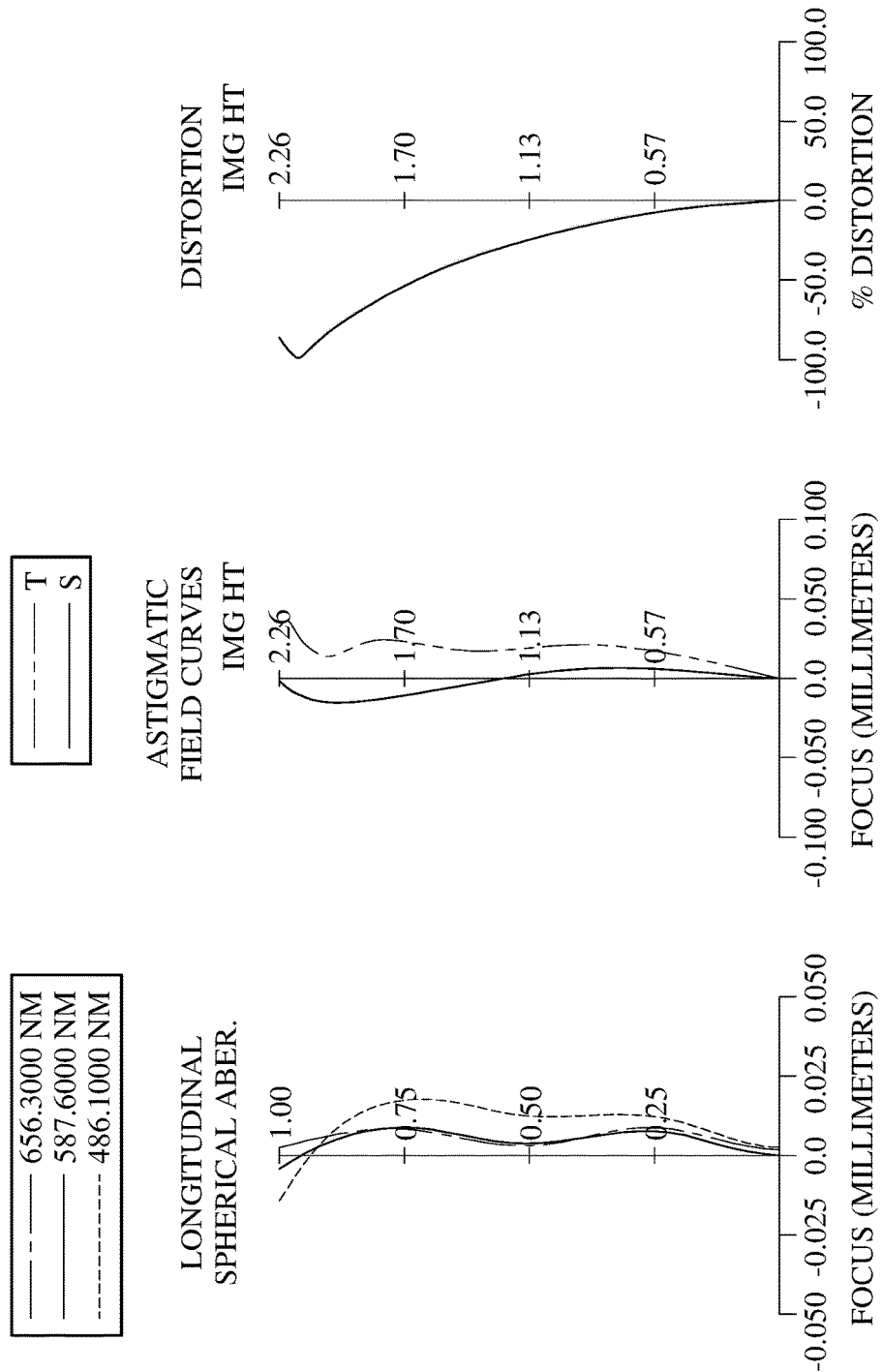
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens system (its reference numeral is omitted) of the present disclosure and an image sensor 690. The optical imaging lens system includes, in order from an object side to an image side, a first lens element 610, a second lens element 620, a third lens element 630, an aperture stop 600, a fourth lens element 640, a fifth lens element 650, a stop 601, a sixth lens element 660, a filter 670 and an image surface 680. The optical imaging lens system includes six lens elements (610, 620, 630, 640, 650 and 660) with no additional lens element disposed between the first lens element 610 and the sixth lens element 660.

The first lens element 610 with negative refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric.

The third lens element 630 with positive refractive power has an object-side surface 631 being concave in a paraxial region thereof and an image-side surface 632 being convex in a paraxial region thereof. The third lens element 630 is made of plastic material and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. The image-side surface 652 of the fifth lens element 650 has at least one inflection point.

The sixth lens element 660 with positive refractive power has an object-side surface 661 being convex in a paraxial region thereof and an image-side surface 662 being convex in a paraxial region thereof. The sixth lens element 660 is made of plastic material and has the object-side surface 661 and the image-side surface 662 being both aspheric. The image-side surface 662 of the sixth lens element 660 has at least one inflection point.

The filter 670 is made of glass material and located between the sixth lens element 660 and the image surface 680, and will not affect the focal length of the optical imaging lens system. The image sensor 690 is disposed on or near the image surface 680 of the optical imaging lens system.

In this embodiment, a displacement in parallel with the optical axis from an axial vertex of the image-side surface 642 of the fourth lens element 640 to a maximum effective radius position of the image-side surface 642 thereof is SAG42, a displacement in parallel with the optical axis from an axial vertex of the object-side surface 651 of the fifth lens element 650 to a maximum effective radius position of the object-side surface 651 thereof is SAG51, the following condition is satisfied: |SAG51|<|SAG42|.

The detailed optical data of the 6th embodiment are shown in Table 11 and the aspheric surface data are shown in Table 12 below.

TABLE 11

6th Embodiment
f = 1.38 mm, Fno = 2.05, HFOV = 94.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.622 | (ASP) | 0.800 | Plastic | 1.545 | 56.1 | −2.60 |
| 2 | | 0.821 | (ASP) | 2.361 | | | | |
| 3 | Lens 2 | −22.932 | (ASP) | 0.781 | Plastic | 1.660 | 20.4 | 9.19 |
| 4 | | −4.861 | (ASP) | 0.243 | | | | |
| 5 | Lens 3 | −3.210 | (ASP) | 1.500 | Plastic | 1.639 | 23.3 | 7.38 |
| 6 | | −2.257 | (ASP) | −0.163 | | | | |
| 7 | Ape. Stop | Plano | | 0.447 | | | | |

TABLE 11-continued

6th Embodiment
f = 1.38 mm, Fno = 2.05, HFOV = 94.9 deg.

| Surface # | | Curvature Radius | | Thickness | Material | Index | Abbe # | Focal Length |
|---|---|---|---|---|---|---|---|---|
| 8 | Lens 4 | 4.142 | (ASP) | 1.488 | Plastic | 1.544 | 56.0 | 2.07 |
| 9 | | −1.351 | (ASP) | 0.035 | | | | |
| 10 | Lens 5 | −1.105 | (ASP) | 0.620 | Plastic | 1.660 | 20.4 | −1.80 |
| 11 | | −19.275 | (ASP) | 0.162 | | | | |
| 12 | Stop | Plano | | 0.050 | | | | |
| 13 | Lens 6 | 2.417 | (ASP) | 2.260 | Plastic | 1.544 | 56.0 | 3.38 |
| 14 | | −5.149 | (ASP) | 0.700 | | | | |
| 15 | Filter | Plano | | 0.210 | Glass | 1.517 | 64.2 | — |
| 16 | | Plano | | 0.586 | | | | |
| 17 | Image | Plano | | — | | | | |

Note:
Reference wavelength is 587.6 nm (d-line).
An effective radius of the stop 601 (Surface 12) is 1.740 mm.

TABLE 12

Aspheric Coefficients

| | Surface # | | | | | |
|---|---|---|---|---|---|---|
| | 1 | 2 | 3 | 4 | 5 | 6 |
| k = | −6.0218E+00 | −1.3888E+00 | 9.0000E+01 | 4.1159E+00 | −2.6249E+01 | −7.7500E+00 |
| A4 = | −4.7146E−03 | 9.4065E−02 | −1.2658E−02 | 3.5273E−02 | −6.1309E−02 | −1.0083E−01 |
| A6 = | 3.3907E−04 | 1.4723E−02 | −8.5867E−03 | −4.5543E−02 | 6.0739E−02 | 6.6917E−02 |
| A8 = | −9.5116E−06 | −5.1360E−03 | −7.3992E−03 | 5.8093E−02 | −5.7888E−02 | −6.4351E−02 |
| A10 = | 1.0422E−07 | — | 7.6975E−03 | −3.8095E−02 | 3.5967E−02 | 4.4210E−02 |
| A12 = | — | — | −1.5071E−03 | 1.4756E−02 | −9.1300E−03 | −1.3259E−02 |
| A14 = | — | — | −5.2374E−06 | −7.1921E−04 | — | — |

| | Surface # | | | | | |
|---|---|---|---|---|---|---|
| | 8 | 9 | 10 | 11 | 13 | 14 |
| k = | −8.9990E+01 | −5.4727E−01 | −1.5601E+00 | −5.6629E+01 | −3.2369E+00 | −1.6910E+00 |
| A4 = | 9.4583E−02 | −1.5526E−01 | 2.9839E−02 | 1.5485E−01 | −1.5790E−02 | −5.7977E−02 |
| A6 = | −2.0696E−01 | 3.0213E−01 | −3.8186E−02 | −1.6714E−01 | 6.7045E−03 | 3.4316E−02 |
| A8 = | 2.3722E−01 | −2.0231E−01 | 1.3439E−01 | 1.1885E−01 | −2.8854E−04 | −1.2020E−02 |
| A10 = | −1.5991E−01 | 4.9009E−02 | −1.6254E−01 | −5.6332E−02 | −3.8047E−04 | 2.9838E−03 |
| A12 = | 4.0983E−02 | 1.2600E−03 | 7.7681E−02 | 1.6454E−02 | 1.1693E−04 | −4.2298E−04 |
| A14 = | — | −1.3563E−03 | −1.2843E−02 | −2.6557E−03 | −1.4784E−05 | 2.7743E−05 |
| A16 = | — | — | — | 1.8197E−04 | 7.1090E−07 | −5.4969E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.38 | R2/SD12 | 0.49 |
| Fno | 2.05 | f/T12 | 0.59 |
| HFOV [deg.] | 94.9 | f/T34 | 4.86 |
| 1/tan(HFOV) | −0.09 | f/R3 + f/R4 | −0.34 |
| Nmax | 1.660 | |f1/f2| | 0.28 |
| V2 + V3 | 43.7 | Σ|f/fi| | 2.71 |
| V2*Fno/10 | 4.18 | f/EPD | 2.05 |
| CT2/CT3 | 0.52 | f/fG1 | 0.22 |
| T56/T23 | 0.87 | |P2| + |P3| | 0.34 |
| ΣAT/T12 | 1.33 | (|P2| + |P3|)/|P1| | 0.64 |

-continued

| 6th Embodiment | | | |
|---|---|---|---|
| (R2 + R4)/(R2 − R4) | −0.71 | |BL/SAG12| | 0.72 |
| |(R8 − R9)/(R8 + R9)| | 0.10 | SL/CT6 | 2.90 |
| |(R9 − R10)/(R9 + R10)| | 0.89 | SD62/SD11 | 0.49 |
| |R11/R10| | 0.13 | SAG52/SAG61 | 0.16 |

7th Embodiment

Figure 13:
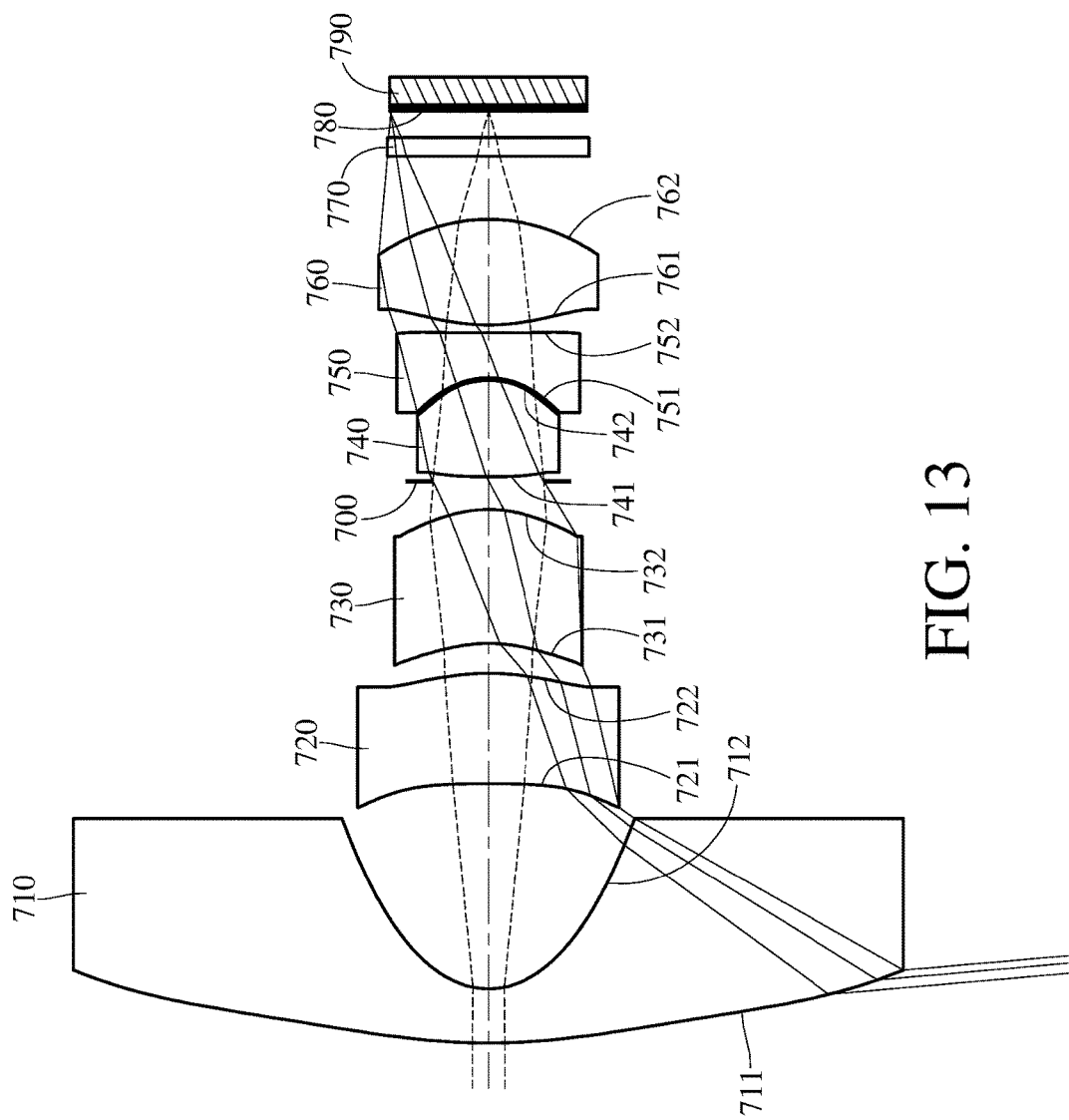
FIG. 13 is a schematic view of an image capturing unit according to the 7th embodiment of the present disclosure.
Figure 14:
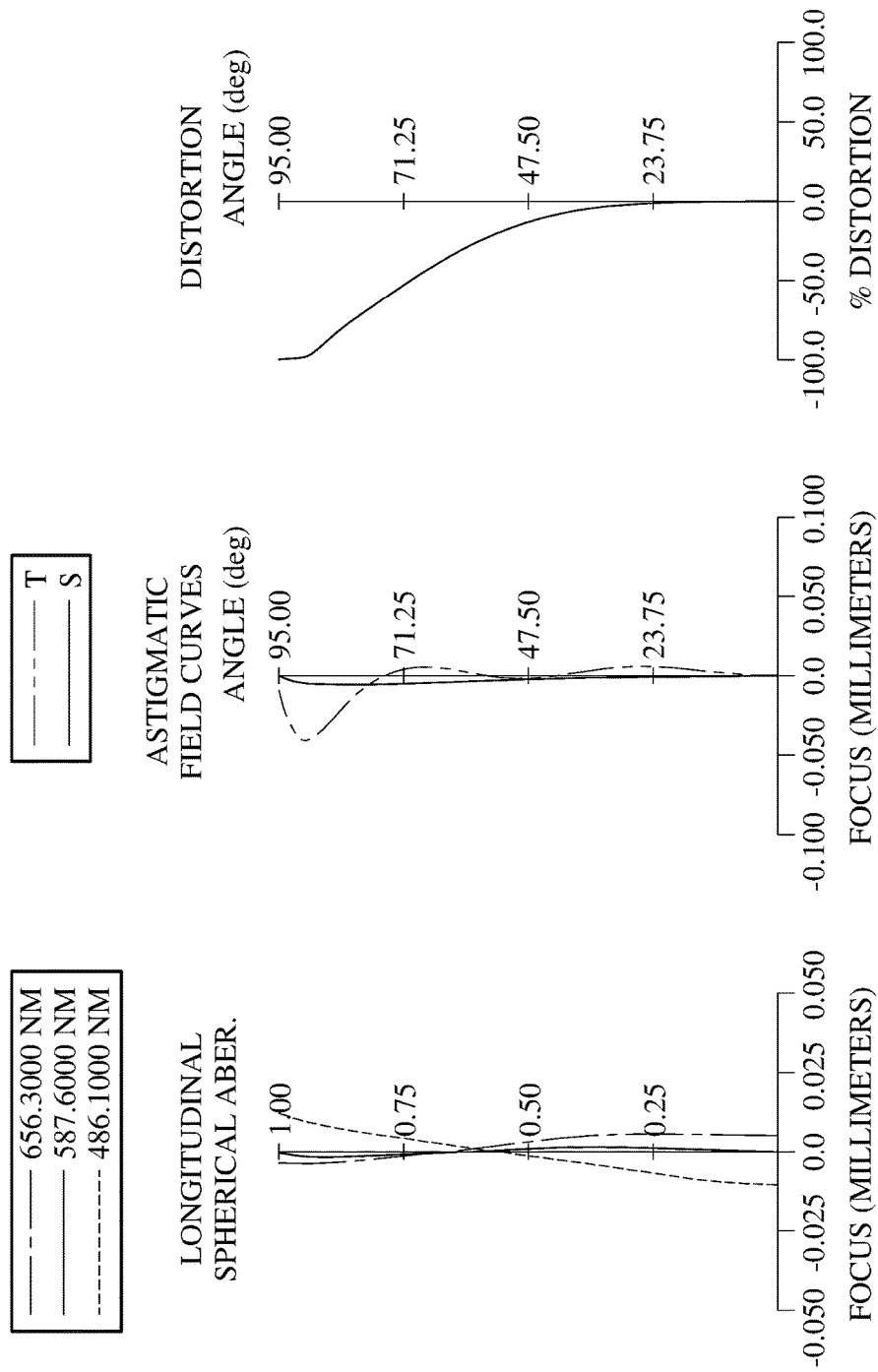
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens system (its reference numeral is omitted) of the present disclosure and an image sensor 790. The optical imaging lens system includes, in order from an object side to an image side, a first lens element 710, a second lens element 720, a third lens element 730, an aperture stop 700, a fourth lens element 740, a fifth lens element 750, a sixth lens element 760, a filter 770 and an image surface 780. The optical imaging lens system includes six lens elements (710, 720, 730, 740, 750 and 760) with no additional lens element disposed between the first lens element 710 and the sixth lens element 760.

The first lens element 710 with negative refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being concave in a paraxial region thereof and an image-side surface 722 being convex in a paraxial region thereof. The second lens element 720 is made of plastic material and has the object-side surface 721 and the image-side surface 722 being both aspheric.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric. The object-side surface 751 of the fifth lens element 750 is cemented to the image-side surface 742 of the fourth lens element 740. The image-side surface 752 of the fifth lens element 750 has at least one inflection point.

The sixth lens element 760 with positive refractive power has an object-side surface 761 being convex in a paraxial region thereof and an image-side surface 762 being convex in a paraxial region thereof. The sixth lens element 760 is made of plastic material and has the object-side surface 761 and the image-side surface 762 being both aspheric. The object-side surface 761 of the sixth lens element 760 has at least one inflection point.

The filter 770 is made of glass material and located between the sixth lens element 760 and the image surface 780, and will not affect the focal length of the optical imaging lens system. The image sensor 790 is disposed on or near the image surface 780 of the optical imaging lens system.

In this embodiment, a displacement in parallel with the optical axis from an axial vertex of the image-side surface 742 of the fourth lens element 740 to a maximum effective radius position of the image-side surface 742 thereof is SAG42, a displacement in parallel with the optical axis from an axial vertex of the object-side surface 751 of the fifth lens element 750 to a maximum effective radius position of the object-side surface 751 thereof is SAG51, the following condition is satisfied: |SAG51|<|SAG42|.

The detailed optical data of the 7th embodiment are shown in Table 13 and the aspheric surface data are shown in Table 14 below.

TABLE 13

7th Embodiment
f = 0.65 mm, Fno = 1.80, HFOV = 95.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.820 | (ASP) | 0.604 | Plastic | 1.545 | 56.1 | −1.86 |
| 2 | | 0.855 | (ASP) | 2.294 | | | | |
| 3 | Lens 2 | −12.890 | (ASP) | 1.226 | Plastic | 1.660 | 20.4 | 5.42 |
| 4 | | −2.906 | (ASP) | 0.333 | | | | |
| 5 | Lens 3 | −1.753 | (ASP) | 1.500 | Plastic | 1.639 | 23.5 | 3.78 |
| 6 | | −1.354 | (ASP) | 0.315 | | | | |
| 7 | Ape. Stop | Plano | | 0.050 | | | | |
| 8 | Lens 4 | 10.281 | (ASP) | 1.072 | Plastic | 1.544 | 56.0 | 1.70 |
| 9 | | −0.979 | (ASP) | 0.032 | Cement | 1.485 | 53.2 | |
| 10 | Lens 5 | −0.875 | (ASP) | 0.500 | Plastic | 1.660 | 20.4 | −1.37 |
| 11 | | −35.470 | (ASP) | 0.087 | | | | |
| 12 | Lens 6 | 2.619 | (ASP) | 1.182 | Plastic | 1.534 | 55.9 | 2.27 |
| 13 | | −1.900 | (ASP) | 0.700 | | | | |
| 14 | Filter | Plano | | 0.210 | Glass | 1.517 | 64.2 | — |
| 15 | | Plano | | 0.292 | | | | |
| 16 | Image | Plano | | — | | | | |

Note:
Reference wavelength is 587.6 nm (d-line).

TABLE 14

Aspheric Coefficients

| | Surface # | | | | | |
|---|---|---|---|---|---|---|
| | 1 | 2 | 3 | 4 | 5 | 6 |
| k = | −1.1316E+00 | −1.0085E+00 | 5.4835E+01 | −1.8918E−01 | −7.8496E+00 | −5.9871E+00 |
| A4 = | −5.8124E−03 | 5.1329E−02 | −4.0370E−02 | 4.4426E−02 | −4.9244E−02 | −8.4408E−02 |
| A6 = | 3.3906E−04 | 3.2240E−03 | −5.3420E−03 | −4.5031E−02 | 7.4166E−02 | 8.4570E−02 |

TABLE 14-continued

| Aspheric Coefficients | | | | | |
|---|---|---|---|---|---|
| A8 = | −8.3241E−06 | −1.3038E−03 | −6.9361E−03 | 7.1415E−02 | −5.8039E−02 | −9.8428E−02 |
| A10 = | 7.8629E−08 | — | 8.1489E−03 | −4.5405E−02 | 2.3425E−02 | 5.6885E−02 |
| A12 = | — | — | −1.5071E−03 | 1.4756E−02 | −9.1300E−03 | −1.3259E−02 |
| A14 = | — | — | −5.2374E−06 | −7.1921E−04 | — | — |

| Surface # | | | | | |
|---|---|---|---|---|---|
| | 8 | 9 | 10 | 11 | 12 | 13 |
| k = | −4.6635E+01 | −1.9802E−01 | −9.0839E−01 | −8.5547E+01 | −3.7914E+00 | −1.6682E+00 |
| A4 = | 2.5004E−01 | −3.3524E−01 | −4.9383E−02 | 1.1600E−01 | 6.6103E−02 | 9.6761E−03 |
| A6 = | −3.6939E−01 | −1.0698E+00 | −5.1689E−02 | −1.9093E−01 | −2.0784E−01 | −5.1272E−02 |
| A8 = | 4.4036E−01 | 7.2658E+00 | 1.6690E−01 | 1.1376E−01 | 2.7584E−01 | 7.9060E−02 |
| A10 = | −2.2663E−01 | −1.5240E+01 | −1.9815E−01 | −4.7310E−02 | −2.6750E−01 | −7.8897E−02 |
| A12 = | −5.3587E−02 | 1.8121E+01 | 7.7681E−02 | 1.6454E−02 | 1.6331E−01 | 4.5156E−02 |
| A14 = | — | −9.5885E+00 | −1.2843E−02 | −2.6557E−03 | −5.5997E−02 | −1.4059E−02 |
| A16 = | — | — | — | 1.8197E−04 | 8.2917E−03 | 1.8985E−03 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 0.65 | R2/SD12 | 0.52 |
| Fno | 1.80 | f/T12 | 0.28 |
| HFOV [deg.] | 95.0 | f/T34 | 1.77 |
| 1/tan(HFOV) | −0.09 | f/R3 + f/R4 | −0.27 |
| Nmax | 1.660 | |f1/f2| | 0.34 |
| V2 + V3 | 43.9 | Σ|f/fi| | 1.78 |
| V2*Fno/10 | 3.67 | f/EPD | 1.80 |
| CT2/CT3 | 0.82 | f/fG1 | 0.45 |
| T56/T23 | 0.26 | |P2| + |P3| | 0.29 |
| ΣAT/T12 | 1.36 | (|P2| + |P3|)/|P1| | 0.84 |
| (R2 + R4)/(R2 − R4) | −0.55 | |BL/SAG12| | 0.63 |
| |(R8 − R9)/(R8 + R9)| | 0.06 | SL/CT6 | 3.49 |
| |(R9 − R10)/(R9 + R10)| | 0.95 | SD62/SD11 | 0.26 |
| |R11/R10| | 0.07 | SAG52/SAG61 | −0.06 |

8th Embodiment

Figure 15:
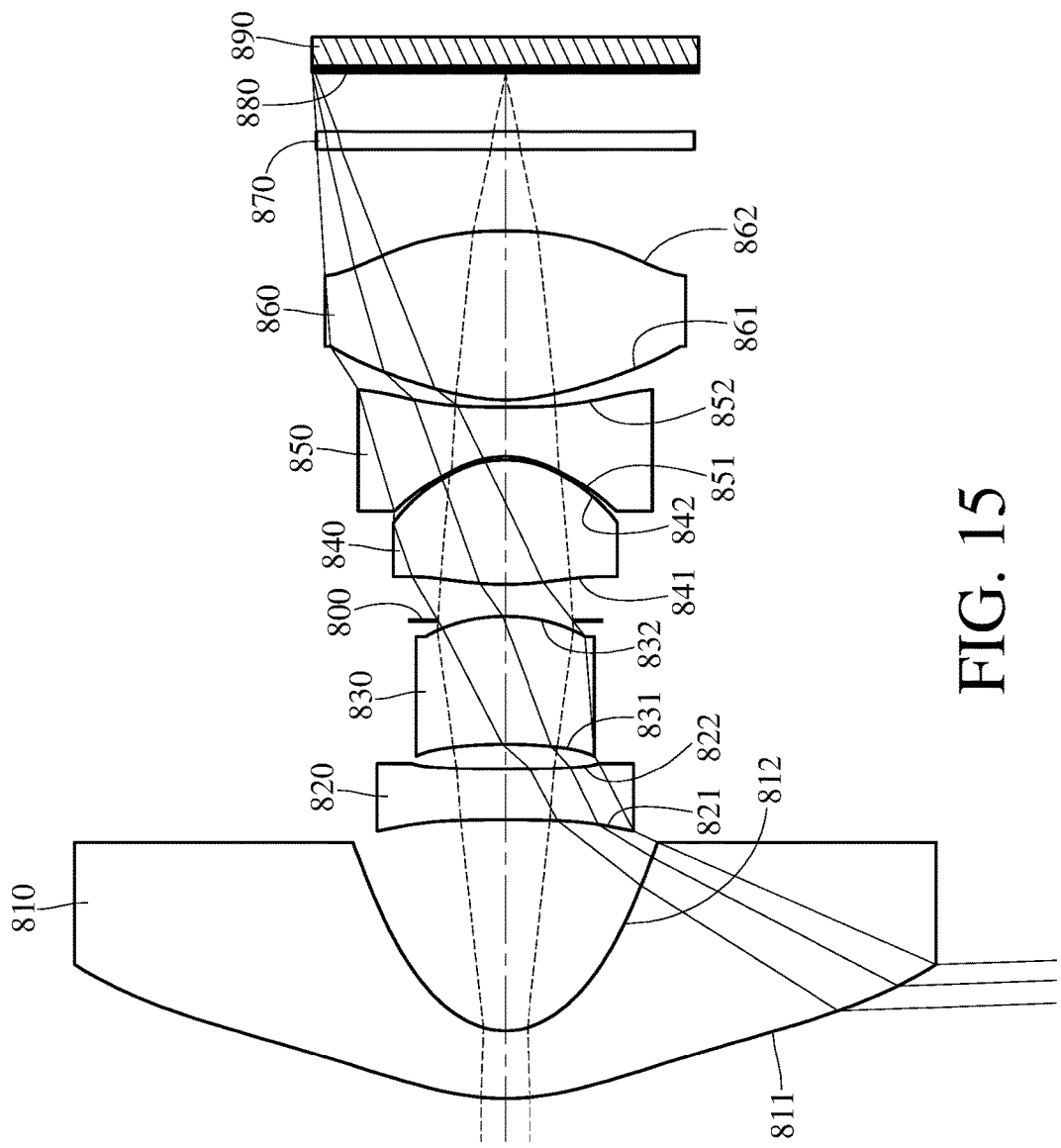
FIG. 15 is a schematic view of an image capturing unit according to the 8th embodiment of the present disclosure.
Figure 16:
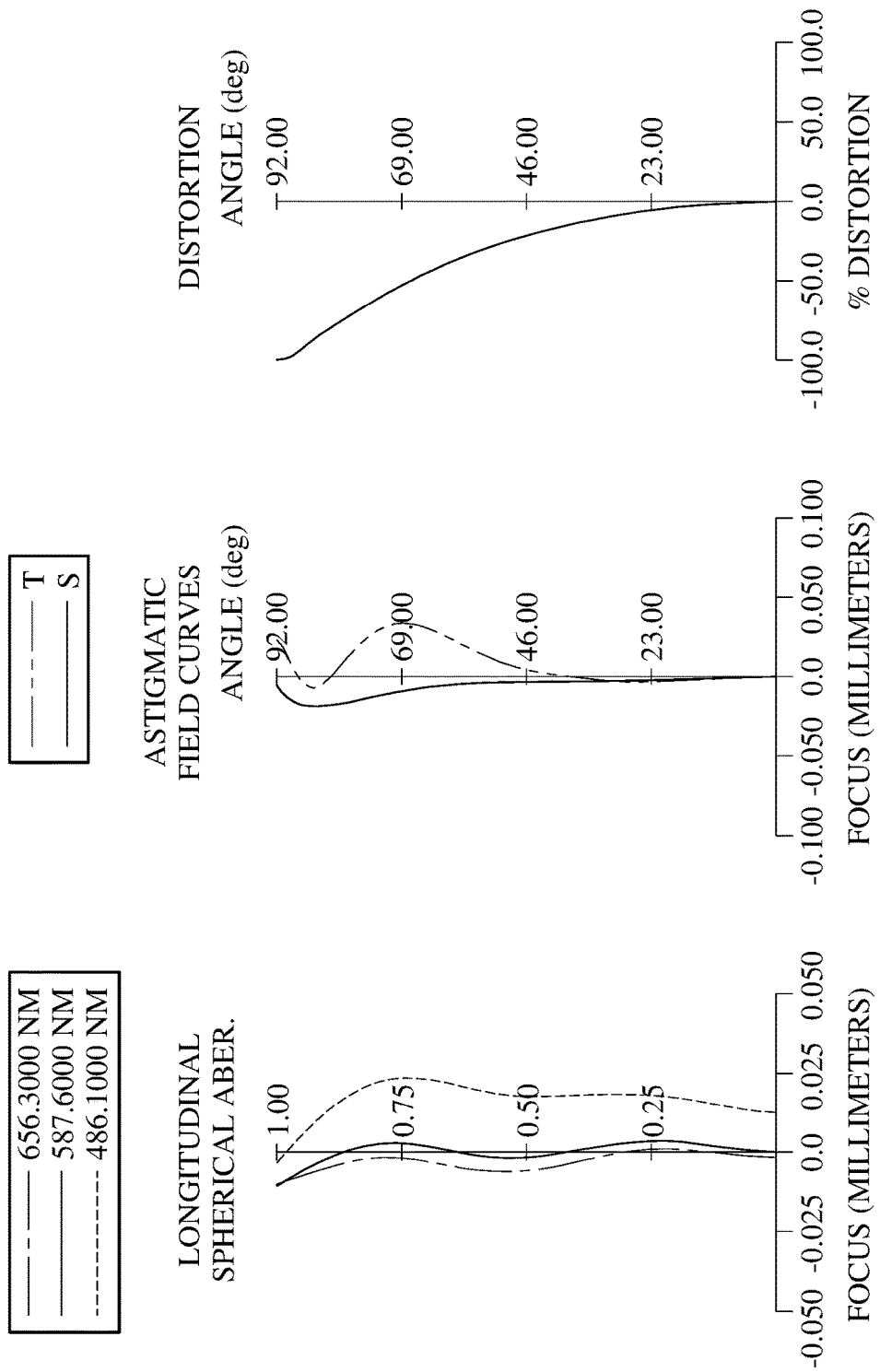
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens system (its reference numeral is omitted) of the present disclosure and an image sensor 890. The optical imaging lens system includes, in order from an object side to an image side, a first lens element 810, a second lens element 820, a third lens element 830, an aperture stop 800, a fourth lens element 840, a fifth lens element 850, a sixth lens element 860, a filter 870 and an image surface 880. The optical imaging lens system includes six lens elements (810, 820, 830, 840, 850 and 860) with no additional lens element disposed between the first lens element 810 and the sixth lens element 860.

The first lens element 810 with negative refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being concave in a paraxial region thereof and an image-side surface 852 being concave in a paraxial region thereof. The fifth lens element 850 is made of plastic material and has the object-side surface 851 and the image-side surface 852 being both aspheric. The image-side surface 852 of the fifth lens element 850 has at least one inflection point.

The sixth lens element 860 with positive refractive power has an object-side surface 861 being convex in a paraxial region thereof and an image-side surface 862 being convex in a paraxial region thereof. The sixth lens element 860 is made of plastic material and has the object-side surface 861 and the image-side surface 862 being both aspheric. The image-side surface 862 of the sixth lens element 860 has at least one inflection point.

The filter 870 is made of glass material and located between the sixth lens element 860 and the image surface 880, and will not affect the focal length of the optical imaging lens system. The image sensor 890 is disposed on or near the image surface 880 of the optical imaging lens system.

In this embodiment, a displacement in parallel with the optical axis from an axial vertex of the image-side surface 842 of the fourth lens element 840 to a maximum effective radius position of the image-side surface 842 thereof is SAG42, a displacement in parallel with the optical axis from an axial vertex of the object-side surface 851 of the fifth lens element 850 to a maximum effective radius position of the object-side surface 851 thereof is SAG51, the following condition is satisfied: |SAG51|<|SAG42|.

The detailed optical data of the 8th embodiment are shown in Table 15 and the aspheric surface data are shown in Table 16 below.

TABLE 15

8th Embodiment
f = 1.38 mm, Fno = 2.40, HFOV = 92.0 deg.

| Surface # |          | Curvature Radius |       | Thickness | Material | Index | Abbe # | Focal Length |
|-----------|----------|------------------|-------|-----------|----------|-------|--------|--------------|
| 0         | Object   | Plano            |       | Infinity  |          |       |        |              |
| 1         | Lens 1   | 2.891            | (ASP) | 0.800     | Plastic  | 1.545 | 56.0   | −2.74        |
| 2         |          | 0.888            | (ASP) | 2.476     |          |       |        |              |
| 3         | Lens 2   | −23.256          | (ASP) | 0.600     | Plastic  | 1.614 | 26.0   | −25.38       |
| 4         |          | 47.619           | (ASP) | 0.291     |          |       |        |              |
| 5         | Lens 3   | −5.867           | (ASP) | 1.500     | Plastic  | 1.639 | 23.5   | 4.62         |
| 6         |          | −2.159           | (ASP) | −0.050    |          |       |        |              |
| 7         | Ape. Stop| Plano            |       | 0.425     |          |       |        |              |
| 8         | Lens 4   | 3.552            | (ASP) | 1.463     | Plastic  | 1.544 | 55.9   | 2.17         |
| 9         |          | −1.514           | (ASP) | 0.041     |          |       |        |              |
| 10        | Lens 5   | −1.141           | (ASP) | 0.580     | Plastic  | 1.660 | 20.4   | −1.67        |
| 11        |          | 41.045           | (ASP) | 0.085     |          |       |        |              |
| 12        | Lens 6   | 2.148            | (ASP) | 1.978     | Plastic  | 1.544 | 56.0   | 3.07         |
| 13        |          | −5.045           | (ASP) | 0.964     |          |       |        |              |
| 14        | Filter   | Plano            |       | 0.210     | Glass    | 1.517 | 64.2   | —            |
| 15        |          | Plano            |       | 0.691     |          |       |        |              |
| 16        | Image    | Plano            |       | —         |          |       |        |              |

Note:
Reference wavelength is 587.6 nm (d-line).

TABLE 16

Aspheric Coefficients

| Surface # | 1 | 2 | 3 | 4 | 5 | 6 |
|---|---|---|---|---|---|---|
| k = | −5.2160E+00 | −1.0135E+00 | 9.0315E+00 | 8.1143E+00 | −6.8326E+01 | −8.7608E+00 |
| A4 = | −4.1923E−03 | 2.0928E−02 | −1.4968E−02 | 8.4641E−03 | −5.7257E−02 | −1.5184E−01 |
| A6 = | 2.8560E−04 | 2.0054E−02 | 2.9433E−03 | 7.8944E−02 | 4.6433E−02 | 1.0168E−01 |
| A8 = | −7.4936E−06 | −4.1515E−03 | −2.3914E−02 | −2.0987E−01 | −8.5164E−02 | −8.8833E−02 |
| A10 = | 8.0354E−08 | — | 2.1165E−02 | 2.8587E−01 | 6.0398E−02 | 5.1596E−02 |
| A12 = | — | — | −6.6016E−03 | −1.9004E−01 | −2.2950E−02 | −1.2634E−02 |
| A14 = | — | — | 7.1592E−04 | 5.4016E−02 | — | — |

| Surface # | 8 | 9 | 10 | 11 | 12 | 13 |
|---|---|---|---|---|---|---|
| k = | −6.0771E+01 | −3.7002E−01 | −1.3504E+00 | 7.0471E+01 | −8.9061E+00 | −6.1143E+00 |
| A4 = | 9.1220E−02 | −3.7120E−02 | −1.1324E−01 | 1.3024E−01 | 3.3954E−03 | −5.2840E−02 |
| A6 = | −2.2164E−01 | 7.6333E−01 | 3.5908E−01 | −1.2152E−01 | 2.7158E−03 | 2.8573E−02 |
| A8 = | 2.7872E−01 | −7.2476E−01 | −3.4955E−01 | 7.9445E−02 | −1.0443E−03 | −1.3746E−02 |
| A10 = | −2.0220E−01 | 3.7240E−01 | 1.4566E−01 | −3.8363E−02 | 2.7094E−05 | 5.3314E−03 |
| A12 = | 5.6820E−02 | −1.0548E−01 | −2.6022E−02 | 1.2154E−02 | 9.4809E−05 | −1.3257E−03 |
| A14 = | — | 1.3471E−02 | 1.6551E−03 | −2.2028E−03 | −2.2735E−05 | 1.8741E−04 |
| A16 = | — | — | — | 1.7095E−04 | 1.5791E−06 | −1.1195E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.38 | R2/SD12 | 0.50 |
| Fno | 2.40 | f/T12 | 0.56 |
| HFOV [deg.] | 92.0 | f/T34 | 3.68 |
| 1/tan(HFOV) | −0.03 | f/R3 + f/R4 | −0.03 |
| Nmax | 1.660 | |f1/f2| | 0.11 |
| V2 + V3 | 49.5 | Σ|f/fi| | 2.77 |
| V2*Fno/10 | 6.23 | f/EPD | 2.40 |
| CT2/CT3 | 0.40 | f/fG1 | 0.18 |
| T56/T23 | 0.29 | |P2| + |P3| | 0.35 |
| ΣAT/T12 | 1.32 | (|P2| + |P3|)/|P1| | 0.70 |
| (R2 + R4)/(R2 − R4) | −1.04 | |BL/SAG12| | 0.84 |
| |(R8 − R9)/(R8 + R9)| | 0.14 | SL/CT6 | 3.25 |
| |(R9 − R10)/(R9 + R10)| | 1.06 | SD62/SD11 | 0.42 |
| |R11/R10| | 0.05 | SAG52/SAG61 | 0.33 |

9th Embodiment

Figure 17:
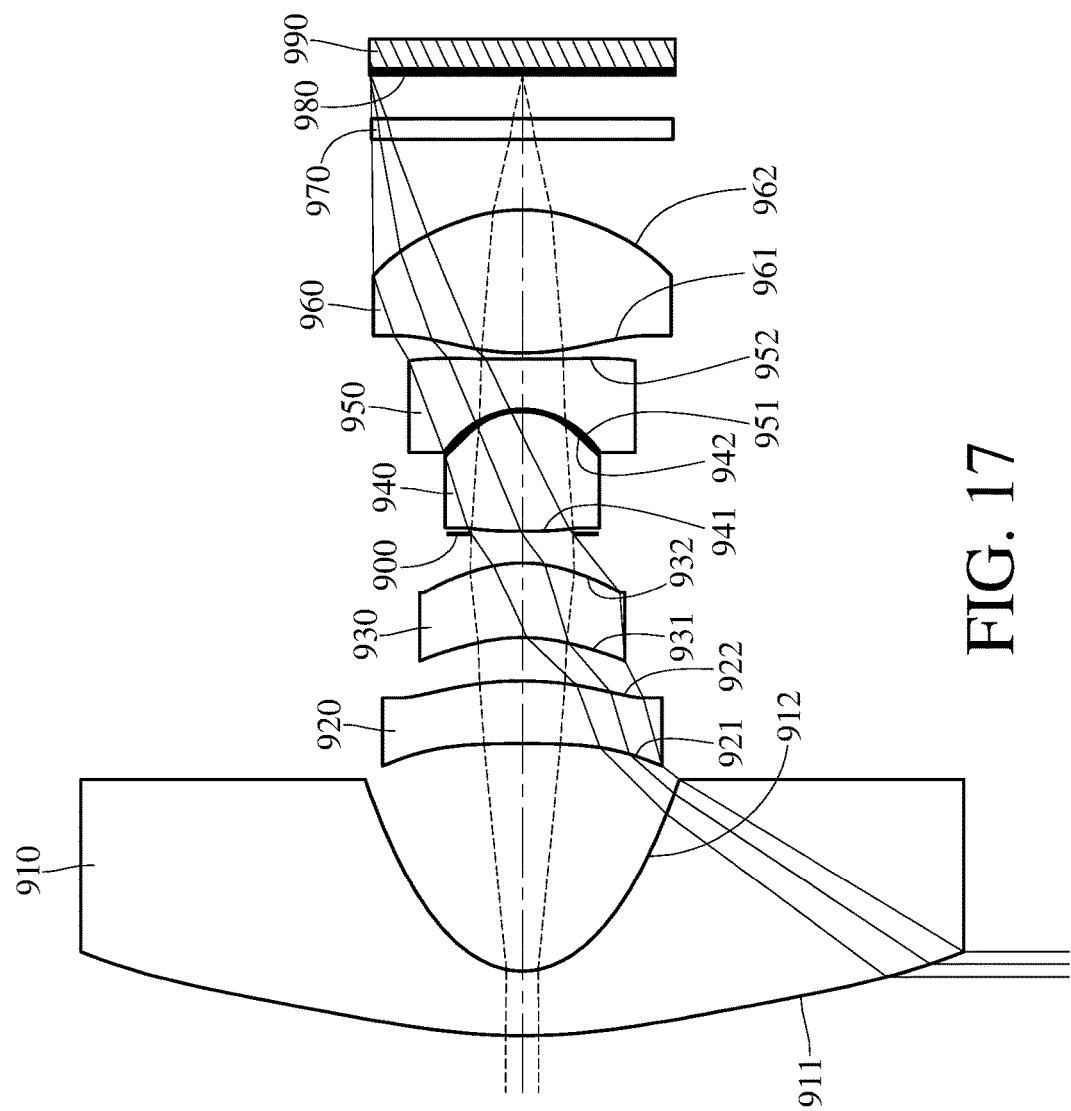
FIG. 17 is a schematic view of an image capturing unit according to the 9th embodiment of the present disclosure.
Figure 18:
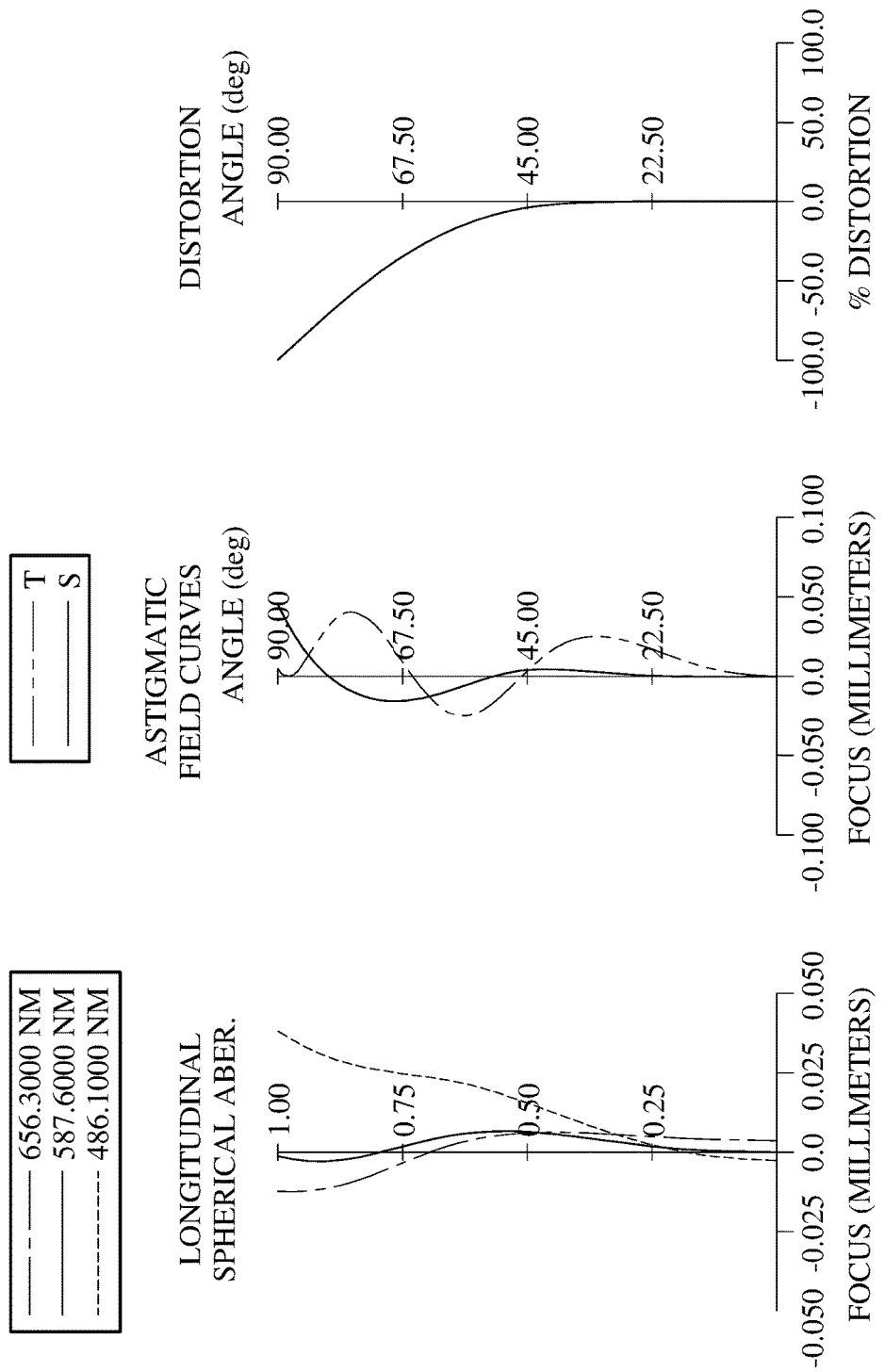
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging lens system (its reference numeral is omitted) of the present disclosure and an image sensor 990. The optical imaging lens system includes, in order from an object side to an image side, a first lens element 910, a second lens element 920, a third lens element 930, an aperture stop 900, a fourth lens element 940, a fifth lens element 950, a sixth lens element 960, a filter 970 and an image surface 980. The optical imaging lens system includes six lens elements (910, 920, 930, 940, 950 and 960) with no additional lens element disposed between the first lens element 910 and the sixth lens element 960.

The first lens element 910 with negative refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with positive refractive power has an object-side surface 921 being concave in a paraxial region thereof and an image-side surface 922 being convex in a paraxial region thereof. The second lens element 920 is made of plastic material and has the object-side surface 921 and the image-side surface 922 being both aspheric.

The third lens element 930 with positive refractive power has an object-side surface 931 being concave in a paraxial region thereof and an image-side surface 932 being convex in a paraxial region thereof. The third lens element 930 is made of plastic material and has the object-side surface 931 and the image-side surface 932 being both aspheric.

The fourth lens element 940 with positive refractive power has an object-side surface 941 being convex in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with negative refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric. The object-side surface 951 of the fifth lens element 950 is cemented to the image-side surface 942 of the fourth lens element 940. The image-side surface 952 of the fifth lens element 950 has at least one inflection point.

The sixth lens element 960 with positive refractive power has an object-side surface 961 being convex in a paraxial region thereof and an image-side surface 962 being convex in a paraxial region thereof. The sixth lens element 960 is made of plastic material and has the object-side surface 961 and the image-side surface 962 being both aspheric. The object-side surface 961 of the sixth lens element 960 has at least one inflection point.

The filter 970 is made of glass material and located between the sixth lens element 960 and the image surface 980, and will not affect the focal length of the optical imaging lens system. The image sensor 990 is disposed on or near the image surface 980 of the optical imaging lens system.

In this embodiment, a displacement in parallel with the optical axis from an axial vertex of the image-side surface 942 of the fourth lens element 940 to a maximum effective radius position of the image-side surface 942 thereof is SAG42, a displacement in parallel with the optical axis from an axial vertex of the object-side surface 951 of the fifth lens element 950 to a maximum effective radius position of the object-side surface 951 thereof is SAG51, the following condition is satisfied: |SAG51|<|SAG42|.

The detailed optical data of the 9th embodiment are shown in Table 17 and the aspheric surface data are shown in Table 18 below.

TABLE 17

9th Embodiment
f = 1.50 mm, Fno = 2.25, HFOV = 90.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 12.454 | (ASP) | 1.281 | Plastic | 1.545 | 56.1 | −3.45 |
| 2 | | 1.574 | (ASP) | 4.545 | | | | |
| 3 | Lens 2 | −26.782 | (ASP) | 1.250 | Plastic | 1.660 | 20.4 | 11.84 |

TABLE 17-continued

9th Embodiment
f = 1.50 mm, Fno = 2.25, HFOV = 90.0 deg.

| Surface # | | Curvature Radius | | Thickness | Material | Index | Abbe # | Focal Length |
|---|---|---|---|---|---|---|---|---|
| 4 | | −6.161 | (ASP) | 0.862 | | | | |
| 5 | Lens 3 | −3.465 | (ASP) | 1.500 | Plastic | 1.639 | 23.5 | 10.15 |
| 6 | | −2.639 | (ASP) | 0.581 | | | | |
| 7 | Ape. Stop | Plano | | 0.050 | | | | |
| 8 | Lens 4 | 16.231 | (ASP) | 2.382 | Plastic | 1.544 | 56.0 | 2.91 |
| 9 | | −1.666 | (ASP) | 0.049 | Cement | 1.485 | 53.2 | |
| 10 | Lens 5 | −1.712 | (ASP) | 1.000 | Plastic | 1.660 | 20.4 | −2.66 |
| 11 | | −81.998 | (ASP) | 0.120 | | | | |
| 12 | Lens 6 | 5.365 | (ASP) | 2.863 | Plastic | 1.534 | 55.9 | 4.31 |
| 13 | | −3.282 | (ASP) | 1.400 | | | | |
| 14 | Filter | Plano | | 0.420 | Glass | 1.517 | 64.2 | — |
| 15 | | Plano | | 0.855 | | | | |
| 16 | Image | Plano | | — | | | | |

Note:
Reference wavelength is 587.6 nm (d-line).

TABLE 18

Aspheric Coefficients

| Surface # | | | | | |
|---|---|---|---|---|---|
| 1 | 2 | 3 | 4 | 5 | 6 |

| | 1 | 2 | 3 | 4 | 5 | 6 |
|---|---|---|---|---|---|---|
| k = | −1.2640E+00 | −9.7026E−01 | 5.0603E+01 | 4.8930E−01 | −8.2911E+00 | −5.7648E+00 |
| A4 = | −7.2655E−04 | 6.2471E−01 | −4.9946E−03 | 5.0693E−03 | −6.1683E−03 | −1.0478E−02 |
| A6 = | 1.0596E−05 | 9.6793E−02 | −1.4665E−04 | −1.5098E−03 | 2.2837E−03 | 2.6672E−03 |
| A8 = | −6.5032E−08 | −9.6565E−02 | −5.2395E−05 | 5.4636E−04 | −4.6224E−04 | −7.7742E−04 |
| A10 = | 1.5357E−10 | — | 1.6087E−05 | −8.9447E−05 | 4.3515E−05 | 1.0790E−04 |
| A12 = | — | — | −7.3586E−07 | 7.2050E−06 | −4.4580E−06 | −6.4739E−06 |
| A14 = | — | — | −6.3714E−10 | −8.7794E−08 | — | — |

| Surface # | | | | | |
|---|---|---|---|---|---|
| 8 | 9 | 10 | 11 | 12 | 13 |

| | 8 | 9 | 10 | 11 | 12 | 13 |
|---|---|---|---|---|---|---|
| k = | −4.6635E+01 | −3.0366E−01 | −7.2506E−01 | −5.2917E+01 | −4.3139E+00 | −2.1292E+00 |
| A4 = | 3.0604E−02 | −1.3917E−02 | 6.0666E−03 | 1.5822E−02 | 6.8145E−03 | −6.8068E−04 |
| A6 = | −1.6419E−02 | −1.8222E−01 | −4.3523E−02 | −7.2419E−03 | −5.0289E−03 | 1.0620E−03 |
| A8 = | 1.4169E−02 | 2.5609E−01 | 4.5914E−02 | 1.4465E−03 | 1.2414E−03 | −4.8743E−04 |
| A10 = | −8.7972E−03 | −1.5455E−01 | −2.5466E−02 | −1.9303E−04 | −1.7504E−04 | 9.4663E−05 |
| A12 = | 2.3532E−03 | 4.8220E−02 | 6.7855E−03 | 1.3782E−05 | 5.1777E−06 | −1.0717E−05 |
| A14 = | — | −6.1622E−03 | −7.1807E−04 | −1.6133E−07 | 1.3162E−06 | 6.0757E−07 |
| A16 = | — | — | — | 5.5532E−09 | −9.5490E−08 | −1.2168E−08 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 1.50 | R2/SD12 | 0.50 |
| Fno | 2.25 | f/T12 | 0.33 |
| HFOV [deg.] | 90.0 | f/T34 | 2.38 |
| 1/tan(HFOV) | 0.00 | f/R3 + f/R4 | −0.30 |
| Nmax | 1.660 | |f1/f2| | 0.29 |

-continued

| 9th Embodiment | | | |
|---|---|---|---|
| V2 + V3 | 43.9 | Σ|f/fi| | 2.14 |
| V2*Fno/10 | 4.59 | f/EPD | 2.25 |
| CT2/CT3 | 0.83 | f/fG1 | 0.30 |
| T56/T23 | 0.14 | |P2| + |P3| | 0.27 |
| ΣAT/T12 | 1.37 | (|P2| + |P3|)/|P1| | 0.63 |
| (R2 + R4)/(R2 − R4) | −0.59 | |BL/SAG12| | 0.70 |
| |(R8 − R9)/(R8 + R9)| | 0.01 | SL/CT6 | 3.19 |
| |(R9 − R10)/(R9 + R10)| | 0.96 | SD62/SD11 | 0.34 |
| |R11/R10| | 0.07 | SAG52/SAG61 | −0.11 |

10th Embodiment

Figure 19:
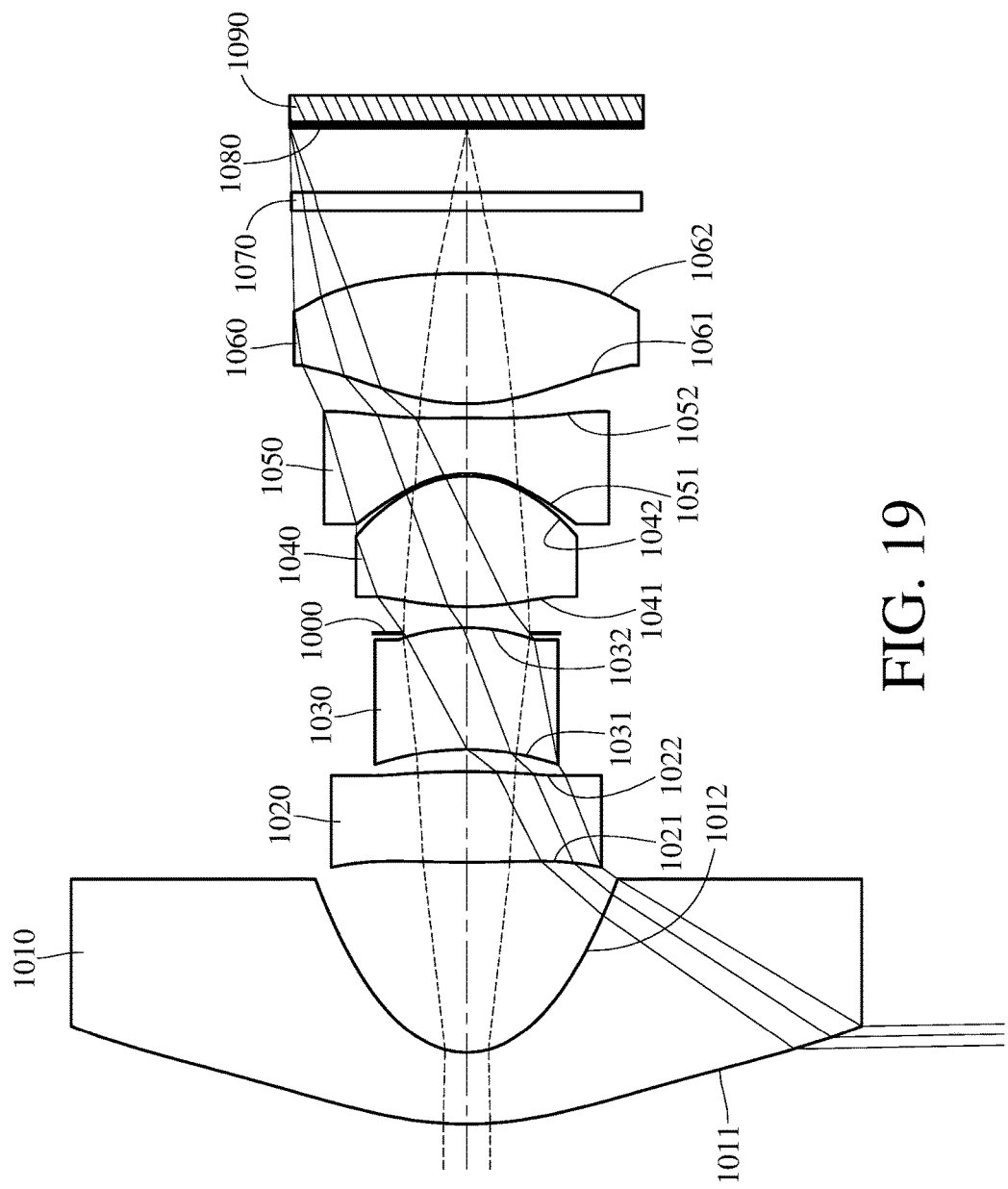
FIG. 19 is a schematic view of an image capturing unit according to the 10th embodiment of the present disclosure.
Figure 20:
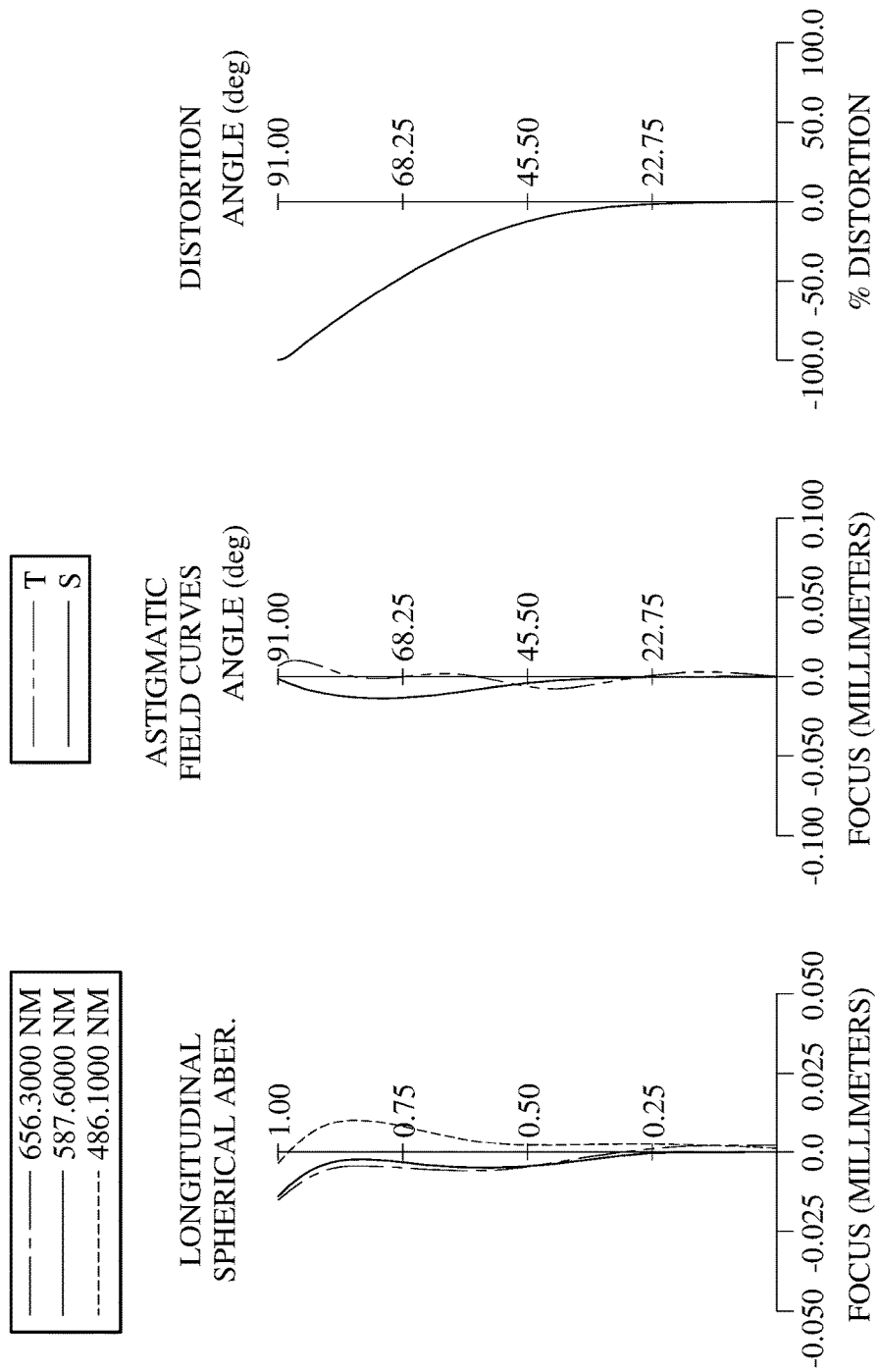
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical imaging lens system (its reference numeral is omitted) of the present disclosure and an image sensor 1090. The optical imaging lens system includes, in order from an object side to an image side, a first lens element 1010, a second lens element 1020, a third lens element 1030, an aperture stop 1000, a fourth lens element 1040, a fifth lens element 1050, a sixth lens element 1060, a filter 1070 and an image surface 1080. The optical imaging lens system includes six lens elements (1010, 1020, 1030, 1040, 1050 and 1060) with no additional lens element disposed between the first lens element 1010 and the sixth lens element 1060.

The first lens element 1010 with negative refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric.

The second lens element 1020 with positive refractive power has an object-side surface 1021 being convex in a paraxial region thereof and an image-side surface 1022 being convex in a paraxial region thereof. The second lens element 1020 is made of plastic material and has the object-side surface 1021 and the image-side surface 1022 being both aspheric.

The third lens element 1030 with positive refractive power has an object-side surface 1031 being concave in a paraxial region thereof and an image-side surface 1032 being convex in a paraxial region thereof. The third lens element 1030 is made of plastic material and has the object-side surface 1031 and the image-side surface 1032 being both aspheric.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with negative refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric. The image-side surface 1052 of the fifth lens element 1050 has at least one inflection point.

The sixth lens element 1060 with positive refractive power has an object-side surface 1061 being convex in a paraxial region thereof and an image-side surface 1062 being convex in a paraxial region thereof. The sixth lens element 1060 is made of plastic material and has the object-side surface 1061 and the image-side surface 1062 being both aspheric. Both the object-side surface 1061 and the image-side surface 1062 of the sixth lens element 1060 have at least one inflection point.

The filter 1070 is made of glass material and located between the sixth lens element 1060 and the image surface 1080, and will not affect the focal length of the optical imaging lens system. The image sensor 1090 is disposed on or near the image surface 1080 of the optical imaging lens system.

In this embodiment, a displacement in parallel with the optical axis from an axial vertex of the image-side surface 1042 of the fourth lens element 1040 to a maximum effective radius position of the image-side surface 1042 thereof is SAG42, a displacement in parallel with the optical axis from an axial vertex of the object-side surface 1051 of the fifth lens element 1050 to a maximum effective radius position of the object-side surface 1051 thereof is SAG51, the following condition is satisfied: |SAG51|<|SAG42|.

The detailed optical data of the 10th embodiment are shown in Table 19 and the aspheric surface data are shown in Table 20 below.

TABLE 19

10th Embodiment
f = 1.22 mm, Fno = 2.33, HFOV = 91.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.866 | (ASP) | 0.800 | Plastic | 1.545 | 56.1 | −2.34 |
| 2 | | 0.888 | (ASP) | 2.128 | | | | |
| 3 | Lens 2 | 16.393 | (ASP) | 1.010 | Plastic | 1.660 | 20.4 | 8.20 |
| 4 | | −7.879 | (ASP) | 0.253 | | | | |
| 5 | Lens 3 | −2.692 | (ASP) | 1.357 | Plastic | 1.639 | 23.3 | 9.23 |
| 6 | | −2.211 | (ASP) | −0.061 | | | | |
| 7 | Ape. Stop | Plano | | 0.295 | | | | |
| 8 | Lens 4 | 3.182 | (ASP) | 1.455 | Plastic | 1.544 | 56.0 | 1.91 |
| 9 | | −1.298 | (ASP) | 0.035 | | | | |
| 10 | Lens 5 | −1.087 | (ASP) | 0.620 | Plastic | 1.660 | 20.4 | −1.79 |
| 11 | | −16.427 | (ASP) | 0.158 | | | | |
| 12 | Lens 6 | 2.201 | (ASP) | 1.453 | Plastic | 1.544 | 56.0 | 3.38 |
| 13 | | −8.516 | (ASP) | 0.700 | | | | |
| 14 | Filter | Plano | | 0.210 | Glass | 1.517 | 64.2 | — |
| 15 | | Plano | | 0.718 | | | | |
| 16 | Image | Plano | | — | | | | |

Note:
Reference wavelength is 587.6 nm (d-line).

TABLE 20

Aspheric Coefficients

| | \multicolumn{6}{c}{Surface #} | | | | | |
|---|---|---|---|---|---|---|
| | 1 | 2 | 3 | 4 | 5 | 6 |
| k = | −3.5703E+00 | −1.0485E+00 | 9.0000E+01 | 1.7183E+00 | −1.8556E+01 | −8.7733E+00 |
| A4 = | −5.3861E−03 | 5.4070E−02 | −1.9294E−02 | 2.8838E−02 | −6.9064E−02 | −1.0327E−01 |
| A6 = | 3.4770E−04 | −2.6766E−04 | −8.9898E−03 | −3.2392E−02 | 6.1406E−02 | 6.4912E−02 |
| A8 = | −9.4205E−06 | −4.6776E−04 | 2.5473E−03 | 3.5308E−02 | −5.6352E−02 | −5.4175E−02 |
| A10 = | 1.0510E−07 | — | −2.0136E−03 | −1.8610E−02 | 3.4932E−02 | 3.7146E−02 |
| A12 = | — | — | 1.4081E−03 | 5.1284E−03 | −9.1300E−03 | −1.3259E−02 |
| A14 = | — | — | −2.7672E−04 | 1.8579E−03 | — | — |

| | \multicolumn{6}{c}{Surface #} | | | | | |
|---|---|---|---|---|---|---|
| | 8 | 9 | 10 | 11 | 12 | 13 |
| k = | −3.7799E+01 | −5.1440E−01 | −1.4674E+00 | −4.5129E+01 | −4.2268E+00 | −9.7230E−01 |
| A4 = | 1.0852E−01 | −1.6256E−01 | 2.7544E−02 | 1.5486E−01 | −6.5415E−03 | −3.5047E−02 |
| A6 = | −2.0215E−01 | 3.0256E−01 | −3.8089E−02 | −1.6781E−01 | 2.8442E−03 | 3.0881E−02 |
| A8 = | 2.1833E−01 | −2.0210E−01 | 1.3371E−01 | 1.1851E−01 | −7.2982E−03 | −2.2227E−02 |
| A10 = | −1.5214E−01 | 4.9132E−02 | −1.6254E−01 | −5.6387E−02 | 6.7542E−03 | 9.2360E−03 |
| A12 = | 4.0983E−02 | 1.2600E−03 | 7.7681E−02 | 1.6454E−02 | −3.3734E−03 | −2.2369E−03 |
| A14 = | — | −1.3563E−03 | −1.2843E−02 | −2.6557E−03 | 8.0306E−04 | 2.6183E−04 |
| A16 = | — | — | — | 1.8197E−04 | −7.0105E−05 | −7.8450E−06 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 1.22 | R2/SD12 | 0.53 |
| Fno | 2.33 | f/T12 | 0.57 |
| HFOV [deg.] | 91.0 | f/T34 | 5.20 |
| 1/tan(HFOV) | −0.02 | f/R3 + f/R4 | −0.08 |
| Nmax | 1.660 | |f1/f2| | 0.29 |
| V2 + V3 | 43.7 | Σ|f/fi| | 2.47 |
| V2*Fno/10 | 4.75 | f/EPD | 2.33 |
| CT2/CT3 | 0.74 | f/fG1 | 0.11 |
| T56/T23 | 0.63 | |P2| + |P3| | 0.28 |
| ΣAT/T12 | 1.32 | (|P2| + |P3|)/|P1| | 0.54 |
| (R2 + R4)/(R2 − R4) | −0.80 | |BL/SAG12| | 0.84 |
| |(R8 − R9)/(R8 + R9)| | 0.09 | SL/CT6 | 3.88 |
| |(R9 − R10)/(R9 + R10)| | 0.88 | SD62/SD11 | 0.44 |
| |R11/R10| | 0.13 | SAG52/SAG61 | 0.17 |

11th Embodiment

Figure 21:
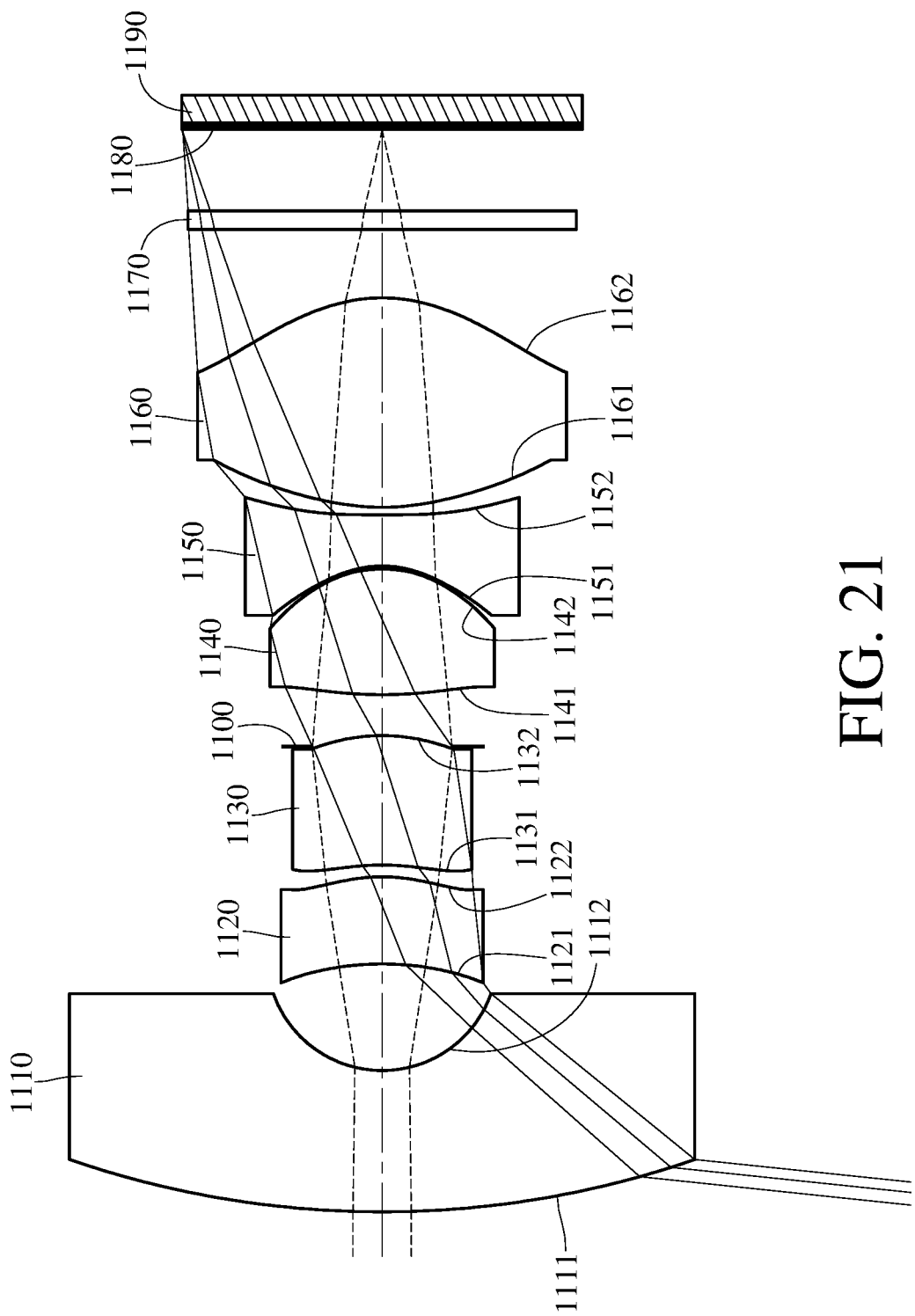
FIG. 21 is a schematic view of an image capturing unit according to the 11th embodiment of the present disclosure.
Figure 22:
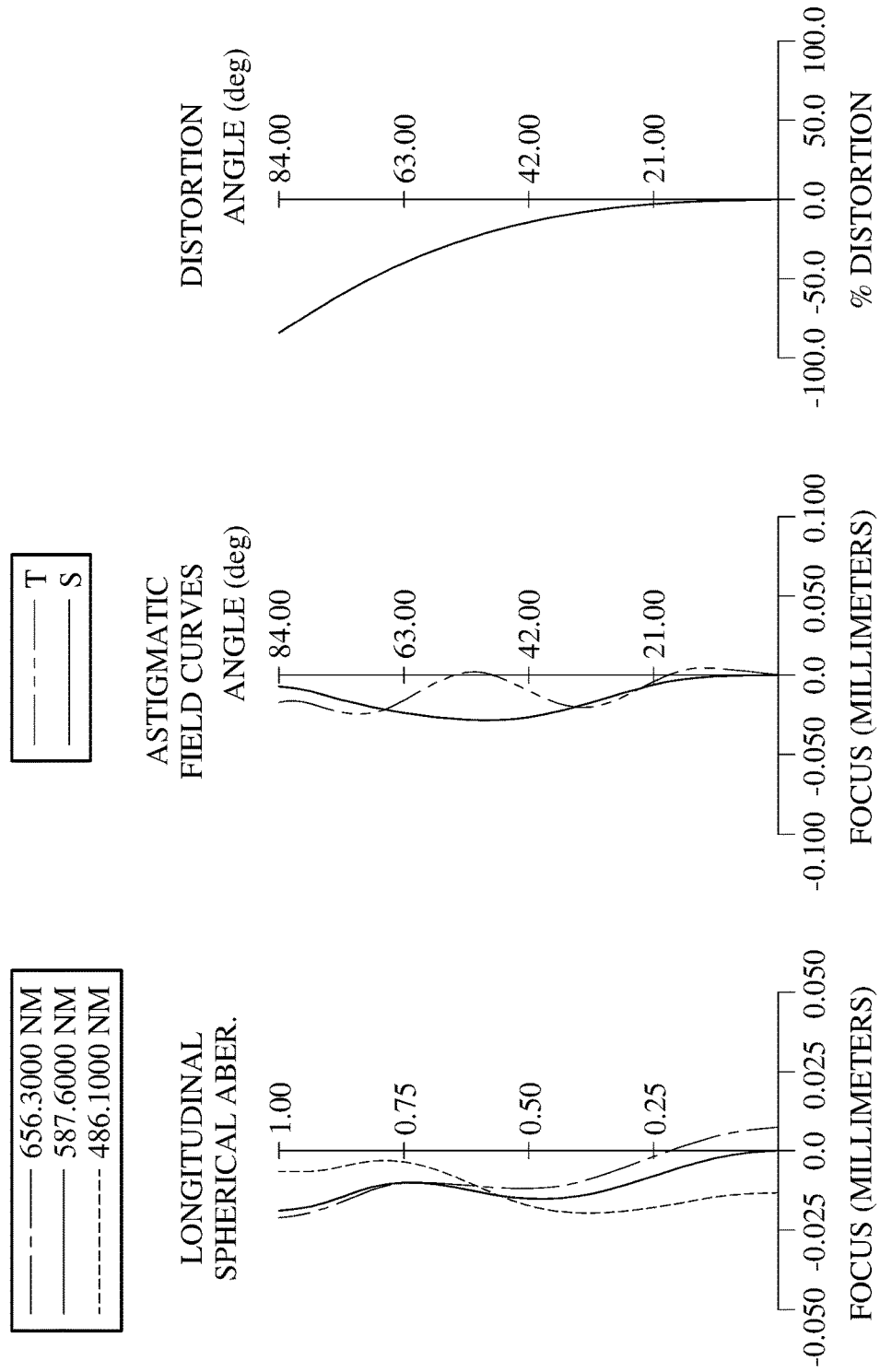
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the optical imaging lens system (its reference numeral is omitted) of the present disclosure and an image sensor 1190. The optical imaging lens system includes, in order from an object side to an image side, a first lens element 1110, a second lens element 1120, a third lens element 1130, an aperture stop 1100, a fourth lens element 1140, a fifth lens element 1150, a sixth lens element 1160, a filter 1170 and an image surface 1180. The optical imaging lens system includes six lens elements (1110, 1120, 1130, 1140, 1150 and 1160) with no additional lens element disposed between the first lens element 1110 and the sixth lens element 1160.

The first lens element 1110 with negative refractive power has an object-side surface 1111 being convex in a paraxial region thereof and an image-side surface 1112 being concave in a paraxial region thereof. The first lens element 1110 is made of glass material and has the object-side surface 1111 and the image-side surface 1112 being both spherical.

The second lens element 1120 with positive refractive power has an object-side surface 1121 being concave in a paraxial region thereof and an image-side surface 1122 being convex in a paraxial region thereof. The second lens element 1120 is made of glass material and has the object-side surface 1121 and the image-side surface 1122 being both aspheric.

The third lens element 1130 with positive refractive power has an object-side surface 1131 being concave in a paraxial region thereof and an image-side surface 1132 being convex in a paraxial region thereof. The third lens element 1130 is made of glass material and has the object-side surface 1131 and the image-side surface 1132 being both aspheric.

The fourth lens element 1140 with positive refractive power has an object-side surface 1141 being convex in a paraxial region thereof and an image-side surface 1142 being convex in a paraxial region thereof. The fourth lens element 1140 is made of glass material and has the object-side surface 1141 and the image-side surface 1142 being both aspheric.

The fifth lens element 1150 with negative refractive power has an object-side surface 1151 being concave in a paraxial region thereof and an image-side surface 1152 being concave in a paraxial region thereof. The fifth lens element 1150 is made of glass material and has the object-side surface 1151 and the image-side surface 1152 being both aspheric. The image-side surface 1152 of the fifth lens element 1150 has at least one inflection point.

The sixth lens element 1160 with positive refractive power has an object-side surface 1161 being convex in a paraxial region thereof and an image-side surface 1162 being convex in a paraxial region thereof. The sixth lens element 1160 is made of glass material and has the object-side surface 1161 and the image-side surface 1162 being both aspheric. The image-side surface 1162 of the sixth lens element 1160 has at least one inflection point.

The filter 1170 is made of glass material and located between the sixth lens element 1160 and the image surface 1180, and will not affect the focal length of the optical imaging lens system. The image sensor 1190 is disposed on or near the image surface 1180 of the optical imaging lens system.

In this embodiment, a displacement in parallel with the optical axis from an axial vertex of the image-side surface 1142 of the fourth lens element 1140 to a maximum effective radius position of the image-side surface 1142 thereof is SAG42, a displacement in parallel with the optical axis from an axial vertex of the object-side surface 1151 of the fifth lens element 1150 to a maximum effective radius position of the object-side surface 1151 thereof is SAG51, the following condition is satisfied: |SAG51|<|SAG42|.

The detailed optical data of the 11th embodiment are shown in Table 21 and the aspheric surface data are shown in Table 22 below.

TABLE 21

11th Embodiment
f = 1.52 mm, Fno = 2.30, HFOV = 84.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.849 | | 1.600 | Glass | 1.717 | 48.0 | −2.22 |
| 2 | | 1.305 | | 1.207 | | | | |
| 3 | Lens 2 | −3.269 | (ASP) | 0.987 | Glass | 1.741 | 27.8 | 4.35 |
| 4 | | −1.831 | (ASP) | 0.134 | | | | |
| 5 | Lens 3 | −2.519 | (ASP) | 1.465 | Glass | 1.697 | 48.5 | 7.23 |
| 6 | | −2.081 | (ASP) | −0.123 | | | | |
| 7 | Ape. Stop | Plano | | 0.586 | | | | |
| 8 | Lens 4 | 4.848 | (ASP) | 1.422 | Glass | 1.518 | 59.0 | 2.55 |
| 9 | | −1.636 | (ASP) | 0.035 | | | | |
| 10 | Lens 5 | −1.229 | (ASP) | 0.580 | Glass | 1.741 | 27.8 | −1.65 |
| 11 | | 188.286 | (ASP) | 0.085 | | | | |
| 12 | Lens 6 | 2.594 | (ASP) | 2.372 | Glass | 1.487 | 70.4 | 2.67 |
| 13 | | −1.835 | (ASP) | 0.774 | | | | |
| 14 | Filter | Plano | | 0.210 | Glass | 1.517 | 64.2 | — |
| 15 | | Plano | | 0.923 | | | | |
| 16 | Image | Plano | | — | | | | |

Note:
Reference wavelength is 587.6 nm (d-line).

TABLE 22

| Aspheric Coefficients | | | | | |
|---|---|---|---|---|---|
| Surface # | 3 | 4 | 5 | 6 | 8 |
| k = | 4.4732E+00 | −6.2250E+00 | −3.1408E+01 | −1.0893E+01 | −9.0000E+01 |
| A4 = | 2.6187E−02 | 7.5413E−02 | −3.9462E−03 | −1.2912E−01 | 8.6487E−02 |
| A6 = | −2.2848E−02 | −1.3858E−01 | 9.9699E−02 | 1.3101E−01 | −1.4735E−01 |
| A8 = | 3.1319E−02 | 2.5100E−01 | −9.3250E−02 | −1.2304E−01 | 1.5569E−01 |
| A10 = | −2.3627E−02 | −2.2611E−01 | 8.3504E−02 | 7.3984E−02 | −1.0679E−01 |
| A12 = | 1.1951E−02 | 1.1733E−01 | −2.2950E−02 | −1.2634E−02 | 2.9561E−02 |
| A14 = | −2.3561E−03 | −1.6108E−02 | — | — | — |

| Surface # | 9 | 10 | 11 | 12 | 13 |
|---|---|---|---|---|---|
| k = | −2.6965E−01 | −1.3412E+00 | −9.0000E+01 | −8.9533E+00 | −3.9793E+00 |
| A4 = | −3.8304E−01 | −1.0819E−01 | 1.2539E−01 | 7.5928E−03 | −3.9003E−02 |
| A6 = | 7.4371E−01 | 3.1007E−01 | −1.1272E−01 | −1.9681E−03 | 1.5563E−02 |
| A8 = | −6.9795E−01 | −2.8352E−01 | 7.4402E−02 | 2.5307E−03 | −2.5701E−03 |
| A10 = | 3.4613E−01 | 1.0135E−01 | −3.3581E−02 | −1.1616E−03 | −2.2561E−04 |
| A12 = | −8.9659E−02 | −8.7764E−03 | 9.3933E−03 | 2.7952E−04 | 2.1584E−04 |
| A14 = | 1.0127E−02 | −1.1213E−03 | −1.4594E−03 | −3.6280E−05 | −3.7361E−05 |
| A16 = | — | — | 9.5902E−05 | 1.9660E−06 | 2.0433E−06 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 1.52 | R2/SD12 | 1.06 |
| Fno | 2.30 | f/T12 | 1.26 |
| HFOV [deg.] | 84.0 | f/T34 | 3.27 |
| 1/tan(HFOV) | 0.11 | f/R3 + f/R4 | −1.29 |
| Nmax | 1.741 | \|f1/f2\| | 0.51 |
| V2 + V3 | 76.3 | Σ\|f/fi\| | 3.32 |
| V2*Fno/10 | 6.38 | f/EPD | 2.30 |
| CT2/CT3 | 0.67 | f/fG1 | 0.40 |
| T56/T23 | 0.64 | \|P2\|+\|P3\| | 0.56 |
| ΣAT/T12 | 1.59 | (\|P2\|+\|P3\|)/\|P1\| | 0.82 |
| (R2 + R4)/(R2−R4) | −0.17 | \|BL/SAG12\| | 2.20 |
| \|(R8 − R9)/(R8 + R9)\| | 0.14 | SL/CT6 | 2.95 |
| \|(R9 − R10)/(R9 + R10)\| | 1.01 | SD62/SD11 | 0.59 |
| \|R11/R10\| | 0.01 | SAG52/SAG61 | 0.36 |

12th Embodiment

Figure 23:
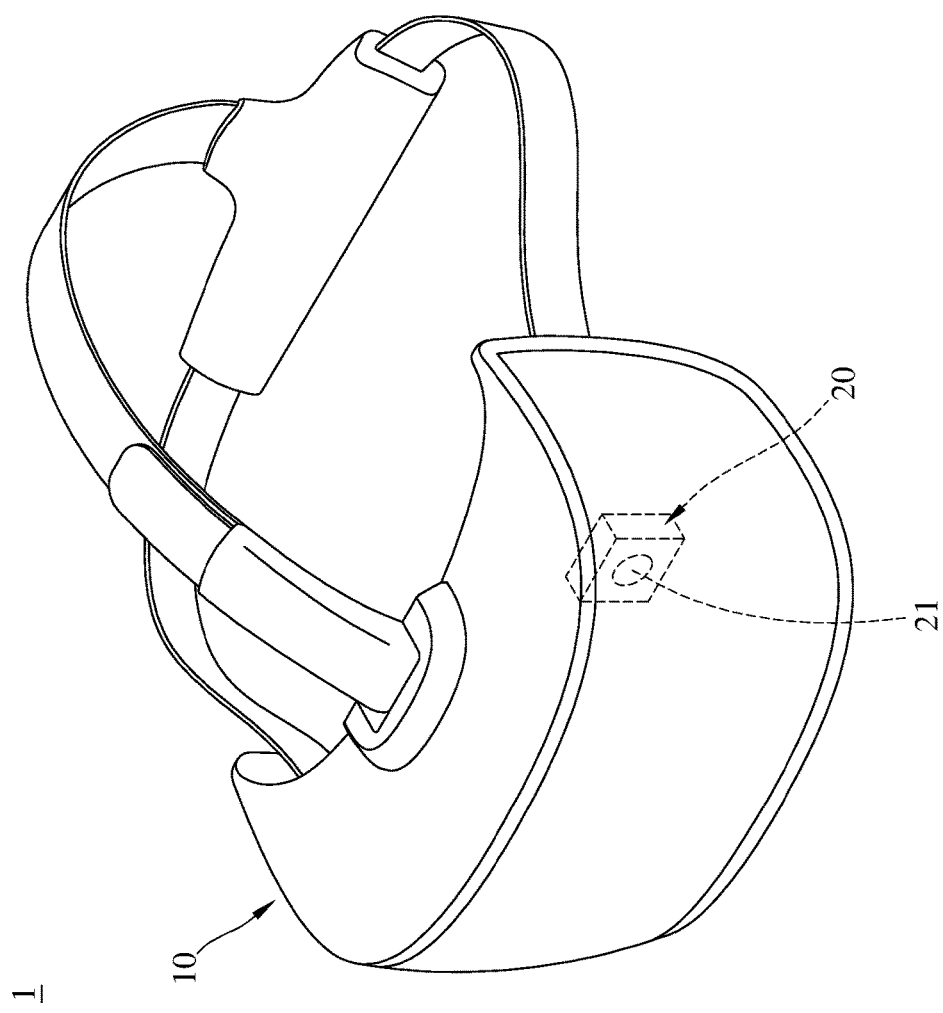
FIG. 23 a perspective view of a head-mounted display device according to the 12th embodiment.

FIG. 23 is a perspective view of a head-mounted display device according to the 12th embodiment of the present disclosure. In this embodiment, a head-mounted display device 1 includes a helmet 10 and an image capturing unit 20 disposed on the helmet 10. The image capturing unit 20 includes a front camera shot 21, and the front camera shot 21 includes the optical imaging lens system disclosed in the first embodiment. In this embodiment, the image capturing unit 20 further includes a barrel, a holder member or a combination thereof.

Figure 27:
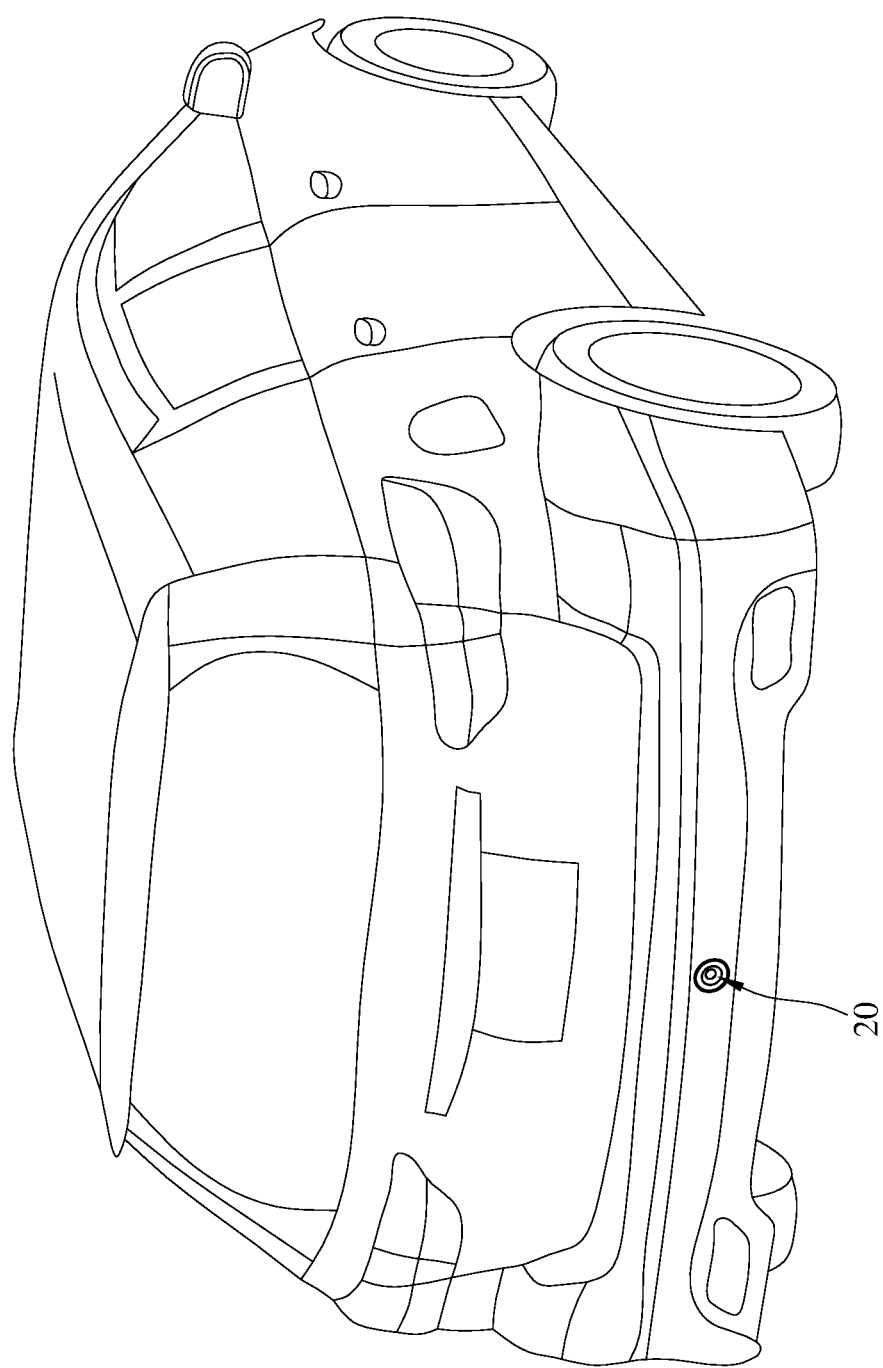
FIG. 27 shows an electronic device according to one embodiment.
Figure 28:
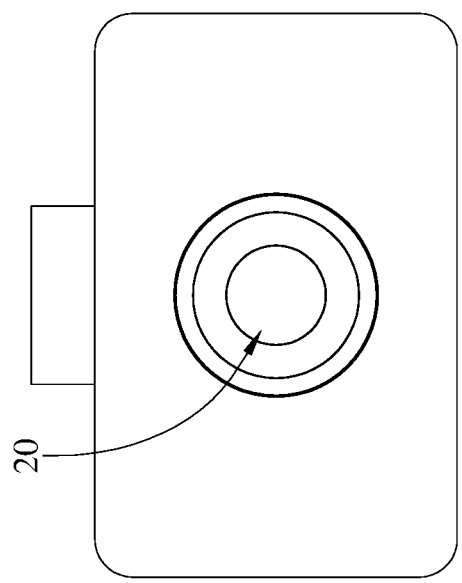
FIG. 28 shows an electronic device according to another embodiment.
Figure 29:
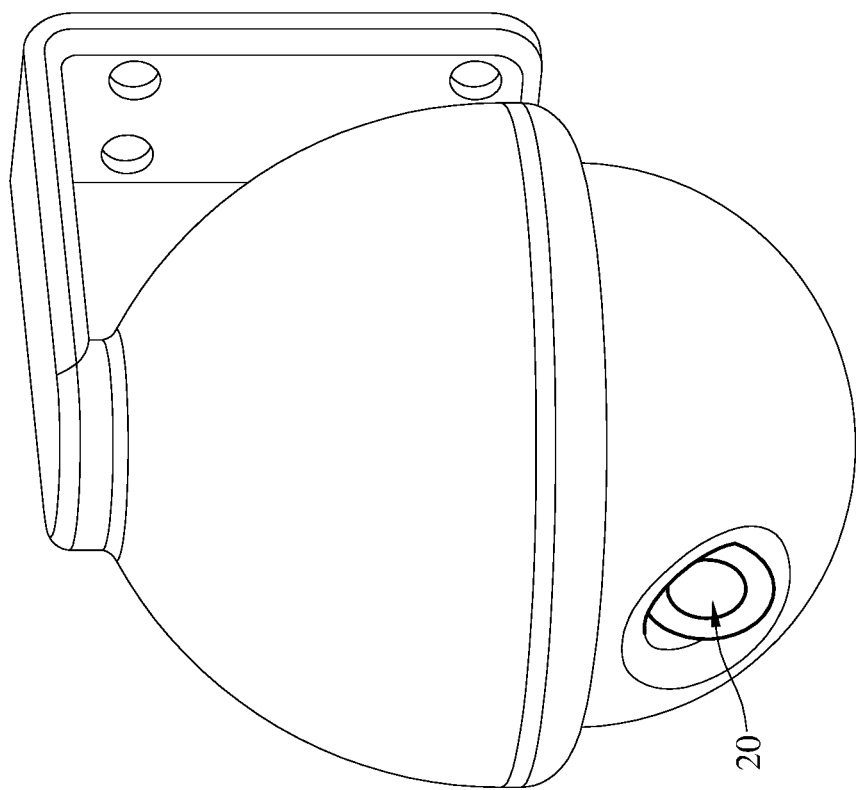
FIG. 29 shows an electronic device according to still another embodiment.

The head-mounted display device 1 in this embodiment is only exemplary for showing the image capturing unit 20 of the present disclosure installed in an electronic device, and the present disclosure is not limited thereto. The image capturing unit 20 may be installed in an electronic device, including a vehicle backup camera (FIG. 27), a dashboard camera (FIG. 28) or a network surveillance device (FIG. 29). In some cases, the electronic device can further include, but not limited to, a display unit, a control unit, a storage unit, a random access memory unit (RAM), a read only memory unit (ROM) or a combination thereof.

The image capturing unit 20 can be optionally applied to optical systems with a movable focus. Furthermore, the optical imaging lens system of the image capturing unit 20 is featured with good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, motion sensing input devices, wearable devices and other electronic imaging devices.

The foregoing description, for the purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens system comprising six lens elements, the six lens elements being, in order from an object side to an image side:
    a first lens element having negative refractive power;
    a second lens element;
    a third lens element having an object-side surface being concave in a paraxial region thereof and an image-side surface being convex in a paraxial region thereof;
    a fourth lens element having positive refractive power;
    a fifth lens element having negative refractive power; and
    a sixth lens element having positive refractive power;
    wherein a central thickness of the second lens element is CT2, a central thickness of the third lens element is CT3, a focal length of the optical imaging lens system is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the i-th lens element is fi, a refractive power of the first lens element is P1, a refractive power of the second lens element is P2, a refractive power of the third lens element is P3, an axial distance between the first lens element and the second lens element is T12, a curvature radius of an image-side surface of the fifth lens element is R10, a curvature radius of an object-side surface of the sixth lens element is R11, and the following conditions are satisfied:

$0<CT2/CT3<0.90;$ $0<\Sigma|f/fi|<3.0$, wherein $i=1, 2, 3, 4, 5, 6;$ $(|P2|+|P3|)/|P1|<0.90;$ and $0<f/T12<0.80;$ and $|R11/R10|<1.30.$ 2. The optical imaging lens system of claim 1, wherein the second lens element has an object-side surface being concave in a paraxial region thereof.

3. The optical imaging lens system of claim 1, wherein the fourth lens element has an image-side surface being convex in a paraxial region thereof, and the fifth lens element has an object-side surface being concave in a paraxial region thereof.

4. The optical imaging lens system of claim 1, wherein, either the object-side surface of the sixth lens element, an image-side surface of the sixth lens element or both the object-side surface and the image-side surface of the sixth lens element have at least one inflection point.

5. The optical imaging lens system of claim 1, wherein the curvature radius of the image-side surface of the fifth lens element is R10, the curvature radius of the object-side surface of the sixth lens element is R11, and the following condition is satisfied:

|R11/R10|<0.85.

6. The optical imaging lens system of claim 1, wherein the focal length of the optical imaging lens system is f, a curvature radius of an object-side surface of the second lens element is R3, a curvature radius of an image-side surface of the second lens element is R4, and the following condition is satisfied:

−3.0<f/R3+f/R4<0.20.

7. The optical imaging lens system of claim 1, wherein a curvature radius of an object-side surface of the fifth lens element is R9, the curvature radius of the image-side surface of the fifth lens element is R10, and the following condition is satisfied:

0.45<|(R9−R10)/(R9+R10)|<1.90.

8. The optical imaging lens system of claim 1, wherein an axial distance between an image-side surface of the sixth lens element and an image surface is BL, a displacement in parallel with an optical axis from an axial vertex of an image-side surface of the first lens element to a maximum effective radius position of the image-side surface of the first lens element is SAG12, and the following condition is satisfied:

|BL/SAG12|<1.50.

9. The optical imaging lens system of claim 1, wherein a displacement in parallel with an optical axis from an axial vertex of an image-side surface of the fourth lens element to a maximum effective radius position of the image-side surface of the fourth lens element is SAG42, a displacement in parallel with the optical axis from an axial vertex of an object-side surface of the fifth lens element to a maximum effective radius position of the object-side surface of the fifth lens element is SAG51, a curvature radius of the image-side surface of the fourth lens element is R8, a curvature radius of the object-side surface of the fifth lens element is R9, and the following conditions are satisfied:

|SAG51|<|SAG42|, and 0.01<|(R8−R9)/(R8+R9)|<0.20.

10. The optical imaging lens system of claim 1, wherein an Abbe number of the second lens element is V2, an f-number of the optical imaging lens system is Fno, a maximum effective radius of an object-side surface of the first lens element is SD11, a maximum effective radius of an image-side surface of the sixth lens element is SD62, and the following conditions are satisfied:

0<V2*Fno/10<10.0; and 0.10<SD62/SD11<0.55.

11. An optical imaging lens system comprising six lens elements, the six lens elements being, in order from an object side to an image side:
 a first lens element having negative refractive power;
 a second lens element;
 a third lens element having an object-side surface being concave in a paraxial region thereof and an image-side surface being convex in a paraxial region thereof;
 a fourth lens element with positive refractive power having an image-side surface being convex in a paraxial region thereof;
 a fifth lens element with negative refractive power having an object-side surface being concave in a paraxial region thereof; and
 a sixth lens element having positive refractive power;
 wherein an absolute value of a curvature radius of an image-side surface of the first lens element is smaller than an absolute value of a curvature radius of an image-side surface of the fifth lens element;
 wherein a central thickness of the second lens element is CT2, a central thickness of the third lens element is CT3, a focal length of the optical imaging lens system is f, a focal length of the first lens element is f1, a focal length of the second lens element is f2, an axial distance between the first lens element and the second lens element is T12, an entrance pupil diameter of the optical imaging lens system is EPD, and the following conditions are satisfied:

0<CT2/CT3<1.10;

0<f/T12<0.80;

0.80<f/EPD<4.0; and

|f1/f2|<0.90.

12. The optical imaging lens system of claim 11, wherein the second lens element has an object-side surface being concave in a paraxial region thereof.

13. The optical imaging lens system of claim 11, wherein the focal length of the optical imaging lens system is f, the focal length of the first lens element is f1, the focal length of the second lens element is f2, the entrance pupil diameter of the optical imaging lens system is EPD, and the following conditions are satisfied:

|f1/f2|<0.70; and 0.80<f/EPD<2.80.

14. The optical imaging lens system of claim 11, wherein a refractive power of the second lens element is P2, a refractive power of the third lens element is P3, and the following condition is satisfied:

|P2|+|P3|<0.38.

15. The optical imaging lens system of claim 11, wherein a sum of axial distances between each adjacent lens element of the optical imaging lens system is ΣAT, the axial distance between the first lens element and the second lens element is T12, and the following condition is satisfied:

1.0<ΣAT/T12<1.90.

16. The optical imaging lens system of claim 11, wherein the focal length of the optical imaging lens system is f, a curvature radius of an object-side surface of the second lens element is R3, a curvature radius of an image-side surface of the second lens element is R4, and the following condition is satisfied:

−0.50<f/R3+f/R4<0.10.

17. The optical imaging lens system of claim 11, wherein a displacement in parallel with an optical axis from an axial vertex of the image-side surface of the fifth lens element to a maximum effective radius position of the image-side surface of the fifth lens element is SAG52, a displacement in parallel with the optical axis from an axial vertex of an object-side surface of the sixth lens element to a maximum effective radius position of the object-side surface of the sixth lens element is SAG61, and the following condition is satisfied:

$-2.0<SAG52/SAG61<0.55.$

18. The optical imaging lens system of claim 11, wherein the curvature radius of the image-side surface of the first lens element is R2, a maximum effective radius of the image-side surface of the first lens element is SD12, and the following condition is satisfied:

$R2/SD12<0.80.$

19. The optical imaging lens system of claim 11, wherein an Abbe number of the second lens element is V2, an Abbe number of the third lens element is V3, and the following condition is satisfied:

$V2+V3<70.$

20. The optical imaging lens system of claim 11, wherein a maximum among all refractive indices of the lens elements of the optical imaging lens system is Nmax, half of a maximum field of view of the optical imaging lens system is HFOV, and the following conditions are satisfied:

$1.60<Nmax<1.75;$ and $-0.50<1/\tan(HFOV)<0.35.$

21. An optical imaging lens system comprising six lens elements, the six lens elements being, in order from an object side to an image side:
   a first lens element having negative refractive power;
   a second lens element;
   a third lens element having an object-side surface being concave in a paraxial region thereof and an image-side surface being convex in a paraxial region thereof;
   a fourth lens element;
   a fifth lens element with negative refractive power having an object-side surface being concave in a paraxial region thereof; and
   a sixth lens element;
   wherein a central thickness of the second lens element is CT2, a central thickness of the third lens element is CT3, a curvature radius of an image-side surface of the first lens element is R2, a curvature radius of an image-side surface of the second lens element is R4, a focal length of the optical imaging lens system is f, an axial distance between the second lens element and the third lens element is T23, an axial distance between the third lens element and the fourth lens element is T34, an axial distance between the fifth lens element and the sixth lens element is T56, a maximum among all refractive indices of the lens elements of the optical imaging lens system in Nmax, and the following conditions are satisfied:

$0<CT2/CT3<1.0;$ $-2.80<(R2+R4)/(R2-R4)<0.90;$ $0<f/T34<12.0;$ $1.60<Nmax<1.75;$ and $0\leq T56/T23<1.20.$ 22. The optical imaging lens system of claim 21, wherein the second lens element has an object-side surface being concave in a paraxial region thereof.

23. The optical imaging lens system of claim 21, wherein the sixth lens element has an object-side surface being convex in a paraxial region thereof and an image-side surface being convex in a paraxial region thereof.

24. The optical imaging lens system of claim 21, wherein the focal length of the optical imaging lens system is f, a curvature radius of an object-side surface of the second lens element is R3, the curvature radius of the image-side surface of the second lens element is R4, and the following condition is satisfied:

$-0.50<f/R3+f/R4<0.20.$

25. The optical imaging lens system of claim 21, wherein the curvature radius of the image-side surface of the first lens element is R2, the curvature radius of the image-side surface of the second lens element is R4, and the following condition is satisfied:

$-2.0<(R2+R4)/(R2-R4)<0.$

26. The optical imaging lens system of claim 21, wherein the focal length of the optical imaging lens system is f, the axial distance between the second lens element and the third lens element is T23, the axial distance between the third lens element and the fourth lens element is T34, the axial distance between the fifth lens element and the sixth lens element is T56, and the following conditions are satisfied:

$0<f/T34<10.0;$ and $0.10<T56/T23<1.0.$

27. The optical imaging lens system of claim 21, further comprising an aperture stop, wherein an axial distance between the aperture stop and an image surface is SL, a central thickness of the sixth lens element is CT6, and the following condition is satisfied:

$1.50<SL/CT6<5.30.$

28. The optical imaging lens system of claim 21, wherein an axial distance between an image-side surface of the sixth lens element and an image surface is BL, a displacement in parallel with an optical axis from an axial vertex of the image-side surface of the first lens element to a maximum effective radius position of the image-side surface of the first lens element is SAG12, and the following condition is satisfied:

$|BL/SAG12|<1.80.$

29. The optical imaging lens system of claim 21, wherein the curvature radius of the image-side surface of the first lens element is R2, a maximum effective radius of the image-side surface of the first lens element is SD12, and the following condition is satisfied:

$R2/SD12<0.80.$

30. The optical imaging lens system of claim 21, further comprising an aperture stop disposed between the third lens element and the fourth lens element, and an image-side surface of the fifth lens element having at least one inflection point.

31. The optical imaging lens system of claim 21, wherein half of a maximum field of view of the optical imaging lens system is HFOV, and the following condition is satisfied:

$-0.40<1/\tan(HFOV)<0.25.$

32. The optical imaging lens system of claim 21, wherein a curvature radius of an image-side surface of the fourth lens element is R8, a curvature radius of the object-side surface of the fifth lens element is R9, and the following condition is satisfied:

$$0.01<|(R8-R9)/(R8+R9)|<0.35.$$

33. The optical imaging lens system of claim 21, further comprising an aperture stop, wherein the focal length of the optical imaging lens system is f, a composite focal length of all the lens elements disposed between an imaged object and the aperture stop is fG1, and the following condition is satisfied:

$$0<f/fG1.$$

34. An image capturing unit, comprising:
 the optical imaging lens system of claim 21; and
 an image sensor disposed on an image surface of the optical imaging lens system.

35. An electronic device, comprising:
 the image capturing unit of claim 34.

* * * * *